United States Patent
Fukuyasu et al.

(10) Patent No.: US 10,771,683 B2
(45) Date of Patent: Sep. 8, 2020

(54) INFORMATION PROCESSOR, INFORMATION PROCESSING SYSTEM, AND INFORMATION PROCESSING METHOD, AND PROGRAM

(71) Applicant: Sony Corporation, Tokyo (JP)

(72) Inventors: Tetsuya Fukuyasu, Kanagawa (JP); Noriyuki Aramaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 15/781,232

(22) PCT Filed: Dec. 5, 2016

(86) PCT No.: PCT/JP2016/086061
§ 371 (c)(1),
(2) Date: Jun. 4, 2018

(87) PCT Pub. No.: WO2017/122456
PCT Pub. Date: Jul. 20, 2017

(65) Prior Publication Data
US 2020/0014845 A1 Jan. 9, 2020

(30) Foreign Application Priority Data

Jan. 15, 2016 (JP) ................................ 2016-005829

(51) Int. Cl.
*H04N 5/232* (2006.01)
*G06K 9/00* (2006.01)
(Continued)

(52) U.S. Cl.
CPC ..... *H04N 5/23219* (2013.01); *G06K 9/00342* (2013.01); *G06K 9/209* (2013.01); *H04N 5/91* (2013.01); *G06K 2209/27* (2013.01)

(58) Field of Classification Search
CPC ........... H04N 5/23219; H04N 21/8133; H04N 21/816; H04N 21/84; G06K 9/00348; G06K 9/003442
See application file for complete search history.

(56) References Cited

U.S. PATENT DOCUMENTS 4,182,315 A * 1/1980 Vas .......................... A61B 5/05
600/500
5,502,482 A * 3/1996 Graham .................... G06T 7/20
348/140
(Continued)

FOREIGN PATENT DOCUMENTS

| JP | 2010-198595 A | 9/2010 |
| JP | 2014-183931 A | 10/2014 |
| WO | 2014/073454 A1 | 5/2014 |

*Primary Examiner* — Pankaj Kumar
*Assistant Examiner* — Timothy R Newlin
(74) *Attorney, Agent, or Firm* — Michael Best & Friedrich LLP

(57) ABSTRACT

Accurate motion detection is performed by discriminating whether a sensor detecting an object motion is mounted on a human body or not, and processing is executed with respect to metadata based on the result. Sensor information according to the motion is input from the sensor, and a sensor mounting position is determined. A sensor mounting position detection unit calculates a ratio between a high-frequency component and a low-frequency component included in the sensor information, and discriminates whether the sensor is mounted on the human body or is mounted on other than the human body, on the basis of the calculated ratio. A metadata generating unit inputs user motion detection information obtained by executing a motion detection algorithm assuming a sensor mounting position coincident with a sensor mounting position detection result, and generates the shot image corresponding metadata.

16 Claims, 37 Drawing Sheets

(51) Int. Cl.
  *G06K 9/20* (2006.01)
  *H04N 5/91* (2006.01)

(56) References Cited

U.S. PATENT DOCUMENTS

| | | | | |
|---|---|---|---|---|
| 5,617,143 | A * | 4/1997 | Shimokoriyama | H04N 5/144 348/700 |
| 5,881,321 | A * | 3/1999 | Kivolowitz | H04N 5/222 348/61 |
| 6,292,215 | B1 * | 9/2001 | Vincent | G01C 11/02 348/169 |
| 6,741,652 | B1 * | 5/2004 | Kondo | G01S 3/7864 348/208.4 |
| 8,081,682 | B1 * | 12/2011 | Carbacea | H04N 19/176 375/240.24 |
| 2001/0007469 | A1 * | 7/2001 | Fuchimukai | H04N 5/772 348/208.99 |
| 2003/0043369 | A1 * | 3/2003 | Smith | G01N 21/88 356/237.4 |
| 2004/0117815 | A1 * | 6/2004 | Kondo | G10L 17/26 725/12 |
| 2004/0246124 | A1 * | 12/2004 | Reilly | G01S 13/56 340/511 |
| 2005/0134745 | A1 * | 6/2005 | Bacche | H04N 5/144 348/702 |
| 2005/0179908 | A1 * | 8/2005 | Wada | G01F 1/663 356/496 |
| 2008/0009685 | A1 * | 1/2008 | Kim | A61B 5/11 600/300 |
| 2008/0146366 | A1 * | 6/2008 | Miesak | A63B 24/0003 473/221 |
| 2009/0128564 | A1 * | 5/2009 | Okuno | G06T 19/006 345/427 |
| 2010/0103173 | A1 * | 4/2010 | Lee | G01S 3/7864 345/427 |
| 2010/0259473 | A1 * | 10/2010 | Sakata | G06F 3/017 345/156 |
| 2011/0058787 | A1 * | 3/2011 | Hamada | G11B 27/10 386/224 |
| 2011/0075042 | A1 * | 3/2011 | Wang | G06T 5/002 348/669 |
| 2014/0240454 | A1 * | 8/2014 | Hirata | H04N 5/23232 348/38 |
| 2015/0241979 | A1 * | 8/2015 | Nakanishi | H04N 21/8456 345/156 |
| 2015/0355462 | A1 * | 12/2015 | Saito | G02B 27/017 345/419 |
| 2016/0205317 | A1 * | 7/2016 | Kimura | G06K 9/00342 348/211.6 |
| 2018/0001141 | A1 * | 1/2018 | Curry | G06K 9/209 |
| 2018/0053438 | A1 * | 2/2018 | Moriguchi | G06T 11/60 |
| 2019/0318171 | A1 * | 10/2019 | Wang | G06K 9/00771 |

\* cited by examiner

FIG. 9
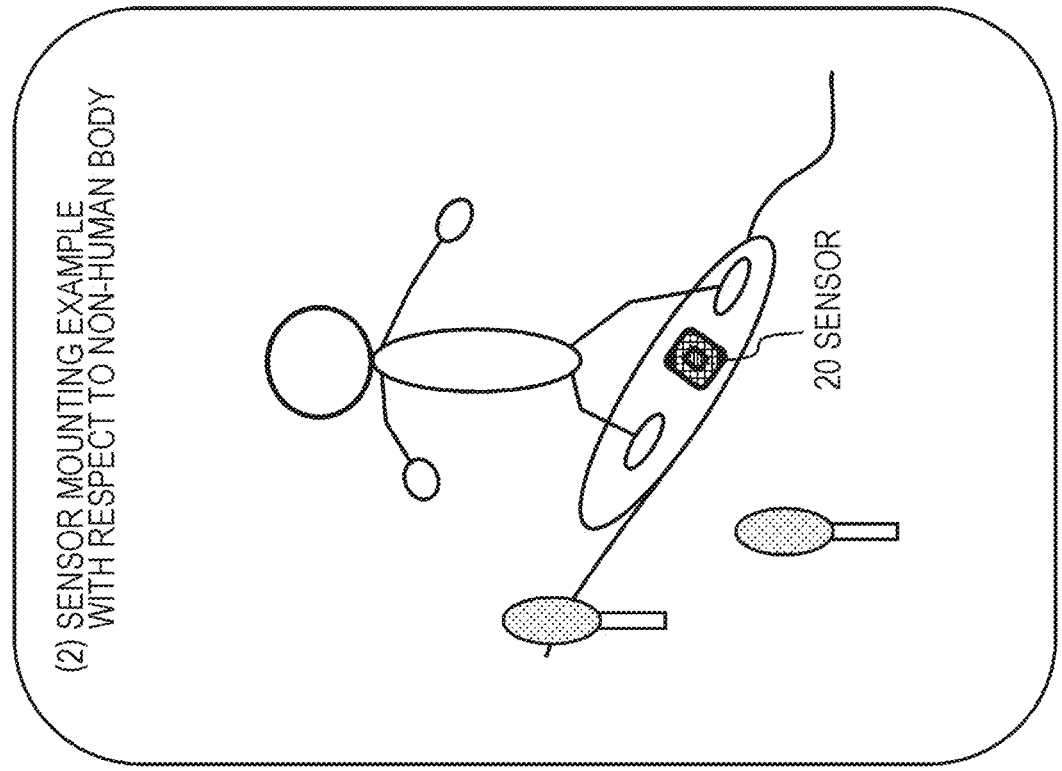
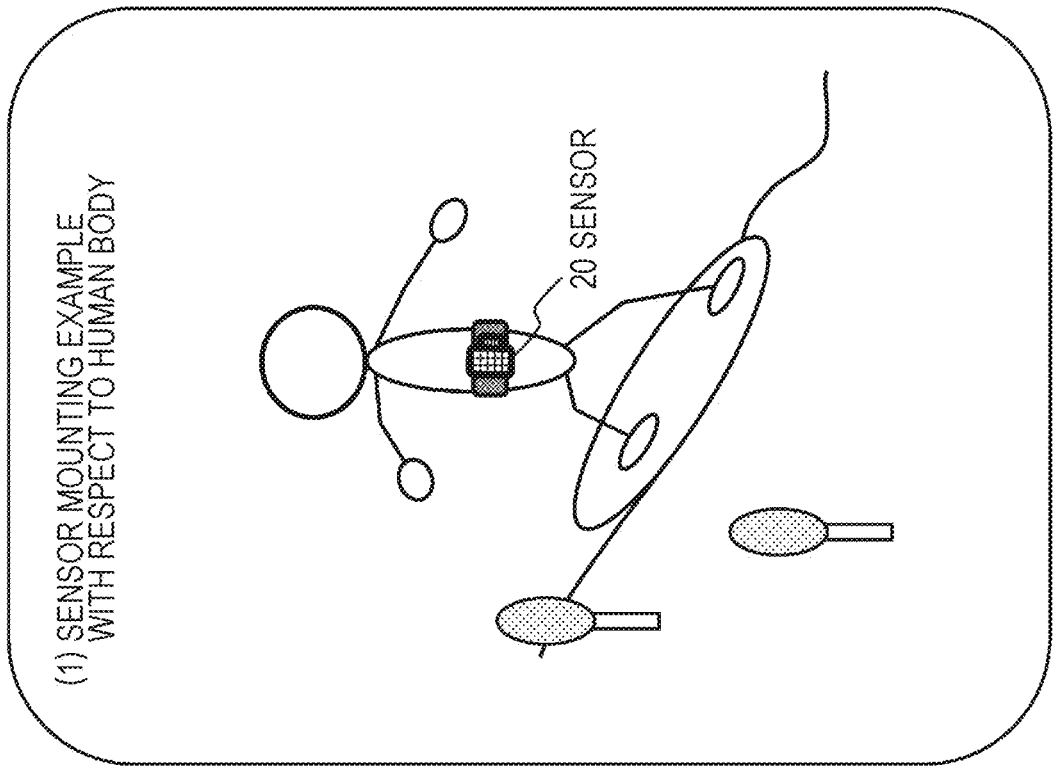

FIG. 10

| TEST TARGET SPORT | (1) BICYCLE | | (2) KITE SURFING | |
|---|---|---|---|---|
| SENSOR MOUNTING POSITION | (1p) HUMAN BODY (FOR EXAMPLE: HEAD) | (1q) OTHER THAN HUMAN BODY (FOR EXAMPLE: HANDLE) | (2p) HUMAN BODY (FOR EXAMPLE: HEAD) | (2q) OTHER THAN HUMAN BODY (FOR EXAMPLE: SURF BOARD) |
| RATIO MEASUREMENT VALUE BETWEEN LOW-FREQUENCY COMPONENT (A) AND HIGH-FREQUENCY COMPONENT (B) OF SENSOR OUTPUT [B/A (AVERAGE)] | $0.3 \times 10^{-6}$ | $5.0 \times 10^{-6}$ | $0.3 \times 10^{-6}$ | $3.0 \times 10^{-6}$ |

FIG. 19
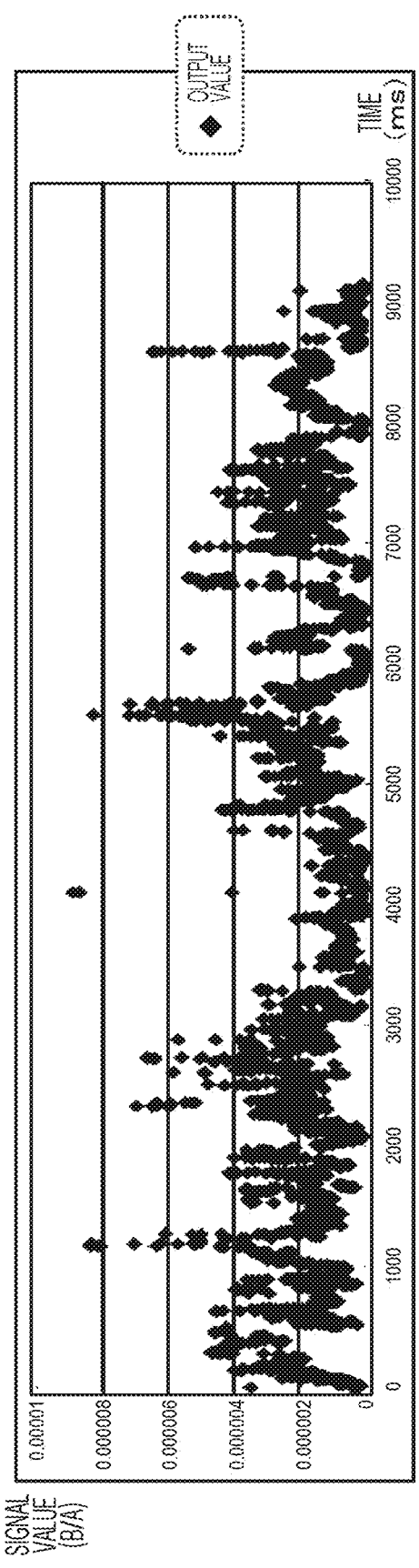
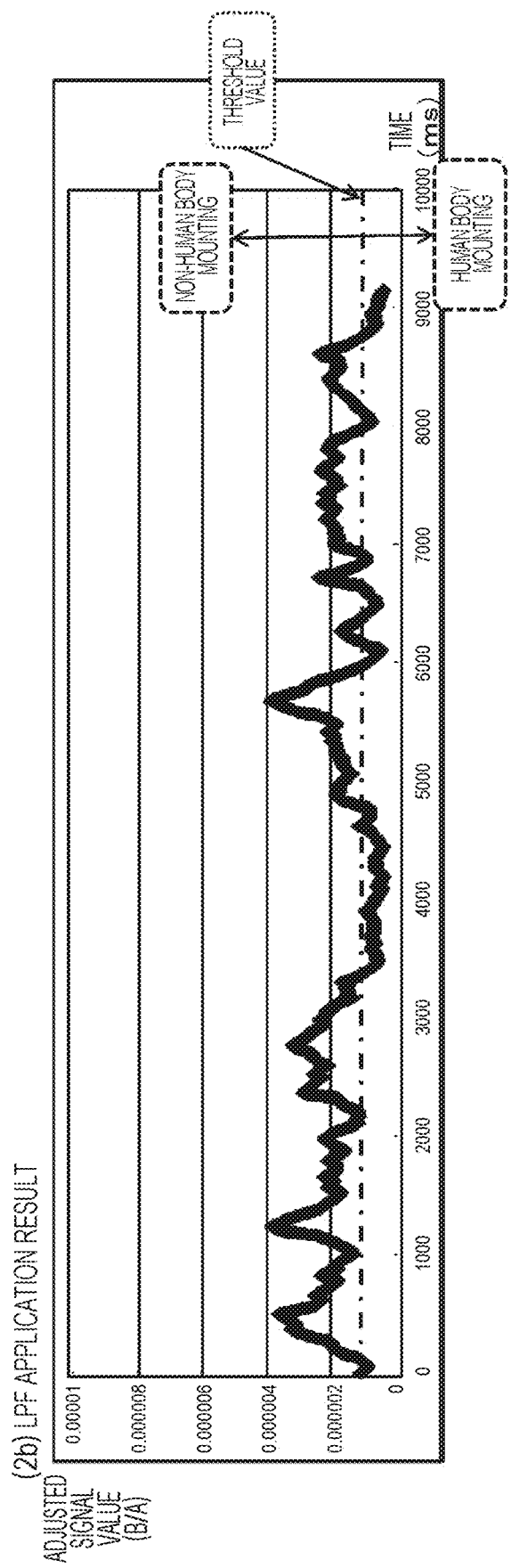

FIG. 21
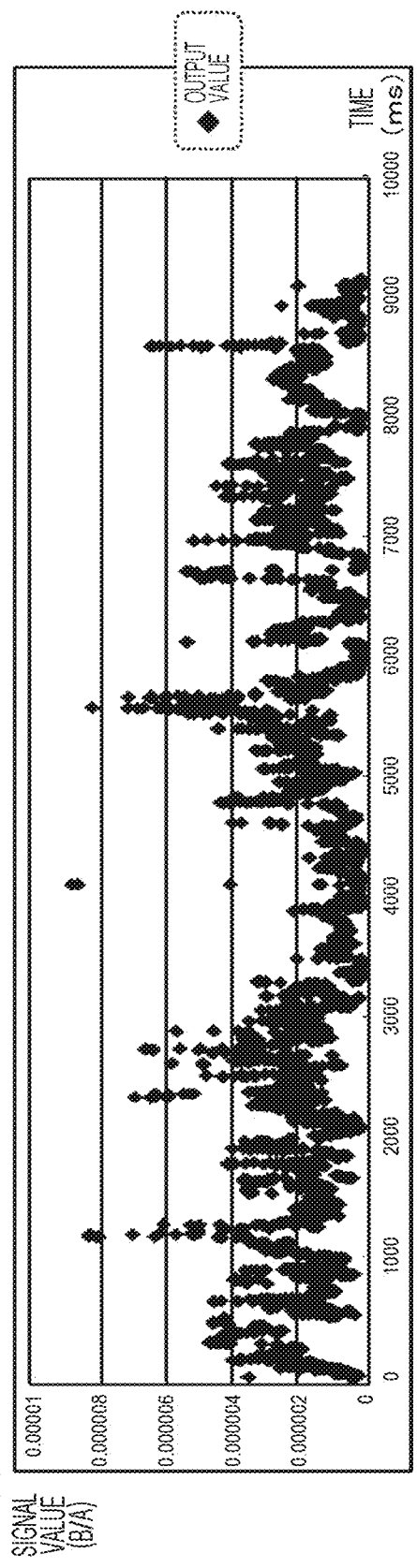
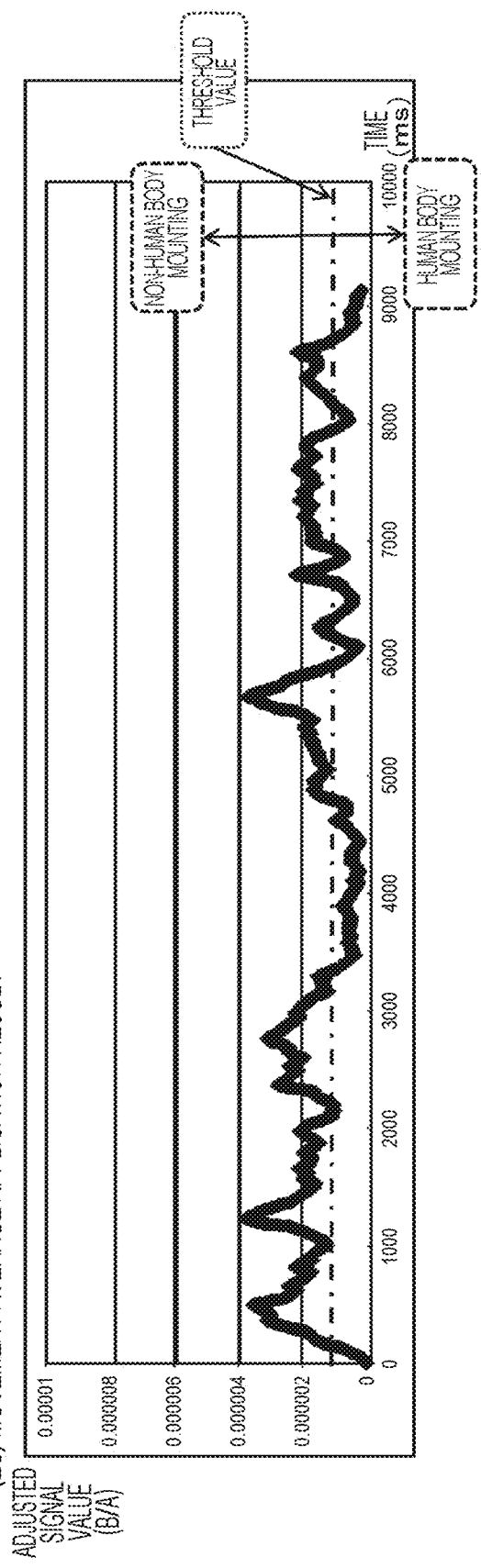

FIG. 24
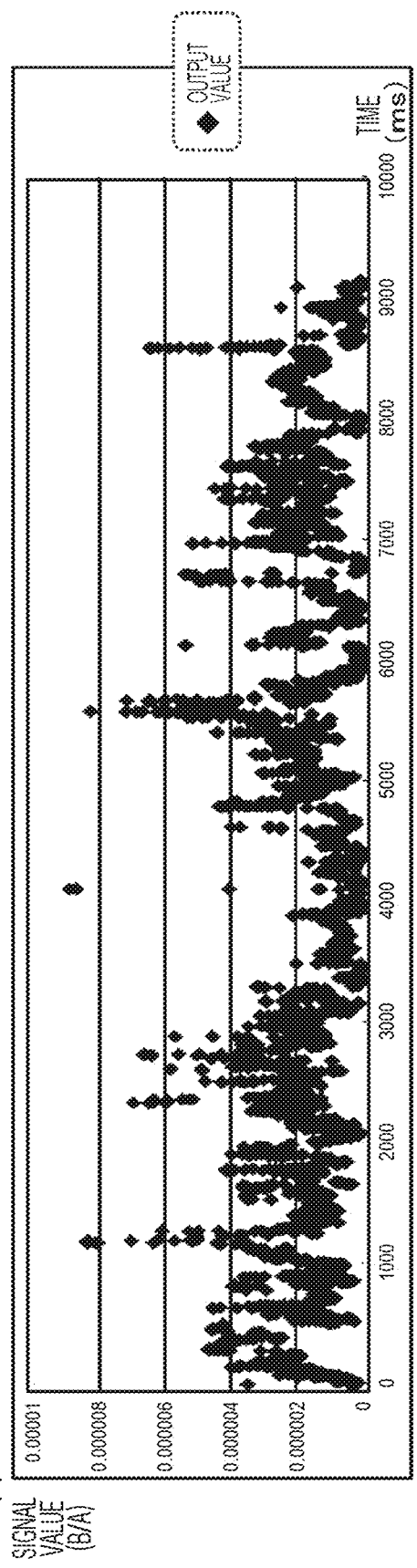
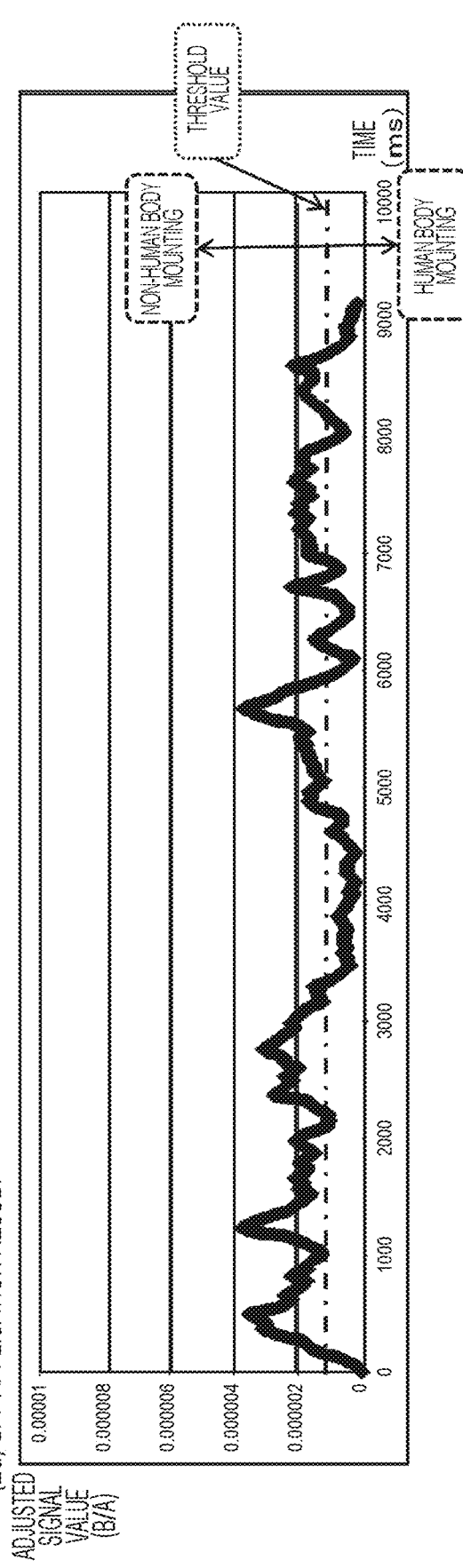

FIG. 27
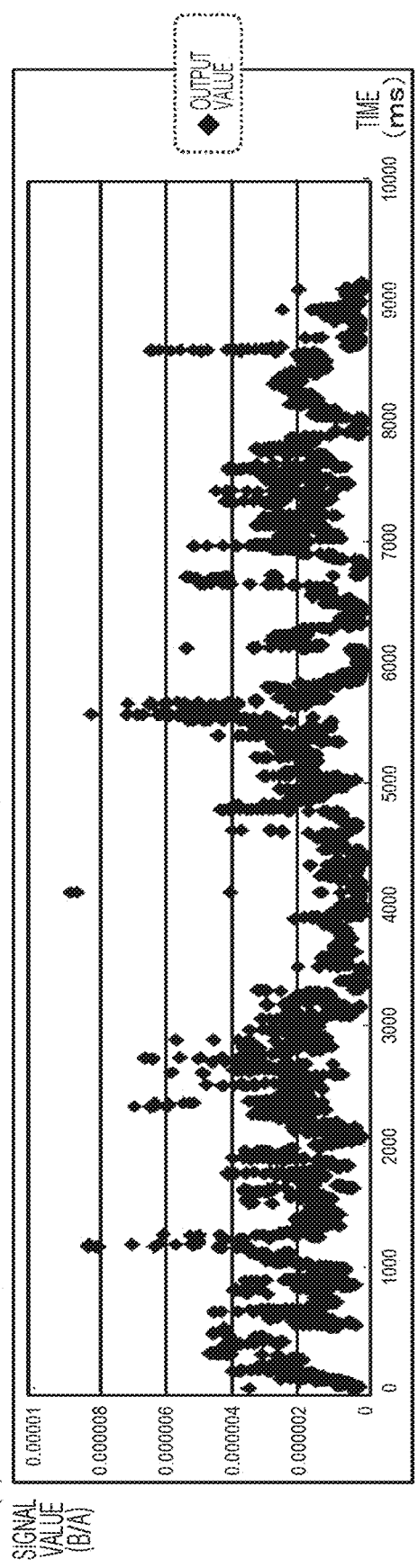
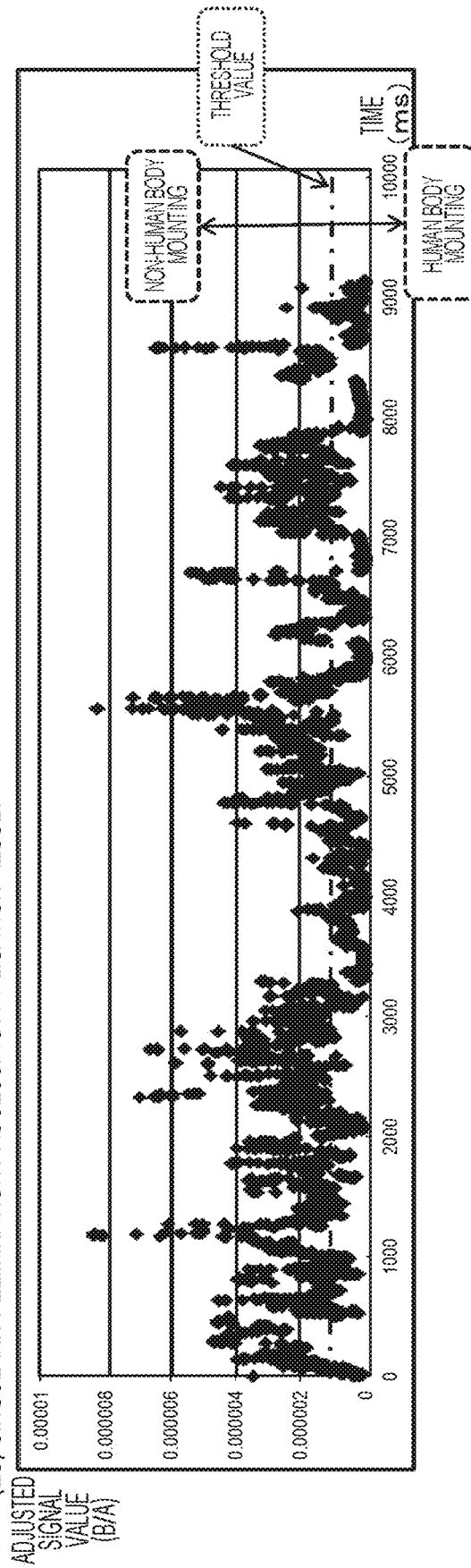

FIG. 29

| | SHOT IMAGE | METADATA |
|---|---|---|
| (1) | SHOOTING TIME 2015/12/12, 13:21:05 TO SHOOTING TIME 2015/12/12, 13:21:12 | ACTION TYPE: JUMP<br>ACTION START TIME: 2015/12/12, 13:21:05<br>ACTION END TIME: 2015/12/12, 13:21:12<br>ACTION SCORE: 72 |
| (2) | SHOOTING TIME 2015/12/12, 13:22:18 TO SHOOTING TIME 2015/12/12, 13:22:22 | ACTION TYPE: TURN<br>ACTION START TIME: 2015/12/12, 13:22:18<br>ACTION END TIME: 2015/12/12, 13:22:22<br>ACTION SCORE: 81 |

FIG. 34
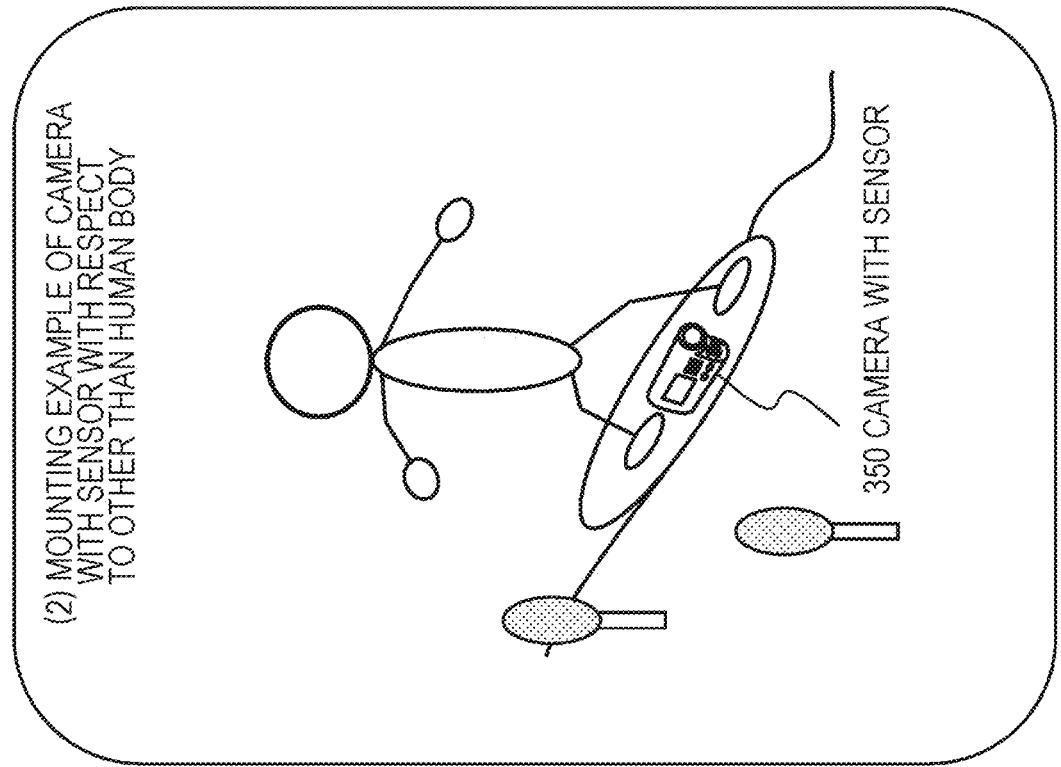
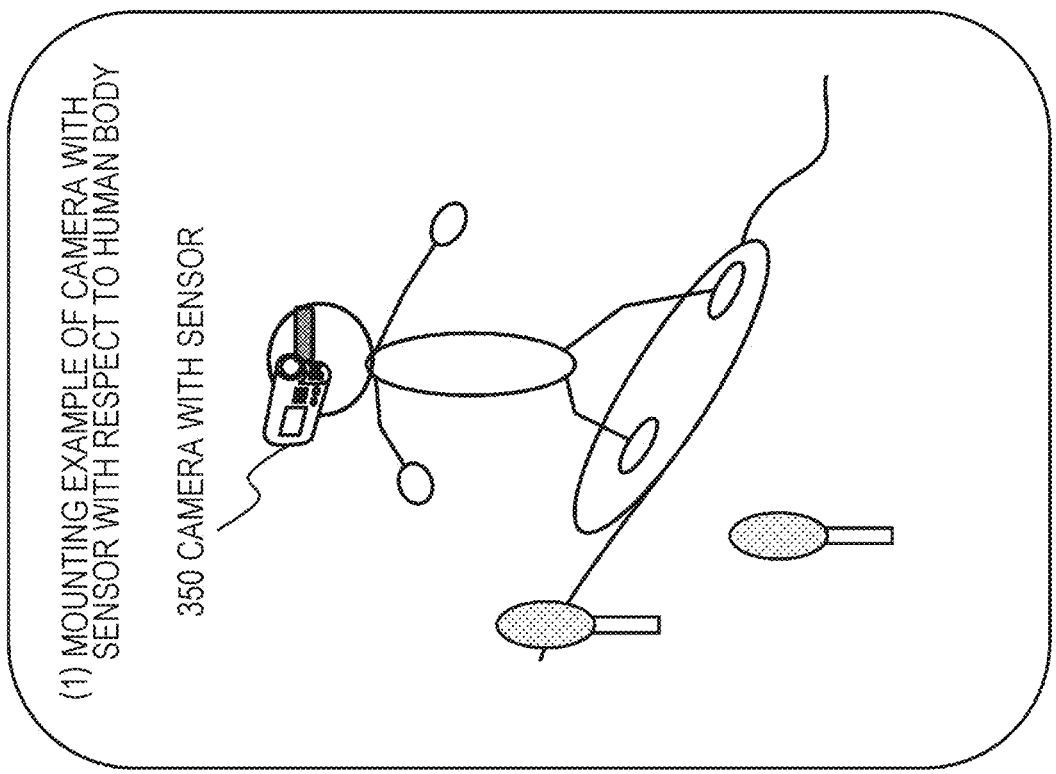

INFORMATION PROCESSOR, INFORMATION PROCESSING SYSTEM, AND INFORMATION PROCESSING METHOD, AND PROGRAM

TECHNICAL FIELD

The present disclosure relates to an information processor, an information processing system, and an information processing method, and a program. More specifically, the present disclosure relates to an information processor, an information processing system, and an information processing method, and a program, in which a scene of interest or the like, included in a shot image of a camera, can be identified by using sensor acquisition information.

BACKGROUND ART

Recently, a reduction in size and weight of a digital camera or a digital video camera has progressed, and use and development of a camera having a communication function have progressed.

On the other hand, it takes time to search a scene of interest from a video shot by using a camera.

For example, a camera or an application performing processing of extracting an image including a smiley face by using a smiley face detection function or the like is used as a technology which can be applied to scene search processing.

However, for example, a technology has not been sufficiently developed with respect to a configuration of efficiently realizing extraction prosessing of a scene in which a user performs a specific motion.

Furthermore, various technologies of detecting a motion of a user by a sensor mounted on the user have been proposed. For example, in Patent Document 1 (Japanese Patent Application Laid-Open No. 2010-198595), an information processor including an action determination unit configured to detect a specific action from a user action identified from sensor data is described.

CITATION LIST

Patent Document

Patent Document 1: Japanese Patent Application Laid-Open No. 2010-198595

SUMMARY OF THE INVENTION

Problems to be Solved by the Invention

An object of the present disclosure, for example, is to provide an information processor, an information processing system, and an information processing method, and a program in which extraction processing of a scene of interest from a camera shot image can be efficiently performed, and extraction processing of a scene in which a user performs a specific motion, is efficiently realized by using sensor detection information.

Solutions to Problems

A first aspect of the present disclosure is
an information processor, including a mounting position detection unit configured to detect a mounting position of a device on the basis of sensor data of a sensor provided in the device.

Furthermore, a second aspect of the present disclosure is
an information processing system including:
a sensor configured to output sensor detection information according to a motion of amounting body, the sensor being mounted on a human body of a user or mounted on other than the human body, the human body being an object becoming an image shooting target; and
a video camera configured to execute image shooting,
in which the video camera includes:
a mounting position detection unit configured to input the sensor detection information from the sensor, and to execute sensor mounting position determination processing;
an action detection unit configured to input the sensor detection information, and to analyze a motion of the user; and
a metadata generating unit configured to input detection information of the action detection unit, and to generate shot image corresponding metadata,
the mounting position detection unit calculates a ratio between a high-frequency component and a low frequency component included in the sensor detection information, and executes discrimination processing of whether the sensor is mounted on the human body or is mounted on other than the human body, on the basis of the calculated ratio, and
the metadata generating unit inputs user motion detection information obtained by executing a motion detection algorithm assuming a sensor mounting position coincident with a detection result of the mounting position detection unit, and generates the shot image corresponding metadata.

Furthermore, a third aspect of the present disclosure is
an information processing system including:
a sensor configured to output sensor detection information according to a motion of a mounting body, the sensor being mounted on a human body of a user or mounted on other than the human body, the human body being an object becoming an image shooting target;
a video camera configured to execute image shooting; and
a server configured to receive the sensor detection information from the sensor, and to receive a shot image from the video camera,
in which the server includes:
a mounting position detection unit configured to input the sensor detection information from the sensor, and to execute sensor mounting position determination processing;
an action detection unit configured to input the sensor detection information, and to analyze a motion of the user; and
a metadata generating unit configured to input detection information of the action detection unit, and to generate shot image corresponding metadata,
the mounting position detection unit calculates a ratio between a high-frequency component and a low-frequency component included in the sensor detection information, and executes discrimination processing of whether the sensor is mounted on the human body or is mounted on other than the human body, on the basis of the calculated ratio, and
the metadata generating unit inputs user motion detection information obtained by executing a motion detection algorithm assuming a sensor mounting position coincident with a detection result of the mounting position detection unit, and generates the shot image corresponding metadata received from the video camera.

Furthermore, a fourth aspect of the present disclosure is
an information processing method executed in an information processor, in which the information processor detects a mounting position of a device, on the basis of sensor data of a sensor provided in the device.

Furthermore, a fifth aspect of the present disclosure is a program allowing an information processor to execute information processing, in which the information processor includes:

a mounting position detection unit configured to input sensor detection information according to a motion of a sensor mounting body from a sensor mounted on a human body of a user or mounted on other than the human body, the human body being an object becoming an image shooting target, and to execute sensor mounting position determination processing;

an action detection unit configured to input the sensor detection information from the sensor, and to analyze a motion of the user; and a metadata generating unit configured to input detection information of the action detection unit, and to generate shot image corresponding metadata, and the program allows, the mounting position detection unit to calculate a ratio between a high-frequency component and a low-frequency component included in the sensor detection information, and to execute discrimination processing of whether the sensor is mounted on the human body or is mounted on other than the human body, on the basis of the calculated ratio, and the metadata generating unit to input user motion detection information obtained by executing a motion detection algorithm assuming a sensor mounting position coincident with a detection result of the mounting position detection unit, and to generate the shot image corresponding metadata.

Furthermore, a program of the present disclosure, for example, is a program which can be provided by a storage medium and a communication medium in a computer-readable format, with respect to an information processor or a computer and a system, in which various programs and codes can be executed. Such a program is provided in a computer-readable format, and thus, processing according to the program is realized on the information processor or the computer and the system.

Other objects, characteristics, or advantages of the present disclosure will be obvious by detailed description based on examples of the present disclosure, as described later or the attached drawings. Furthermore, herein, a system has a logical set configuration of a plurality of devices, and the present disclosure is not limited to the system in which the devices of each configuration are in the same housing.

Effects of the Invention

According to the configuration of one example of the present disclosure, accurate motion detection is performed by discriminating whether the sensor detecting the object motion is mounted on the human body or is mounted on other than the human body, and the generating and recording processing of the metadata based on the detection result is realized.

Specifically, the sensor information according to the motion is input from the sensor which is mounted on a human body or is mounted on other than the human body of a shooting target user, and the sensor mounting position is determined. Further, the sensor information is input, the user motion is analyzed, and the shot image corresponding metadata is generated. The sensor mounting position detection unit calculates the ratio between the high-frequency component and the low-frequency component included in the sensor information, and discriminates whether the sensor is mounted on the human body or is mounted on other than the human body, on the basis of the calculated ratio. The metadata generating unit inputs the user motion detection information obtained by executing the motion detection algorithm assuming the sensor mounting position coincident with the sensor mounting position detection result, and generates the shot image corresponding metadata.

According to this configuration, accurate motion detection is performed by discriminating whether the sensor detecting the object motion is mounted on the human body or is mounted on other than the human body, and the generating and recording processing of the metadata based on the detection result is realized.

Furthermore, the effects described herein are merely an example, the present disclosure is not limited thereto, and additional effects may be obtained.

BRIEF DESCRIPTION OF DRAWINGS

FIG. 9 is a diagram illustrating an example of a mounting position of a sensor.

FIG. 10 is a diagram illustrating an example of a difference in sensor output according to a sensor mounting position.

FIG. 19 is a diagram illustrating an example of a processing result of the sensor mounting position determination unit to which the low-pass filter is applied.

FIG. 21 is a diagram illustrating an example of a processing result of the sensor mounting position determination unit to which the movement average calculation unit is applied.

FIG. 24 is a diagram illustrating an example of a processing result of the sensor mounting position determination unit to which the bandpass filter is applied.

FIG. 27 is a diagram illustrating an example of a processing result of the sensor mounting position determination unit to which the singularity elimination processing is applied.

FIG. 29 is a diagram illustrating an example of metadata generated by applying the sensor mounting position determination processing using the sensor detection result.

FIG. 34 is a diagram illustrating a variation example of a mounting position of a video camera with a built-in sensor.

FIG. 37 is a diagram illustrating a hardware configuration example configuring a video camera, a sensor, a server, a PC, or the like.

MODE FOR CARRYING OUT THE INVENTION

Hereinafter, an information processor, an information processing system, and an information processing method, and a program of the present disclosure will be described in detail, with reference to the drawings. Furthermore, the description will be performed according to the following items.

1. Outline of Processing Executed by Information Processor of Present Disclosure
2. Analysis Result of Change in Sensor Output Signal according to Sensor Mounting Position
3. Configuration of Determining Sensor Mounting Position and of Executing Analysis according to Mounting Position
4. Configuration Example and Processing Example of Sensor Mounting Position Detection Unit
5. Example of Sensor Mounting Position Determination Sequence
6. Other Examples
6-(1) Configuration Example of Sensor Mounting Position Determination Unit to which Low-Pass Filter is Applied
6-(2) Configuration Example of Sensor Mounting Position Determination Unit to which Movement Average Calculation Unit is Applied
6-(3) Configuration Example of Sensor Mounting Position Determination Unit to which Bandpass Filter (BPF) is Applied
6-(4) Configuration Example of Sensor Mounting Position Determination Unit to which Singularity Elimination Processing Unit is Applied
7. Communication between Devices and Data Processing Sequence
7-(1) Example in which Video Camera Executes Data Processing such as Sensor Mounting Position Determination Processing
7-(2) Example in which Sensor Device Executes Data Processing such as Sensor Mounting Position Determination Processing
7-(3) Example in which Server Executes Data Processing such as Sensor Mounting Position Determination Processing
8. Example in which Sensor is Mounted on Video Camera
9. Other Examples
10. Configuration of Information Processor Other than Video Camera and Sensor
11. Conclusion of Configuration of Present Disclosure

[1. Outline of Processing Executed by Information Processor of Present Disclosure]

First, an outline of processing executed by an information processor of the present disclosure will be described with reference to FIG. 1 and the like.

Figure 1:
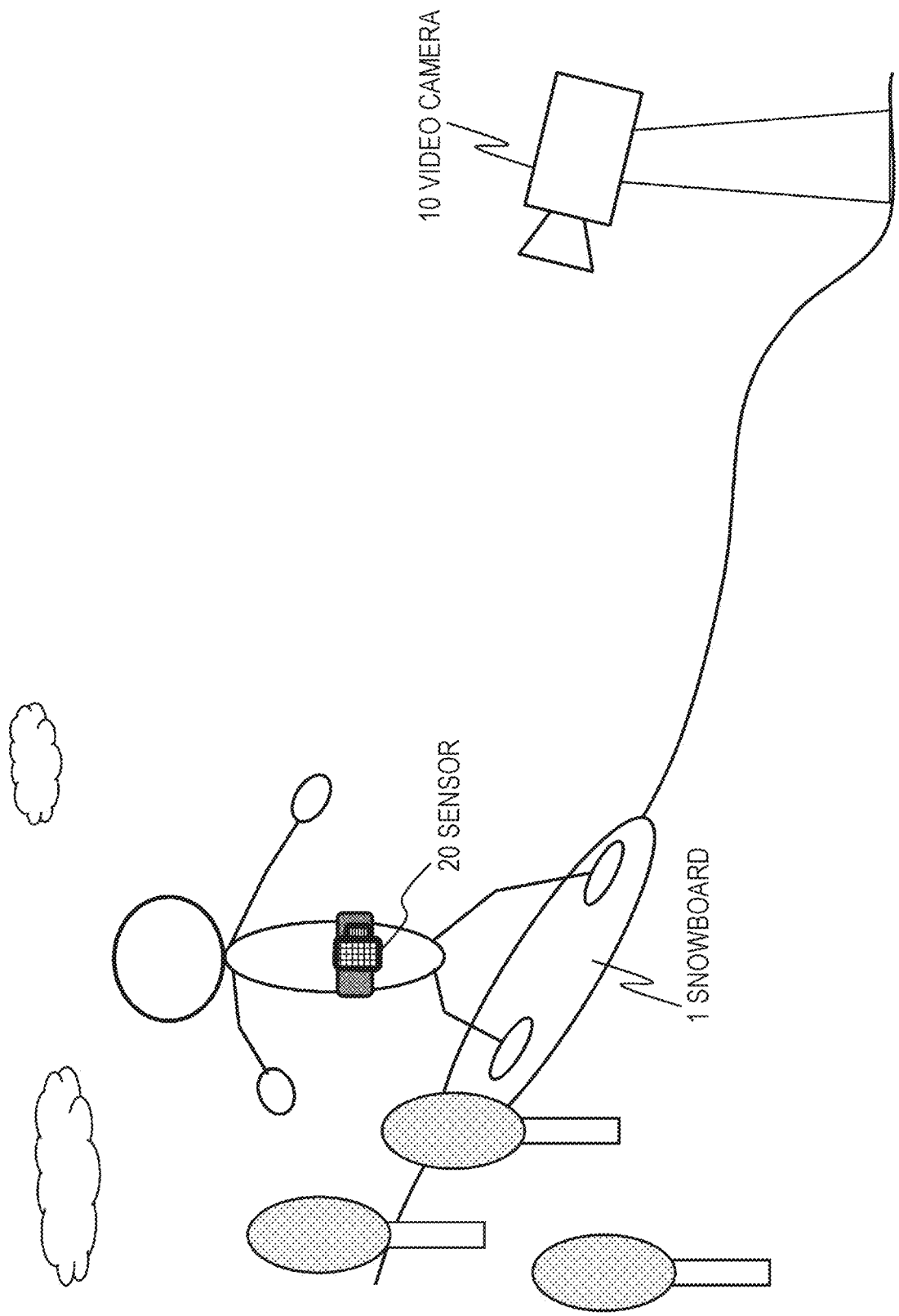
FIG. 1 is a diagram illustrating an outline of a configuration and processing of the present disclosure.

FIG. 1 illustrates a video camera 10 as an imaging device shooting an image, and a sensor 20 mounted on an object of the video camera 10. It is assumed that the object provided with the sensor 20 is on a snowboard 1, and is sliding down the snow, and the video camera 10 is shooting the object.

The sensor 20, for example, includes a gyro sensor which is capable of measuring an angular rate in a rotation direction around three axes of X, Y, and Z, an acceleration rate sensor which is capable of measuring an acceleration rate in a three-axis direction, and the like.

The sensor 20 and the video camera 10, for example, perform data communication according to Wi-Fi communication, Bluetooth (BT (registered trademark)) communication, or the like, and sensor detection information of the sensor 20 is sequentially transmitted to the video camera 10.

The video camera 10 records a shot image in a storage unit, and analyzes a timing of performing the motion of the object, for example, a specific motion such as a jump or a turn performed by the object, on the basis of the sensor detection information received from the sensor 20.

Further, processing of storing an analysis result thereof in the storage unit along with the image, as metadata corresponding to the shot image.

Figure 2:
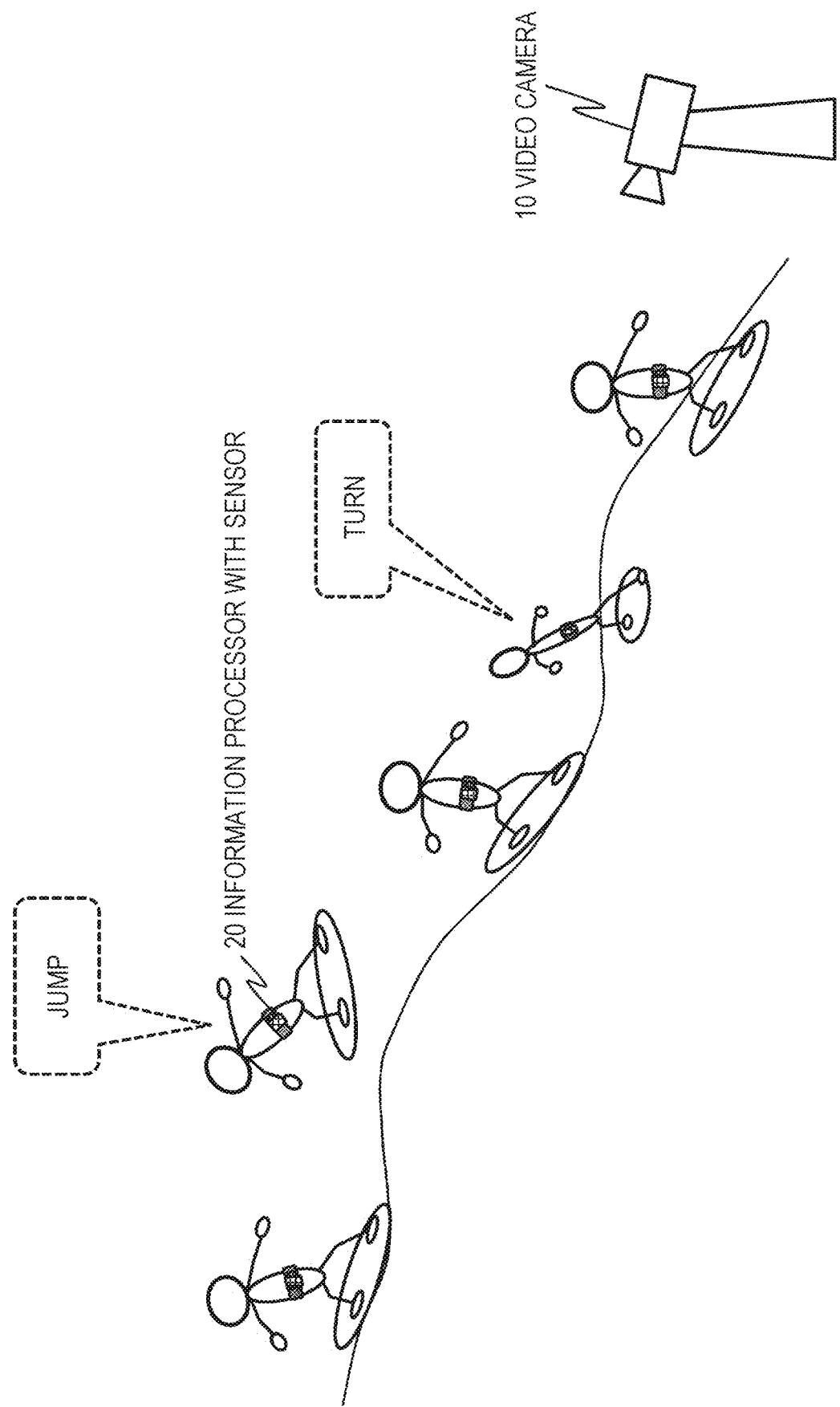
FIG. 2 is a diagram illustrating the outline of the configuration and the processing of the present disclosure.

FIG. 2 is a diagram illustrating an example of the motion of the object provided with the sensor 20.

The object who is on the snowboard and slides down a snow mountain, jumps at a certain timing, and turns at another timing.

Motion information of the user according to such a specific action of the object, that is, jump processing or turn processing is detected by the sensor 20. The sensor detection information is transmitted to the video camera 10 from the sensor 20.

The outline of the processing which is executed by the video camera 10 will be described with reference to FIG. 3.

Figure 3:
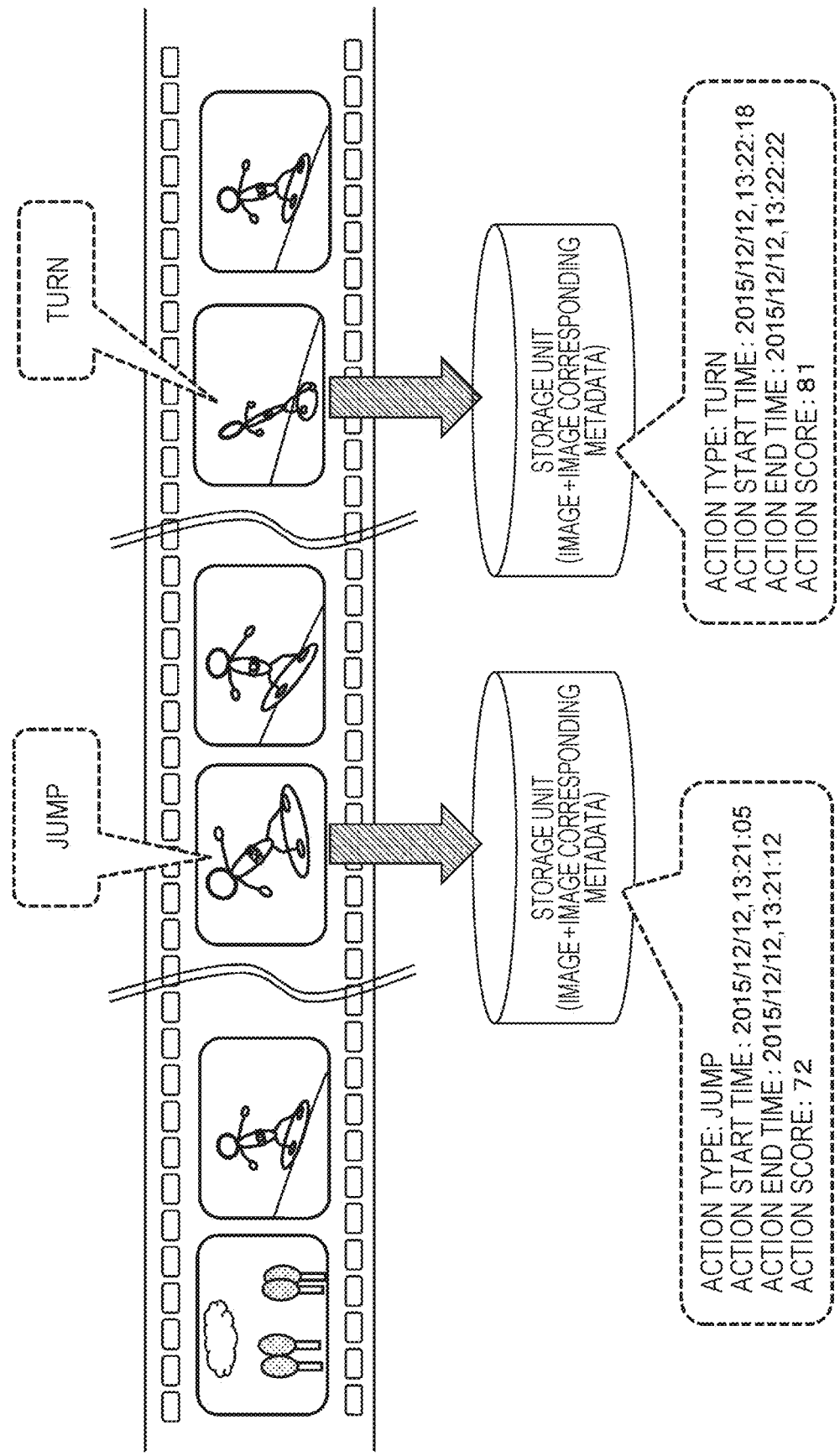
FIG. 3 is a diagram illustrating the outline of the configuration and the processing of the present disclosure.

As illustrated in FIG. 3, the video camera 10 shoots the object, and stores the shot image in the storage unit.

Further, the video camera 10 analyzes, for example, the timing of performing the motion of the object, that is, the timing at which the specific motion such as the jump or the turn is performed, on the basis of the sensor detection information received from the sensor 20, and executes the processing of storing the analysis result in the storage unit along with the image, as the metadata corresponding to the shot image.

As illustrated in FIG. 3, the video camera 10, for example, generates the following data and stores the data in the storage unit, as metadata corresponding to the jump processing.

(a) Action Type: jump
(b) Action Start Time: 2015/12/12, 13:21:05
(c) Action End Time: 2015/12/12, 13:21:12
(d) Action Score: 72
(a) Action Type: jump This is metadata indicating that the action performed by the object is a jump action.

(b) Action Start Time: 2015/12/12, 13:21:05
(c) Action End Time: 2015/12/12, 13:21:12

This is information of a start time and an end time of the jump.

(d) Action Score: 72

This, for example, is a score calculated by applying a score calculation algorithm defined in advance, on the basis of a height or the like of the jump, which is obtained from the sensor detection information.

In addition, the video camera 10, for example, generates the following data and stores the data in the storage unit, as metadata corresponding to the turn processing.

(a) Action Type: turn
(b) Action Start Time: 2015/12/12, 13:22:18
(c) Action End Time: 2015/12/12, 13:22:22
(d) Action Score: 81
(a) Action Type: turn This is metadata indicating that the action performed by the object is a turn action.

(b) Action Start Time: 2015/12/12, 13:22:18
(c) Action End Time: 2015/12/12, 13:22:22

This is information of a start time and an end time of the turn.

(d) Action Score: 81

This, for example, is a score calculated by applying a score calculation algorithm defined in advance, on the basis of an angle or the like of the turn, which is obtained from the sensor detection information.

The outline of the processing of the video camera 10 will be described with reference to FIG. 4.

Figure 4:
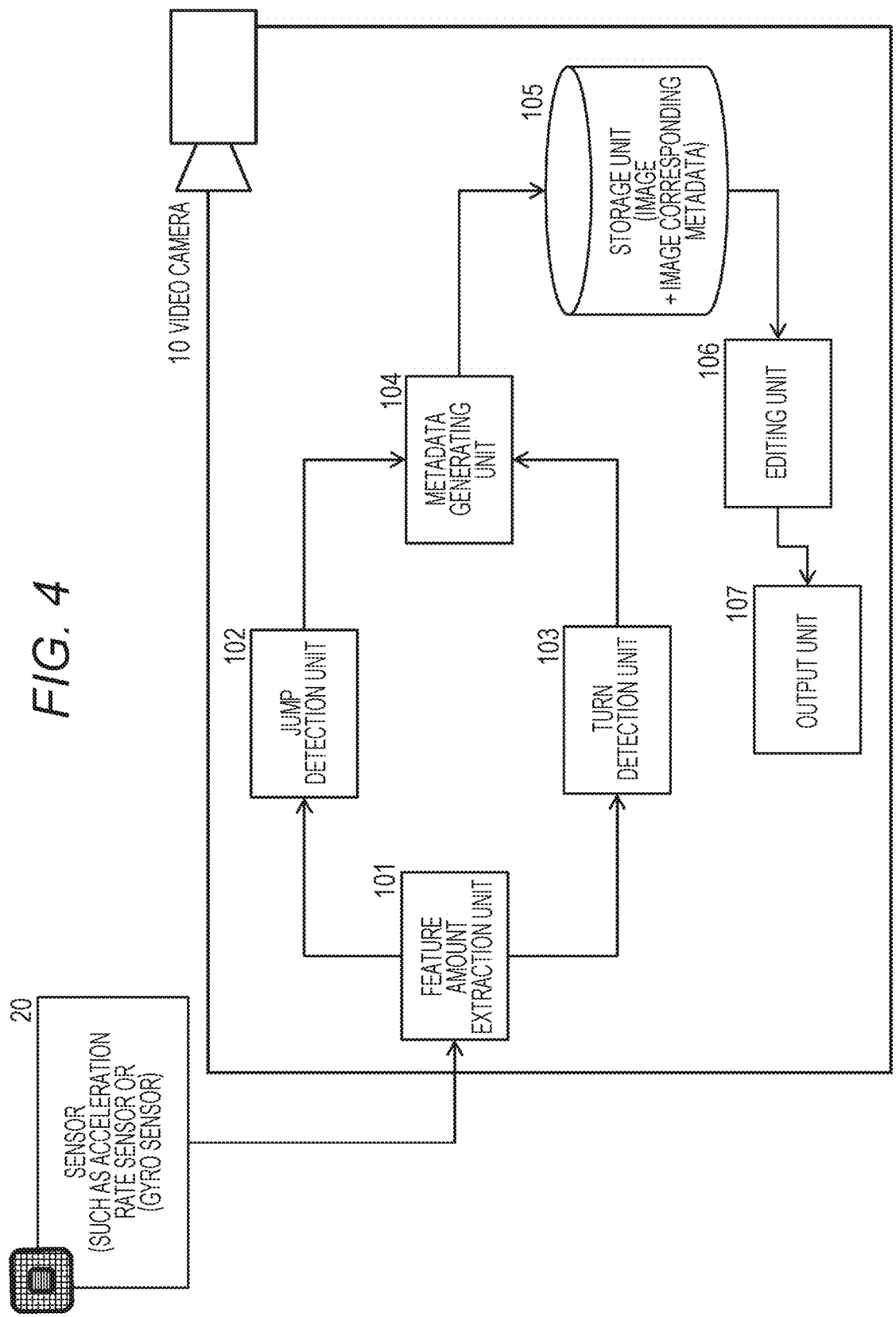
FIG. 4 is a diagram illustrating an outline of a configuration and processing of a video camera.

As illustrated in FIG. 4, the video camera 10 includes a feature amount extraction unit 101, a jump detection unit 102, a turn detection unit 103, a metadata generating unit 104, a storage unit 105, an editing unit 106, and an output unit 107.

Furthermore, the video camera 10 includes an imaging unit, and has basic functions as a video camera, such as encoding processing of the shot image. FIG. 4 is a diagram illustrating a partial configuration of the video camera executing processing relevant to generating and recording of metadata based on the sensor detection information.

The feature amount extraction unit 101 detects a feature amount from the sensor detection information which is received from the sensor 20. In this example, a feature amount valid for detecting the motion corresponding to the jump and the turn is extracted.

Specifically, examples of the feature amount include angular rate information corresponding to each of the axes of X, Y, and Z, which is a detection value of a gyro sensor, acceleration rate information of each of the axes of X, Y, and Z, which is a detection value from an acceleration rate sensor, information generated on the basis of such detection information, or the like.

The extracted feature amount data is output to the jump detection unit 102 and the turn detection unit 103.

The jump detection unit 102 analyzes time or the like when it is determined that the object jumps, on the basis of the data input from the feature amount extraction unit 101.

Similarly, the turn detection unit 103 analyzes time or the like when it is determined that the object turns, on the basis of the data input from the feature amount extraction unit 101.

The detected data of the jump detection unit 102 and the turn detection unit 103 is output to the metadata generating unit 104.

The metadata generating unit generates metadata and stores the metadata in the storage unit 105, on the basis of the detected data of the jump detection unit 102 and the turn detection unit 103.

The metadata generated by the metadata generating unit 104 is the metadata as described above with reference to FIG. 3. That is, for example, the following data is generated and is stored in the storage unit 105, as the metadata corresponding to the jump processing.

(a) Action Type: jump
(b) Action Start Time: 2015/12/12, 13:21:05
(c) Action End Time: 2015/12/12, 13:21:12
(d) Action Score: 72

Similarly, the following data is generated and is stored in the storage unit 105, as the metadata corresponding to the turn processing.

(a) Action Type: turn
(b) Action Start Time: 2015/12/12, 13:22:18
(c) Action End Time: 2015/12/12, 13:22:22
(d) Action Score: 81

The metadata generating unit 104 stores such metadata in association with the corresponding image frame of the shot Image of the video camera 10.

That is, jump corresponding metadata is recorded in association with an image frame obtained by shooting a jump scene.

Similarly, turn corresponding metadata is recorded in association with an image frame obtained by shooting a turn scene.

Time information synchronized with both of the shot image and the sensor detection information is associated with the shot image and the sensor detection information, and the shot image and the metadata corresponding to the shot image are acquired according to the time information, and are stored in the storage unit 105 in association with the image and the corresponding metadata.

In the image stored in the storage unit 105, for example, image search is performed by using the information recorded in the metadata as a search index, and thus, the jump scene or the turn scene can be easily and accurately extracted.

The editing unit 106 is capable of efficiently performing selective display of a highlight scene of an image, or extraction processing or editing processing of digest data or the like in which only the highlight scenes of the image are collected, by using such metadata.

In the editing unit 106, the data which is extracted or edited on the basis of the metadata, for example, is output to the output unit 107 including a display unit or the like.

The image displayed on the output unit (the display unit) 107, for example, is a digest image in which powerful image scenes such as the jump scene or the turn scene are collected.

Next, an example of jump detection processing in the jump detection unit 102 and turn detection processing in the turn detection unit 103, using the feature amount acquired by the feature amount extraction unit 101, will be described with reference to FIG. 5 and FIG. 6.

Figure 5:
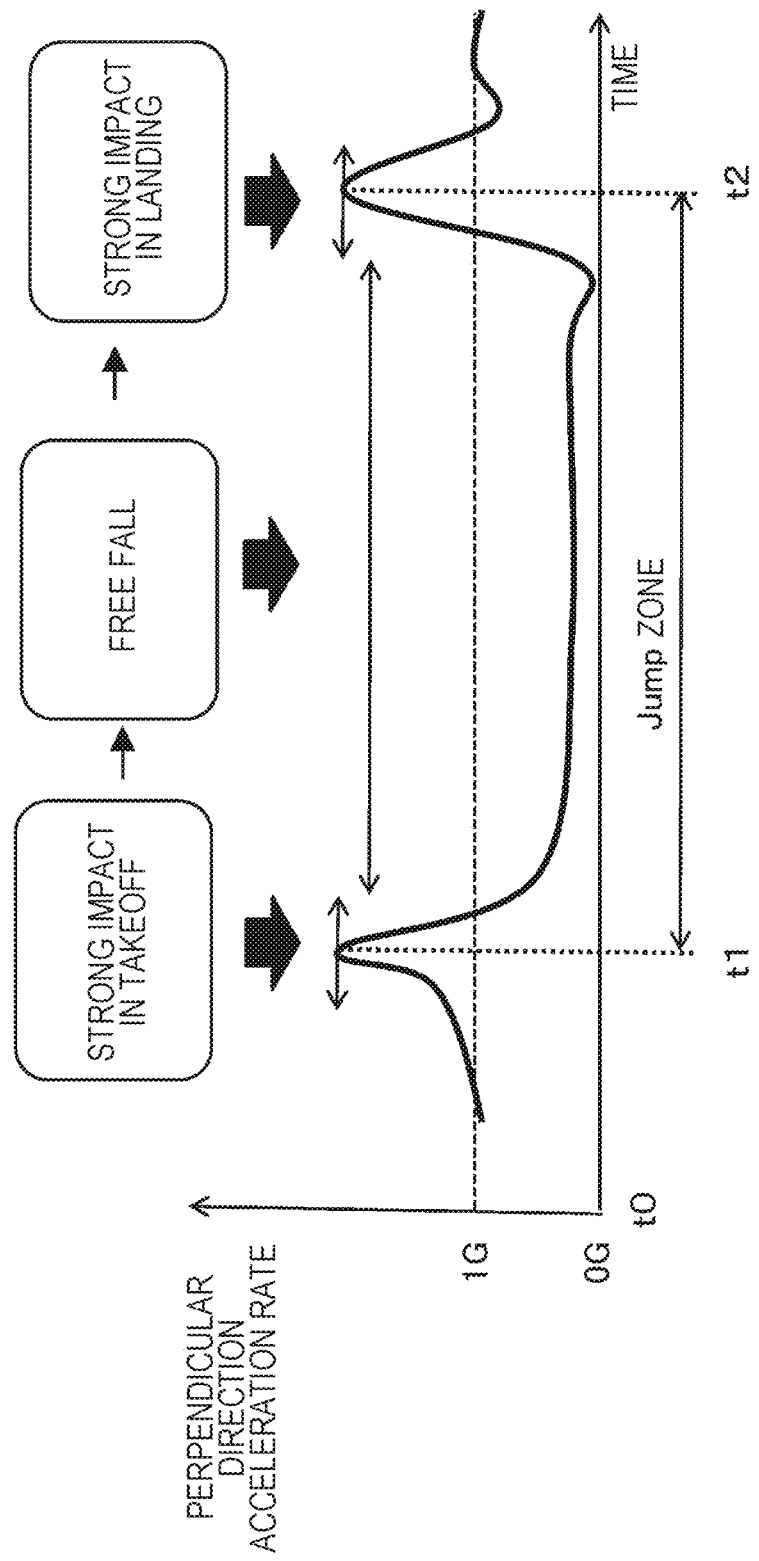
FIG. 5 is a diagram illustrating an example of jump detection processing.

FIG. 5 is a diagram illustrating an example of the jump detection processing in the jump detection unit 102 using the feature amount acquired by the feature amount extraction unit 101.

The example illustrated in FIG. 5 illustrates a jump detection processing example to which perpendicular direction acceleration rate information, which is one detection information item in the sensor detection information, is applied.

A graph illustrated in FIG. 5 is a graph in which a horizontal axis is time (t), and a vertical axis is a perpendicular direction acceleration rate detected by the sensor 20.

In a case where the object provided with the sensor 20 performs the jump processing, the perpendicular direction acceleration rate is rapidly changed.

Time t1 illustrated in FIG. 5 corresponds to the start time of the jump.

At the time t1, the perpendicular direction acceleration rate rapidly increases, and it is determined that the object starts the jump at the time t1.

In addition, time t2 illustrated in FIG. 5 corresponds to the end time of the jump.

At the time t2, the perpendicular direction acceleration rate rapidly decreases, and it is determined that the object ends the jump at the time t2.

In the example illustrated in FIG. 5, the times t1 and t2 are a jump period.

As illustrated in FIG. 5, the jump detection unit 102 illustrated in FIG. 4, for example, analyzes a change in the perpendicular direction acceleration rate, and detects the jump processing.

Furthermore, the example illustrated in FIG. 5 is a processing example only using the perpendicular direction acceleration rate, but it is possible to analyze various motions of the user, for example, the height of the jump, the direction of the jump, or the like, by using the other sensor detection information.

An analysis result thereof is output to the metadata generating unit 105, and the metadata generating unit 105 generates the metadata on the basis of the analysis result.

Figure 6:
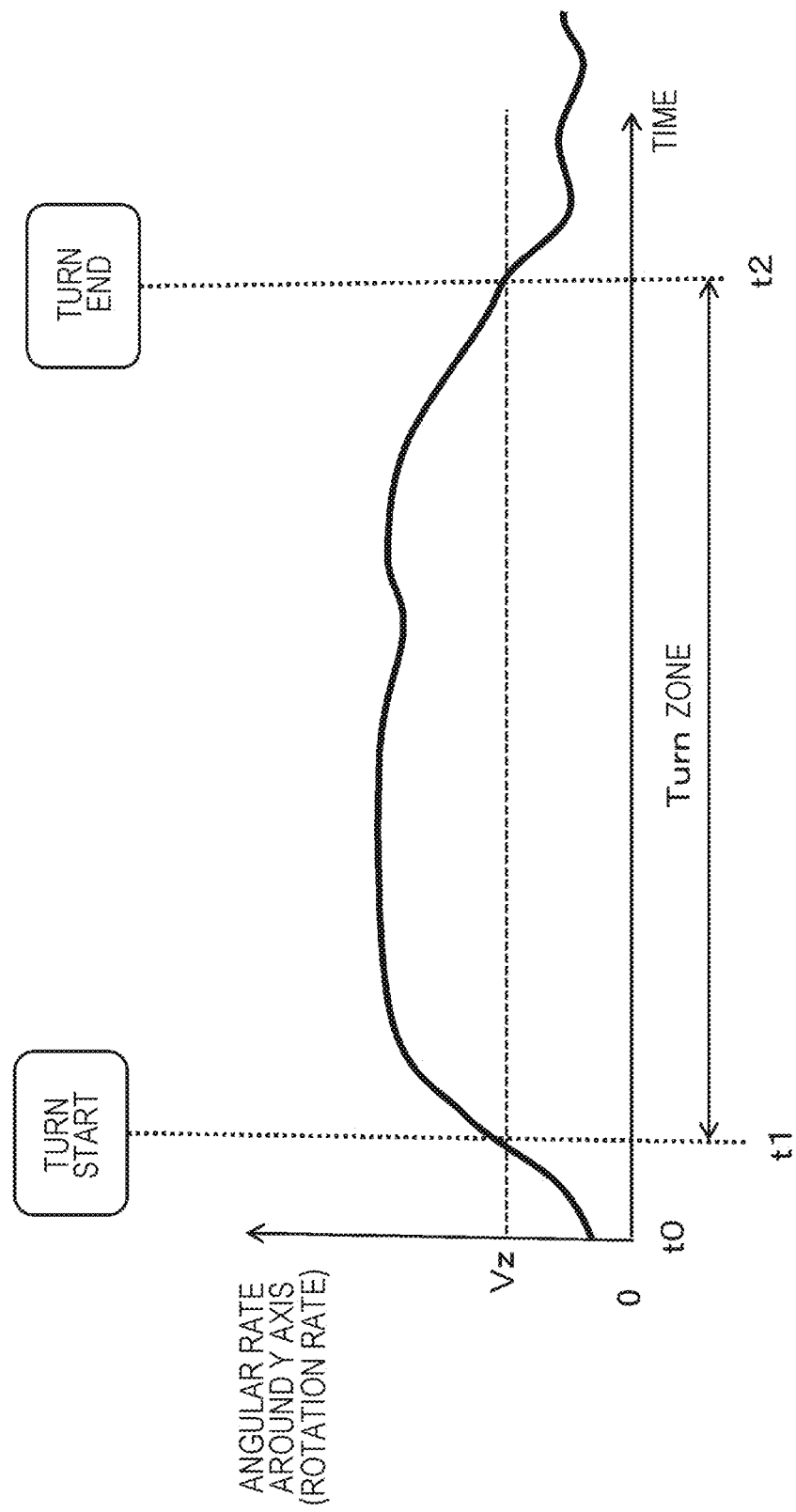
FIG. 6 is a diagram illustrating an example of turn detection processing.

FIG. 6 is a diagram illustrating an example of the turn detection processing in the turn detection unit 103 using the feature amount acquired by the feature amount extraction unit 101.

The example illustrated in FIG. 6 illustrates a turn detection processing example to which angular rate (rotation rate) information around a Y axis (a perpendicular axis), which is one detection information item in the sensor detection information, is applied.

The graph illustrated in FIG. 5 is a graph in which a horizontal axis represents time (t), and a vertical axis represents an angular rate detected by the sensor 20.

In a case where the object provided with the sensor 20 performs the turn processing, an angular rate (a rotation rate) around the Y axis is rapidly changed.

Time t1 illustrated in FIG. 6 corresponds to the start time of the turn.

At the time t1, the angular rate (the rotation rate) around the Y axis rapidly increases, and it is determined that the object starts the turn at the time t1.

In addition, time t2 illustrated in FIG. 6 corresponds to the end time of the turn.

At the time t2, the angular rate (the rotation rate) around the Y axis rapidly decreases, and it is determined that the object ends the turn at the time t2.

In the example illustrated in FIG. 6, the time t1 and t2 are a turn period.

As illustrated in FIG. 6, the turn detection unit 103 illustrated in FIG. 4, for example, analyzes a change in the angular rate (the rotation rate) around the Y axis, and detects the turn processing.

Furthermore, the example illustrated in FIG. 6 is a processing example only using the angular rate (the rotation rate) around the Y axis, but it is possible to analyze various motions of the user, for example, the rate of the turn, the direction of the turn, or the like, by using the other sensor detection information.

An analysis result thereof is output to the metadata generating unit 105, and the metadata generating unit 105 generates the metadata on the basis of the analysis result.

[2. Analysis Result of Change in Sensor Output Signal According to Sensor Mounting Position]

Next, the analysis result of a change in the sensor output signal according to a sensor mounting position will be described.

As described with reference to FIG. 1 and the like, in the processing of the present disclosure, the occurrence of various actions of the object, and specifically, the user action such as the jump or the turn is detected on the basis of the detection information of the sensor 20 mounted on the object.

The sensor 20 includes an acceleration rate sensor detecting an acceleration rate in a three-axis direction, a gyro sensor detecting an angular rate around a three-axis, and the like.

A specific example of an output signal of such sensors will be described with reference to FIG. 7 and FIG. 8.

Figure 7:
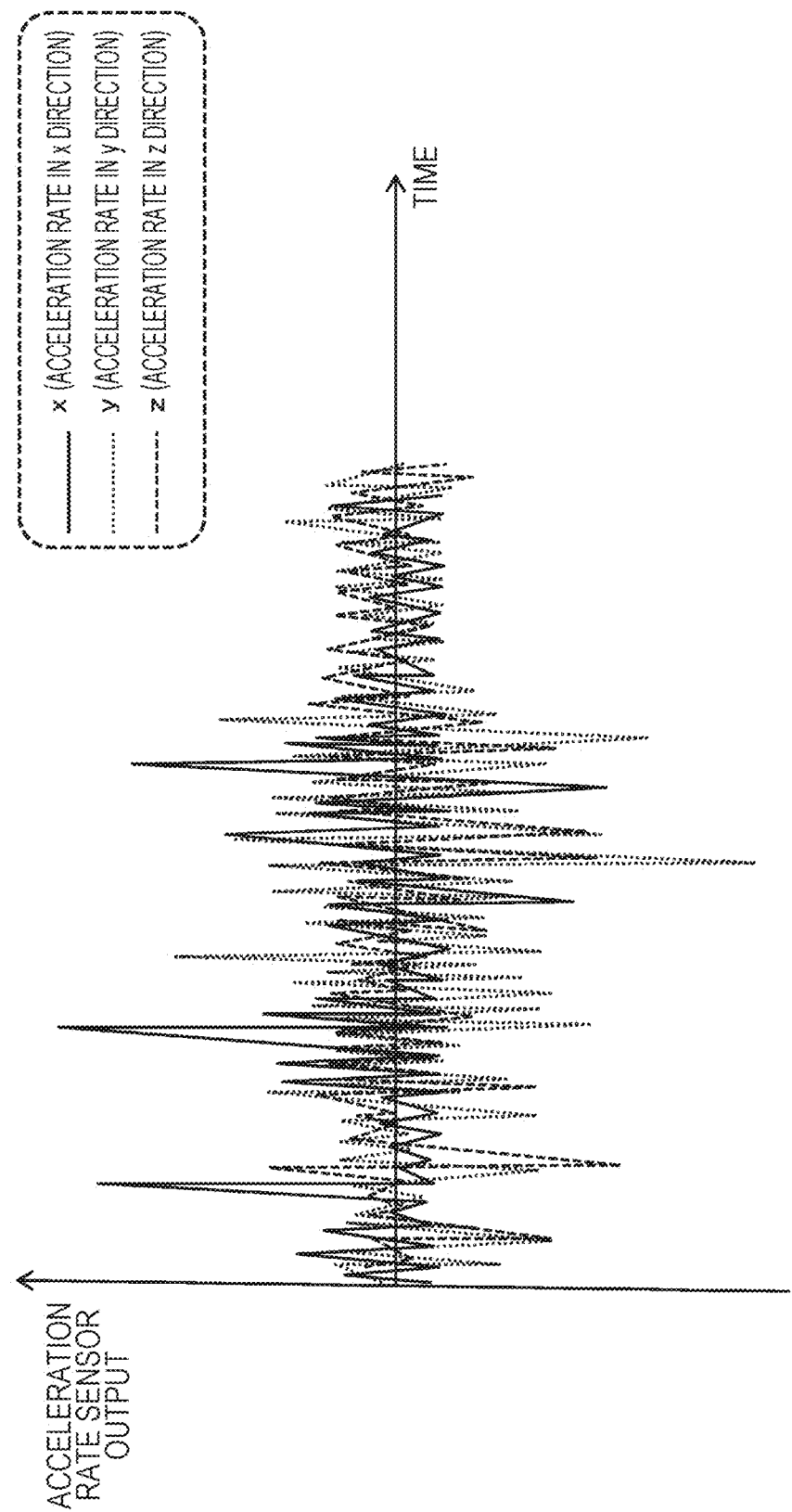
FIG. 7 is a diagram illustrating an output example of an acceleration rate sensor.

FIG. 7 is a graph illustrating an example of the output signal of the acceleration rate sensor.

A horizontal axis is time (t), and a vertical axis is a sensor output value.

In the graph, three output signals indicating acceleration rates in each of directions of X, Y, and Z are superimposed.

Solid Line x: an acceleration rate in an x direction
Broken sine y: an acceleration rate in a y direction
Dotted Line z: an acceleration rate in a z direction
Such three output signals are illustrated.

As illustrated in the graph, the sensor output includes signals of various frequency bands.

Figure 8:
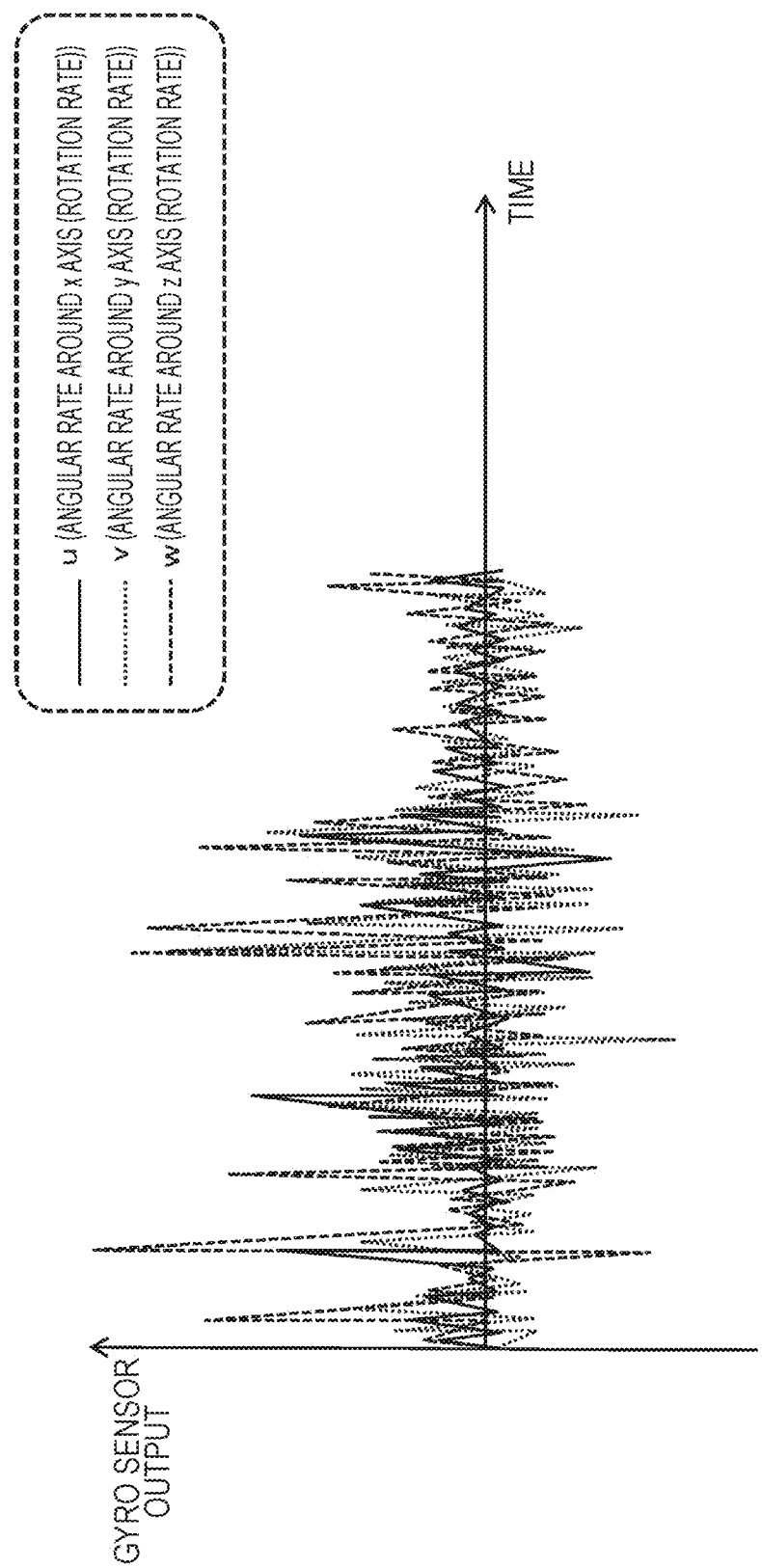
FIG. 8 is a diagram illustrating an output example of a gyro sensor.

FIG. 8 is a graph illustrating an example of the output signal of the gyro sensor.

A horizontal axis is time (t), and a vertical axis is a sensor output value.

In the graph, three output signals indicating angular rates around each of axes of X, Y, and Z are superimposed.

Solid Line u: an angular rate (a rotation rate) around an x axis

Broken Line v: an angular rate (a rotation rate) around a y axis

Dotted Line w: an angular rate (a rotation rate) around a z axis

Such three output signals are illustrated.

As illustrated in the graph, the sensor output includes signals of various frequency bands.

The feature amount extraction unit 102 executes processing or the like of eliminating a microscopic fluctuation, for example, which is determined as a noise, from the signals, and extracts a signal which is determined as being valid for detecting a target object action (for example, the jump or the turn), as the feature amount.

In the case of performing processing of discriminating the action of the user on the basis of such sensor output, it is considered that a difference is generated in the signal acquired from the sensor 20, and user action discrimination is not accurately performed, according to whether the sensor 20 is mounted on a human body or the sensor 20 is mounted on a physical body other than the human body.

FIG. 9 is a diagram illustrating two examples in which a mounting position of the sensor 20 is different.

FIG. 9 illustrates two sensor mounting examples described below.

(1) Sensor Mounting Example with respect to Human Body (2) Sensor Mounting Example with respect to Non-Human Body (Other than Human Body)

In FIG. 9(1), the sensor mounting example with respect to the human body is an example in which a sensor is mounted on the waist of the human body by using a belt.

FIG. 9(2) is an example where a sensor is directly mounted on a snowboard.

In a case where the sensor 20 is mounted on the human body as illustrated in FIG. 9(1), the human body functions as a cushion, and thus, it is estimated that a signal of a high-frequency band, which is included in the sensor detection information, decreases.

On the other hand, in a case where the sensor 20 is mounted on a body other than the human body, for example, is directly mounted on a snowboard as illustrated in FIG. 9(2), the sensor directly detects the oscillation and the like of the snowboard, and thus, it is estimated that the signal of the high-frequency band, which is included in a sensor detection signal, increases.

An example of a result of measuring a ratio between a high-frequency signal and a low-frequency signal, included in the detection signal of the sensor 20 will be described with reference to FIG. 10.

Two sports described below are verified as a test target sport.

(1) Bicycle (2) Kite Surfing (1) In the case of a bicycle, the output signal of the sensor is analyzed by mounting the sensor in two different positions described below.

(1p) Case Where Sensor is Mounted on Human Body on Bicycle (Example of Mounting Sensor on Human Body), and (1q) Case Where Sensor is Mounted on Handle of Bicycle (Example of Mounting Sensor on Other than Human Body)

In the sensor output signal, a low-frequency signal component (A) and a high-frequency signal component (B), included in the sensor output signal, are separated from each other, and a ratio between the respective frequency components, specifically, a value of (B/A):

$$\text{High-Frequency Component/Low-Frequency Component} = B/A$$

is measured.

In a case where the value of (B/A) is large, it is indicated that there are many high-frequency components in the sensor output signal.

In a case where the value of (B/A) is small, it is indicated that there are few high-frequency components in the sensor output signal.

A test result is as follows, as illustrated in FIG. 10.

(1p) Case Where Sensor is Mounted on Human Body on Bicycle (Case Where Sensor is Mounted on Human Body)

$$\text{High-Frequency Component/Low-Frequency Component} = B/A = 0.3 \times 10^{-6}$$

(1q) Case Where Sensor is Mounted on Handle of Bicycle (Case Where Sensor is Mounted on Other than Human Body)

$$\text{High-Frequency Component/Low-Frequency Component} = B/A = 5.0 \times 10^{-6}$$

Thus, a result is obtained in which in a case where the sensor is mounted on the human body, there are few high-frequency signal components in the sensor detection signal, and in a case where the sensor is mounted on other than the human body, there are many high-frequency signal components in the sensor detection signal.

Further, even in (2) Kite Surfing, the output signal of the sensor is analyzed by mounting the sensor in two different positions described below.

(2p) Case Where Sensor is Mounted on Human Body in Kite Surfing (Example of Haunting Sensor on Human Body), and (2q) Case Where Sensor is Mounted on Surfboard in Kite Surfing (Example of Mounting Sensor on Other than Human Body)

In the sensor output signal, the low-frequency signal component (A) and the high-frequency signal component (B), included in the sensor output signal, are separated from each other, and a ratio between the respective frequency components, specifically, a value of (B/A)

$$\text{High-Frequency Component/Low-Frequency Component} = B/A$$

is measured.

In a case where the value of (B/A) is large, it is indicated that there are many high-frequency components in the sensor output signal.

In a case where the value of (B/A) is small, it is indicated that there are few high-frequency components in the sensor output signal.

A test result is as follows, as illustrated in FIG. 10.

(2p) Case Where Sensor is Mounted on Human Body in Kite Surfing (Case Where Sensor is Mounted on Human Body)

$$\text{High-Frequency Component/Low-Frequency Component} = B/A = 0.3 \times 10^{-6}$$

(2q) Case Where Sensor is Mounted on Surfboard in Kite Surfing (Case Where Sensor is Mounted on Other than Human Body)

High-Frequency Component/Low-Frequency Component=$B/A$=$3.0 \times 10^{-6}$

Thus, a result is obtained in which in a case where the sensor is mounted on the human body, there are few high-frequency signal components in the sensor detection signal, and in a case where the sensor is mounted on other than the human body, there are many high-frequency signal components in the sensor detection signal.

The configuration of the present disclosure described below, is a configuration in which whether a detection position of the sensor is on the human body or is on other than the human body is automatically discriminated, in consideration of the test result, a discrimination result is applied, and motion detection of the user (the object) based on the sensor detection information is performed, and thus, the motion detection of the user (the object) is executed with a higher accuracy.

[3. Configuration of Determining Sensor Mounting Position and of Executing Analysis according to Mounting Position]

Next, a configuration of determining the sensor mounting position and of executing analysis according to the mounting position will be described.

Figure 11:
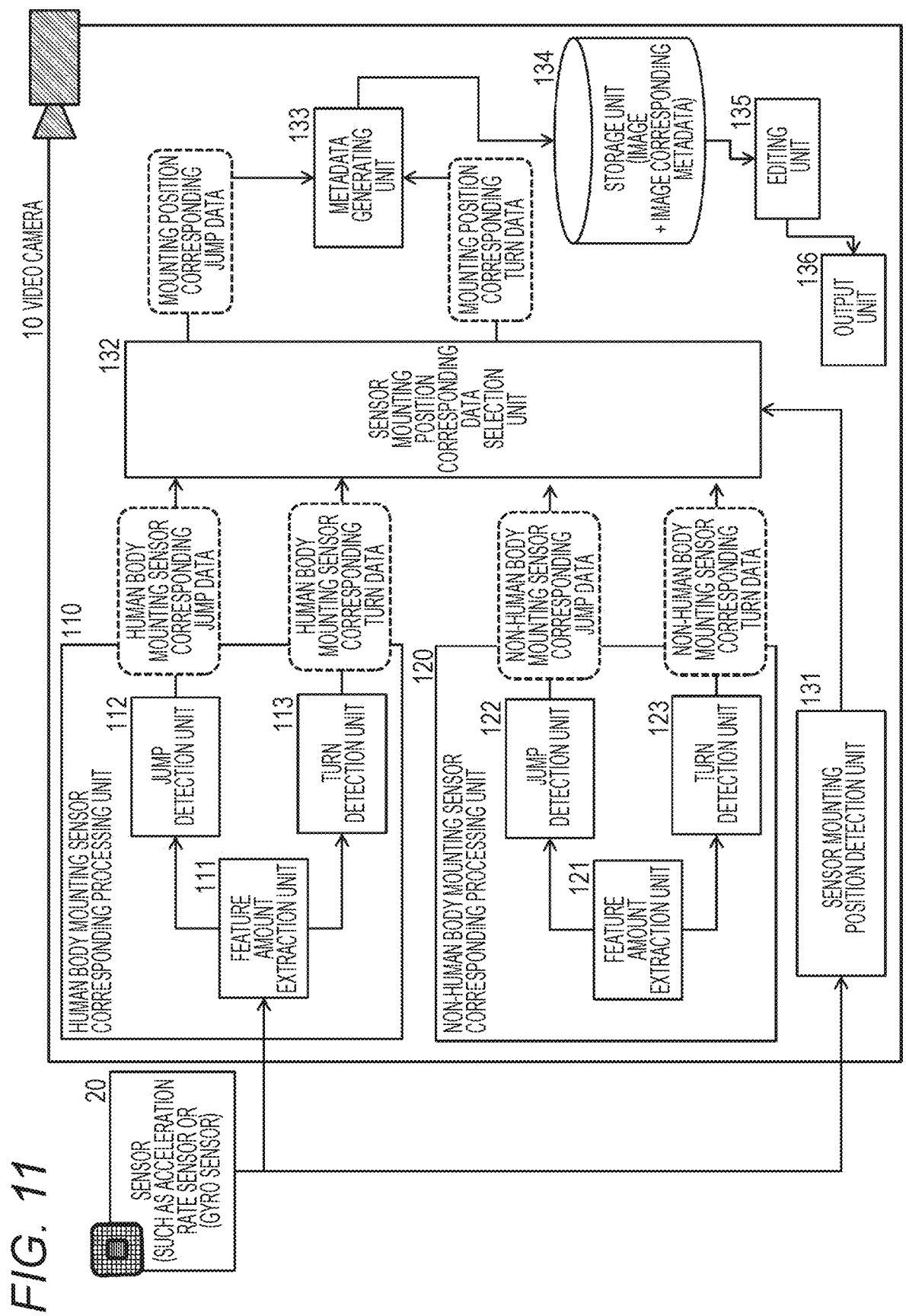
FIG. 11 is a diagram illustrating a configuration and a processing example of a video camera.

FIG. 11 is a diagram illustrating the configuration of the video camera 10 according to one example of the present disclosure.

Furthermore, the video camera 10 includes the imaging unit, and has basic functions as a video camera, such as the encoding processing of the shot image. FIG. 11 is a diagram illustrating a partial configuration of the video camera executing processing relevant to generating and recording of the metadata to which the sensor detection information is applied.

As illustrated in FIG. 11, the video camera 10 has the following configuration.

Human Body Mounting Sensor Corresponding Processing Unit 110,

Non-Human Body Mounting Sensor Corresponding Processing Unit 120,

Sensor Mounting Position Detection Unit 131,

Sensor Mounting Position Corresponding Data Selection Unit 132,

Metadata Generating Unit 133, and

Storage Unit 134.

In addition, the human body mounting sensor corresponding processing unit 110 includes a feature amount extraction unit 111, a jump detection unit 112, and a turn detection unit 113.

The non-human body mounting sensor corresponding processing unit 1120 also includes a feature amount extraction unit 121, a jump detection unit 122, and a turn detection unit 123.

The human body mounting sensor corresponding processing unit 110 executes processing on the premise that the sensor 20 is mounted on the human body.

That is, first, feature amount extraction, jump detection, and the turn detection processing, presuming that the sensor 20 is mounted on the human body as described with reference to FIG. 9(1), are executed.

On the other hand, the non-human body mounting sensor corresponding processing unit 120 executes processing on the premise that the sensor 20, for example, is mounted on other than the human body.

That is, first, the feature amount extraction, the jump detection, and the turn detection processing, presuming that the sensor 20 is mounted on other than the human body, such as a snowboard, as described with reference to FIG. 9(2), are executed.

The feature amount extraction unit 111 of the human body mounting sensor corresponding processing unit 110 detects the feature amount from the sensor detection information, which is received from the sensor 20. In this example, the feature amount valid for detecting the motion corresponding to the jump and the turn is extracted.

Specifically, examples of the feature amount include angular rate information corresponding to each of the axes of X, Y, and Z, which is a detection value of a gyro sensor, acceleration rate information of each of the axes of X, Y, and Z, which is a detection value from an acceleration rate sensor, and the like.

The extracted feature amount data is output to the jump detection unit 112 and the turn detection unit 113.

The jump detection unit 112 analyzes time or the like when it is determined that the object jumps, on the basis of the data input from the feature amount extraction unit 111.

Similarly, the turn detection unit 113 analyzes time or the like when it is determined that the object turns, on the basis of the data input from the feature amount extraction unit 111.

Furthermore, in the human body mounting sensor corresponding processing unit 110, processing presuming that the sensor 20 is mounted on the human body, is executed.

In a case where the sensor 20 is mounted on the human body, a noise amount in the high-frequency component is comparatively small, compared to a case where the sensor is directly mounted on other than the human body, such as a snowboard.

In addition, a particular motion of the human body, for example, a motion according to breathing or a physical motion such as head knocker is detected by the sensor.

Thus, in a case where the sensor 20 is mounted on the human body, the noise amount in the high-frequency component is comparatively small, and the sensor 20 outputs a detection signal corresponding to the particular motion of the human body (breathing, head knocker, or the like).

In the human body mounting sensor corresponding processing unit 110, a detection algorithm considering such characteristics is executed.

That is, the noise amount in the high-frequency component is small, and a motion corresponding to the detected object, such as the jump or the turn, is detected by applying a detection algorithm interpreting output corresponding to the particular motion of the human body as a noise.

On the other hand, in the non-human body mounting sensor corresponding processing unit 120, the feature amount extraction unit 121 detects the feature amount from the sensor detection information, which is received from the sensor 20. In this example, the feature amount valid for detecting the motion corresponding to the jump and the turn is extracted.

Specifically, examples of the feature amount include angular rate information corresponding to each of the axes of X, Y, and Z, which is a detection value of a gyro sensor, an acceleration rate information of each of the axes of X, Y, and Z, which is a detection value from an acceleration rate sensor, and the like.

The extracted feature amount data is output to the jump detection unit 122 and the turn detection unit 123.

The jump detection unit 122 analyzes time or the like when it is determined that the object jumps on the basis of the data input from the feature amount extraction unit 121.

Similarly, the turn detection unit 123 analyzes time or the like when it is determined that the object turns on the basis of the data input from the feature amount extraction unit 121.

The non-human body mounting sensor corresponding processing unit 120 executes processing on the premise that the sensor 20, for example, is mounted on other than the human body.

In a case where the sensor 20 is mounted on other than the human body, for example, in a case where the sensor is directly mounted on the snowboard or the like, the sensor 20 detects intrinsic oscillation and the like of the member itself, such as the snowboard. Such oscillation is determined as a noise. In addition, a motion according to breathing or a physical motion such as head knocker is hardly detected by the sensor compared to a case where the sensor is directly mounted on the human body.

In the non-human body mounting sensor corresponding processing unit 120, a detection algorithm considering such characteristics is executed.

Thus, in the human body mounting sensor corresponding processing unit 110 and the non-human body mounting sensor corresponding processing unit 120, the jump and the turn are detected according to different detection algorithms.

The sensor mounting position detection unit 131 inputs the detection information of the sensor 20, and executes processing of discriminating whether the mounting position of the sensor 20 is on the human body or is on other than the human body.

First, in a case where the sensor mounting position is on the human body and in a case where the sensor mounting position is on other than the human body, as described with reference to FIG. 7 to FIG. 10, a frequency component ratio included in the output signal of the sensor is greatly changed.

Specifically, a ratio between the low-frequency signal component (A) and the high-frequency signal component (B), included in the sensor output signal, that is, High-Frequency Component/tow-Frequency Component=$B/A$ In a case where the value of (B/A) is greatly different between a case where the sensor mounting position is on the human body and a case where the sensor mounting position is on other than the human body.

The sensor mounting position detection unit 131 analyzes a difference in the sensor output signal, and executes processing of discriminating whether the mounting position of the sensor 20 is on the human body or on other than the human body.

Furthermore, specific configuration and processing of the sensor mounting position detection unit 131 will be described below in detail.

A sensor mounting position determination result (on the human body or on other than the human body) of the sensor mounting position detection unit 131 is input into the sensor mounting position corresponding data selection unit 132.

The sensor mounting position corresponding data selection unit 132 inputs the following data from the human body mounting sensor corresponding processing unit 110 and the non-human body mounting sensor corresponding processing unit 120.

A jump detection result (human body mounting sensor corresponding jump data) and a turn detection result (human body mounting sensor corresponding turn data), executed by presuming that the sensor 20 is mounted on the human body, are input from the human body mounting sensor corresponding processing unit 110.

Further, a jump detection result (non-human body mounting sensor corresponding jump data) and a turn detection result (non-human body mounting sensor corresponding turn data), executed by presuming that the sensor 20 is mounted on other than the human body, are input from the non-human body mounting sensor corresponding processing unit 120.

The sensor mounting position corresponding data selection unit 132 selects any one of input from human body mounting sensor corresponding processing unit 110 and input from the non-human body mounting sensor corresponding processing unit 120, according to the sensor mounting position determination result in the sensor mounting position detection unit 131 (on the human body or on other than the human body), and outputs the selected data to the metadata generating unit 133.

That is, in a case where a determination result that the sensor 20 is mounted on the human body, is input from the sensor mounting position detection unit 131, the input data from the human body mounting sensor corresponding processing unit 110 is determined as correct detection data, and the data is selected and is output to the metadata generating unit 133.

On the other hand, in a case where a determination result that the sensor 20 is mounted on other than the human body, is input from the sensor mounting position detection unit 131, the input data from the non-human body mounting sensor corresponding processing unit 120 is determined as correct detection data, and the data is selected and is output to the metadata generating unit 133.

The metadata generating unit 133 generates metadata according to the input from the sensor mounting position corresponding data selection unit 132, that is, the input of the following data.

(1) Jump Detection Result (Human Body Mounting Sensor Corresponding Jump Data) and Turn Detection Result (Human Body Mounting Sensor Corresponding Turn Data), Executed by Presuming that Sensor 20 is Mounted on Human Body (2) Jump Detection Result (Non-Human Body Mounting Sensor Corresponding Jump Data) and Turn Detection Result (Non-Human Body Mounting Sensor Corresponding Turn Data), Executed by Presuming that Sensor 20 is Mounted on Other than Human Body That is, the metadata generating unit 133 executes the following processing.

In a case where the determination result that the sensor 20 is mounted on the human body, is output, the sensor mounting position detection unit 131 generates the metadata on the basis of the jump detection result (the human body mounting sensor corresponding jump data) and the turn detection result (the human body mounting sensor corresponding turn data), executed by presuming that the sensor 20 is mounted on the human body, and stores the metadata in the storage unit 134.

On the other hand, in a case where the determination result that the sensor 20 is mounted on other than the human body, is output, the sensor mounting position detection unit 131 generates the metadata on the basis of the jump detection result (the non-human body mounting sensor corresponding jump data) and the turn detection result (the non-human body mounting sensor corresponding turn data), executed by presuming that the sensor 20 is mounted on other than the human body, and stores the metadata in the storage unit 134.

Thus, according to the configuration illustrated in FIG. 11, whether the sensor is mounted on the human body or on other than the human body can be automatically determined, and an analysis result can be recorded in association with the image, as the metadata, according to an optimal sensor output according to the mounting position.

Furthermore, the metadata generated by the metadata generating unit 133, for example, is the metadata described above with reference to FIG. 3.

That is, for example, the following data is generated and is stored in the storage unit 134, as the metadata corresponding to the jump processing.

(a) Action Type: jump
(b) Action Start Time: 2015/12/12, 13:21:05
(c) Action End Time: 2015/12/12, 13:21:12
(d) Action Score: 72

Similarly, the following data is generated and is stored in the storage unit 134, as the metadata corresponding to the turn processing.

(a) Action Type: turn
(b) Action Start Time: 2015/12/12, 13:22:18
(c) Action End Time: 2015/12/12, 13:22:22
(d) Action Score: 81

The metadata generating unit 133 stores the metadata in association with the corresponding image frame of the shot image of the video camera 10.

That is, the jump corresponding metadata is recorded in association with the image frame obtained by shooting the lump scene.

Similarly, the turn corresponding metadata is recorded in association with the image frame obtained by shooting the turn scene.

Time information synchronized with both of the shot image and the sensor detection information is associated with the shot image and the sensor detection information, and the shot image and the metadata corresponding to the shot image are acquired according to the time information, and are stored in the storage unit 134 in association with the image and the corresponding metadata.

In the image stored in the storage unit 134, for example, image search is performed by using the information recorded in the metadata as a search index, and thus, the jump scene or the turn scene can be easily and accurately extracted.

By using such metadata, it is possible to efficiently perform selective display of the highlight scene of the image, or editing processing of digest data or the like in which only the highlight scenes of the image are collected.

An editing unit 135 is capable of efficiently performing the selective display of the highlight scene of the image, or the extraction processing or the editing processing of the digest data or the like in which only the highlight scenes of the image are collected, by using such metadata.

In the editing unit 135, the data which is extracted or edited on the basis of the metadata, for example, is output to an output unit 136 including a display unit or the like.

The image displayed on the output unit (the display unit) 136, for example, is a digest image in which powerful image scenes such as the jump scene or the turn scene are collected.

[4. Configuration Example and Processing Example of Sensor Mounting Position Detection Unit]

Next, a specific configuration example and a specific processing example of the sensor mounting position detection unit 131 of the video camera 10 illustrated in FIG. 11 will be described.

Figure 12:
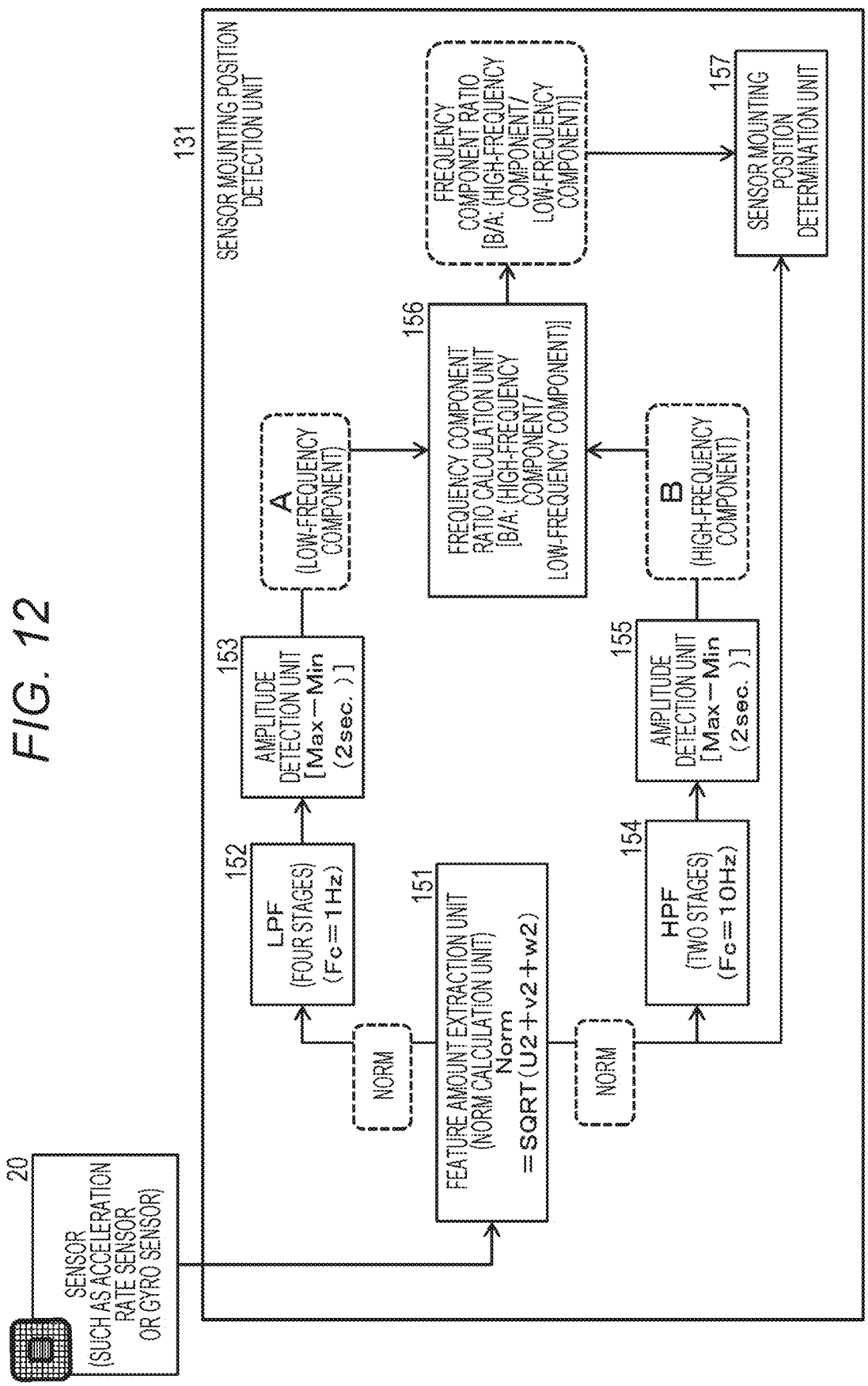
FIG. 12 is a diagram illustrating a configuration example and a processing example of a sensor mounting position detection unit.

FIG. 12 is a diagram illustrating one specific configuration example of the sensor mounting position detection unit 131.

Specifically, whether the sensor 20 is mounted on the human body or is mounted on other than the human body, such as a snowboard, is discriminated.

Specifically, for example, as described above with reference to FIG. 9, the sensor mounting type is discriminated according to:

(1) Sensor Mounting with respect to Human Body; and
(2) Sensor Mounting with respect to Other than Human Body.

Furthermore, FIG. 12 specifically illustrates the number of stages (4 stages, or the like) of a filter (LPF and HPF), a cutting (blocking) frequency of the filter (Fc=1 Hz, or the like), and a length of a time frame (2 Sec., or the like) set as an observation window (a zone) for acquiring data, but such numerical values are an example, and are suitably changed according to the characteristics or the like of an actual sensor.

Similarly in FIG. 12 and subsequent drawings, numerical values illustrated in each of the drawings are an example, and various settings can be performed.

The configuration and the processing of the sensor mounting position detection unit 131 illustrated in FIG. 12 will be described.

A feature amount extraction unit (a norm calculation unit) 151 of the sensor mounting position detection unit 131 inputs a detection signal of the sensor 20 from the sensor 20.

The sensor 20, for example, includes a gyro sensor which is capable of measuring an angular rate in a rotation direction around three axes of X, Y, and Z, an acceleration rate sensor which is capable of measuring an acceleration rate in a three-axis direction, and the like.

Such a sensor detection signal is input into the sensor mounting position detection unit 131, and here, an example of performing processing in which the output of the gyro sensor, that is, the angular rate (u, v, and w) in the rotation direction around three axes of X, Y, and Z is input, and the sensor mounting position is determined, will be described as an example.

The feature amount extraction unit (the norm calculation unit) 151 of the sensor mounting position detection unit 131 inputs the output of the gyro sensor, that is, the angular rate (u, v, and w) in the rotation direction around three axes of X, Y, and Z, from the sensor 20.

Furthermore, the sensor 20, for example, obtains 64 measurement values for 1 second, that is, executes measurement at Rate=64 times/sec, and the measurement values are sequentially input into the feature amount extraction unit (norm calculation unit) 151.

The feature amount extraction unit (the norm calculation unit) 151 calculates the norm of the angular rate (u, v, and w).

$$\text{Norm} = \text{SQRT}(u^2 + v^2 + w^2)$$

According to the expression described above, the norm of the angular rate (u, v, and w) is calculated. The norm of the angular rate (u, v, and w) corresponds to the size of the angular rate (u, v, and w).

The norm increases as a rotation rate of the sensor mounting body is high, and the norm decreases as the rotation rate of the sensor mounting body is low. The norm is an index value indicating the strength of the rotation.

Furthermore, the rotation rate of the mounting body of the sensor 20 is changed at all time, and the value of the norm is sequentially changed according to the change.

As described above, the output from the sensor 20 is an output rate of 64 times/sec, and the norm calculated by the feature amount extraction unit (norm calculation unit) 151 is output as a signal (a norm signal) which is changed according to time.

In a case where a norm change in time unit is furious, there are many high-frequency components in the norm signal output from the feature amount extraction unit (the norm calculation unit) 151, and in a case where the norm change in time unit is small, there are few high-frequency components in the norm signal output from the feature amount extraction unit (the norm calculation unit) 151, and thus, the ratio of the low-frequency component increases.

The norm signal calculated by the feature amount extraction unit (the norm calculation unit) 151 is input to a four-stage low-pass filter: LPF 152 (Fc=1 Hz) and a two-stage high-pass filter: HPF 154 (Fc=10 Hz), and a sensor mounting position determination unit 157.

The LPF 152 extracts only a low-frequency component included in the norm signal. According to the four-stage LPF 152 (Fc=1 Hz), a low-frequency component of less than or equal to 1 Hz included in the norm signal is extracted and is output, On the other hand, the HPF 154 extracts only a high-frequency component included in the norm signal. According to the two-stage HPF 154 (Fc=10 Hz), a high-frequency component of greater than or equal to 10 Hz included in the norm signal is extracted and is output.

A norm low-frequency component signal, which is the output of the LPF 152, is input into an amplitude detection unit 153 [Max−Min (2 sec.)].

The amplitude detection unit 153 [Max−Min (2 sec.)] calculates a difference between the maximum amplitude and the minimum amplitude, included in the norm low-frequency component signal of a time frame zone in unit of 2 seconds.

The difference between the maximum amplitude and the minimum amplitude, which is calculated from the norm low-frequency component signal of the time frame zone in unit of 2 seconds, increases, as the low-frequency component signal in the norm low-frequency component signal, which is the output of the LPF 152, increases.

On the other hand, in a case where the low-frequency component signal in the norm low-frequency component signal, which is the output of the LPF 152, decreases, the difference between the maximum amplitude and the minimum amplitude, which is calculated from the norm low-frequency component signal of the time frame zone in unit of 2 seconds, decreases.

That is, the output of the amplitude detection unit 153 [Max−Min. (2 sec.)] is an index value indicating the amount of low-frequency component included in the norm signal to be output from the feature amount extraction unit (the norm calculation unit) 151, and that is, this is an index value indicating the amount of low-frequency component included in the output signal according to a temporal transition of the sensor 20.

In FIG. 12, a value [A (a low-frequency component)] indicated as the output of the amplitude detection unit 153 is the index value indicating the amount of low-frequency component included in the output signal according to the temporal transition of the sensor 20.

On the other hand, a norm high-frequency component signal, which is the output of the HPF 154, is input to an amplitude detection unit 155 [Max−Min (2 sec.)]

The amplitude detection unit 155 [Max−Min (2 sec.)] calculates a difference between the maximum amplitude and the minimum amplitude, included in a norm high-frequency component signal of a time frame zone in unit of 2 seconds.

The difference between the maximum amplitude and the minimum amplitude, which is calculated from the norm high-frequency component signal of the time frame zone in unit of 2 seconds, increases, as high-frequency component signal in the norm high-frequency component signal, which is the output of the HPF 154, increases.

On the other hand, in a case where the high-frequency component signal in the norm high-frequency component signal, which is the output of the HPF 152, decreases, the difference between the maximum amplitude and the minimum amplitude, which is calculated from the norm high-frequency component signal of the time frame zone in unit of 2 seconds, decreases.

That is, the output of the amplitude detection unit 155 [Max−Min (2 sec.)] is an index value indicating the amount of high-frequency component included in the norm signal to be output from the feature amount extraction unit (the norm calculation unit) 151, and that is, this is an index value indicating the amount of high-frequency component included in the output signal according to the temporal transition of the sensor 20.

In FIG. 12, a value [B (a high-frequency component)] indicated as the output of the amplitude detection unit 155 is the index value indicating the amount of high-frequency component included in the output signal according to the temporal transition of the sensor 20.

The output signal A (the low-frequency component) of the amplitude detection unit 153 and the output signal B (the high-frequency component) of the amplitude detection unit 155 are input into a frequency component ratio calculation unit 156 [B/A (High-Frequency Component/Low-Frequency Component)].

The frequency component ratio calculation unit 156 calculates a ratio between the output signal A (the low-frequency component) of the amplitude detection unit 153 and the output signal B (the high-frequency component) of the amplitude detection unit 155, that is, $$B/A\ (=\text{High-Frequency Component/Low-Frequency Component}).$$

The frequency component ratio signal (B/A) to be output from the frequency component ratio calculation unit 156 is a value indicating the ratio between the high-frequency component and the low-frequency component (High-Frequency Component/Low-Frequency Component) in the output signal which is changed according to the temporal transition of the sensor 20.

The frequency component ratio signal (B/A) to be output from the frequency component ratio calculation unit 156 is input into the sensor mounting position determination unit 157.

An example of the configuration and the processing of the sensor mounting position determination unit 157 will be described with reference to FIG. 13.

The sensor mounting position determination unit 157 inputs the frequency component ratio signal (B/A) generated according to the processing described with reference to FIG. 12, that is, the frequency component ratio signal (B/A) to be output from the frequency component ratio calculation unit 156, and the norm.

Furthermore, as described above, the norm is a value to be generated by the feature amount extraction unit (the norm calculation unit) 151, and is the norm of the angular rate (u, v, and w), which is the output of the sensor 20.

$$\text{Norm}=\text{SQRT}(u^2+v^2+w^2)$$

The norm is the norm of the angular rate (u, v, and w) to be calculated according to the expression described above, and corresponds to the size of the angular rate (u, v, and w).

The norm increases as a rotation rate of the sensor mounting body is high, and the norm decreases as the rotation rate of the sensor mounting body is low. The norm is an index value indicating the strength of the rotation.

On the other hand, the frequency component ratio signal (B/A) is a value indicating the ratio between the high-frequency component and the low-frequency component (High-Frequency Component/Low-Frequency Component) in the output signal which is changed according to the temporal transition of the sensor 20.

Furthermore, the norm is calculated at a rate of 64 times/sec, and is input into the sensor mounting position determination unit 157 at the rate of 64 times/sec.

On the other hand, the frequency component ratio signal (B/A) is measured by setting a time frame in unit of 2 seconds, and the time frame is set by being sequentially shifted in unit of (1/64) sec.

Accordingly, a new frequency component ratio signal (B/A) is calculated at the rate of 64 times/sec by using a new time frame in unit of 2 seconds, which is set in unit of 1/64 seconds, and is input into the sensor mounting position determination unit 157.

Figure 13:
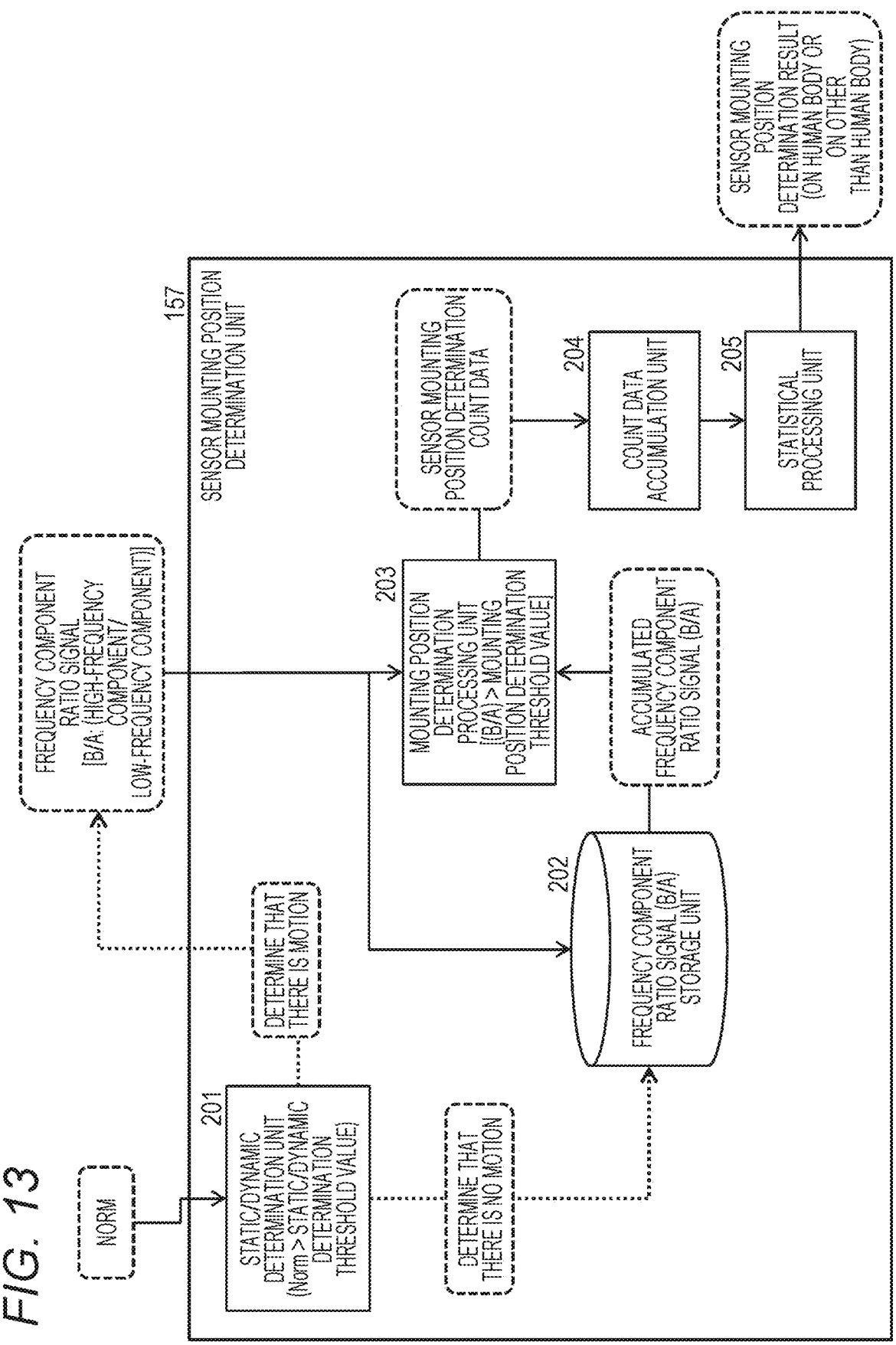
FIG. 13 is a diagram illustrating a configuration and a processing example of a sensor mounting position determination unit.

As illustrated in FIG. 13, the norm is input into a static/dynamic determination unit 201.

In addition, the frequency component ratio signal (B/A) indicating the ratio between the high-frequency component and the low-frequency component in the sensor output signal (High-Frequency Component/Low-Frequency Component) is input into a mounting position determination processing unit 203 and a frequency component ratio signal storage unit 202.

Input processing of the data is executed at the rate of 64 times/sec similar to the output rate of the sensor.

The static/dynamic determination unit 201 compares a threshold value defined in advance (a static/dynamic determination threshold value), to the value of the norm.

Furthermore, the sensor 20 outputs the sensor detection signal at the rate of 64 times/sec, and the static/dynamic determination unit 201 executes the processing at each sensor output timing (64 times/sec). Alternatively, the processing may be executed by slightly decreasing the rate.

As described above, the norm increases as a rotation rate of the sensor mounting body is high, and the norm decreases as the rotation rate of the sensor mounting body is low. The norm is an index value indicating the strength of the rotation.

In a case where the rotation of the sensor mounting body is 0, the norm is 0.

The static/dynamic determination threshold value is set to a value, which is slightly greater than 0, in consideration of a slight error.

Norm>Static/Dynamic Determination Threshold Value

In a case where the expression described above is established, the sensor mounting body is determined as "There is Motion".

In a case where the expression described above is not established, the sensor mounting body is determined as "There is No Motion".

In the static/dynamic determination unit 201, in the case of the determination of "There is Motion", in the mounting position determination processing unit 203, determination processing of the sensor mounting position is executed by using the input newest frequency component ratio signal (B/A).

On the other hand, in the static/dynamic determination unit 201, in the case of the determination of "There is No Motion", in the mounting position determination processing unit 203, the determination processing of the sensor mounting position is executed by using the past frequency component ratio signal (B/A), which is the newest valid value (a calculation value in the case of the determination of "There is Motion") in the values input in the past, without using the newest frequency component ratio signal (B/A).

That is, in a case where there is no motion of the sensor mounting body, it is determined that there is no possibility that the sensor mounting position is changed, and the sensor mounting position is determined by using a valid frequency component ratio signal (B/A) which is calculated in the past and is stored in the frequency component ratio signal (B/A) storage unit 202.

Furthermore, in the static/dynamic determination unit 201, in the case of the determination of "There is Motion", the input newest frequency component ratio signal (B/A) is stored in the frequency component ratio signal (B/A) storage unit 202.

In the static/dynamic determination unit 201, in the case of the determination of "There is No Motion", the newest frequency component ratio signal (B/A) input at this timing is determined as being invalid, is not used in the sensor mounting position determination, and is not stored in the frequency component ratio signal (B/A) storage unit 202.

Thus, in the static/dynamic determination unit 201, in the case of the determination of "There is Motion", the mounting position determination processing unit 203 performs the determination processing of the sensor mounting position by using the newest input frequency component ratio signal (B/A).

In the static/dynamic determination unit 201, in the case of the determination of "There is No Motion", the determination processing of the sensor mounting position is performed by using the newest valid frequency component ratio signal (B/A) input in the past.

The mounting position determination processing unit 203 executes comparison processing between the frequency component ratio signal (B/A) and a mounting position determination threshold value, and outputs mounting position determination count data.

The mounting position determination threshold value is a threshold value for determining whether the value of the frequency component ratio signal (B/A) is:

(1) Sensor Mounting Position=Human Body, or (2) Sensor Mounting Position=Other than Human Body.

Specifically, as described above with reference to FIG. 9, the mounting position determination threshold value is a threshold value for discriminating the sensor mounting type according to:

(1) Sensor Mounting with respect to Human Body; and (2) Sensor Mounting with respect to Other than Human Body.

As described above with reference to FIG. 10, (1p) Case Where Sensor is Mounted on Human Body on Bicycle $$\text{High-Frequency Component/Low-Frequency Component}=B/A=0.3\times10^{-6}$$

(1q) Case Where Sensor is Mounted on Handle of Bicycle

High-Frequency Component/Low-Frequency Component=$B/A$=5.0×10$^{-6}$

Thus, in a case where the sensor is mounted on the human body, the high-frequency signal component included in the sensor detection signal decreases, in a case where the sensor is mounted on other than the human body, the high-frequency signal component included in the sensor detection signal increases.

For example, the threshold value is set on the basis of the result illustrated in FIG. 10.

In the case of the example illustrated in FIG. 10, for example,

Mounting Position Determination Threshold Value=1.0×10$^{-6}$ can be used.

Furthermore, it is preferable that the mounting position determination threshold value is set in consideration of a measurement result or the like, which is obtained from various mounting objects other than human body.

The mounting position determination processing unit 203 executes the comparison processing between the frequency component ratio signal (B/A) and the mounting position determination threshold value, and outputs the mounting position determination count data. The determination processing based on the following determination expression is executed.

(Determination Expression) Frequency Component Ratio Signal (B/A)>Mounting Position Determination Threshold Value In a case where the determination expression described above is established, it is determined that there are many high-frequency components (B) in the frequency component ratio signal (B/A), and the sensor mounting position is determined as being other than the human body.

On the other hand, in a case where the determination expression described above is not established, it is determined that there are few high-frequency components (B) in the frequency component ratio signal (B/A) and the sensor mounting position is determined as being the human body.

Furthermore, whenever the new frequency component ratio signal (B/A) is input, the determination processing is executed 64 times for 1 second, for example, according to the sensor input rate (for example, 64 times/sec).

The results of the respective determination processing are counted, and are stored in a count data accumulation unit 204.

In a case where it is determined that Sensor Mounting Position=Human Body, a count value of "Sensor Mounting Position=Human Body" is stored in the count data accumulation unit 204.

In a case where it is determined that Sensor Mounting Position=Other than Human Body, a count value of "Sensor Mounting Position=Other than Human Body" is stored in the count data accumulation unit 204.

For example, 64 count data items are obtained for 1 second, and such count data items are accumulated in the count data accumulation unit 204.

A statistical processing unit 205 compares the number of counts accumulated in the count data accumulation unit 204 at each determination result output timing defined in advance, and outputs a sensor mounting position determination result, that is, a determination result of whether the sensor is mounted on the human body or is mounted on other than the human body.

Furthermore, as described above with reference to FIG. 11, an output destination of the determination result is the sensor mounting position corresponding data selection unit 132 illustrated in FIG. 11.

The determination result output timing when the statistical processing unit 205 outputs the determination result, for example, maybe set to each (1/64) seconds according to 64 times/sec, which is an input rate of the sensor detection information, or may be set to a longer interval, for example, several seconds to several tens of seconds.

A specific example of accumulation data of the count data accumulation unit 204 and the processing of the statistical processing unit 205 will be described with reference to FIG. 14.

Figure 14:
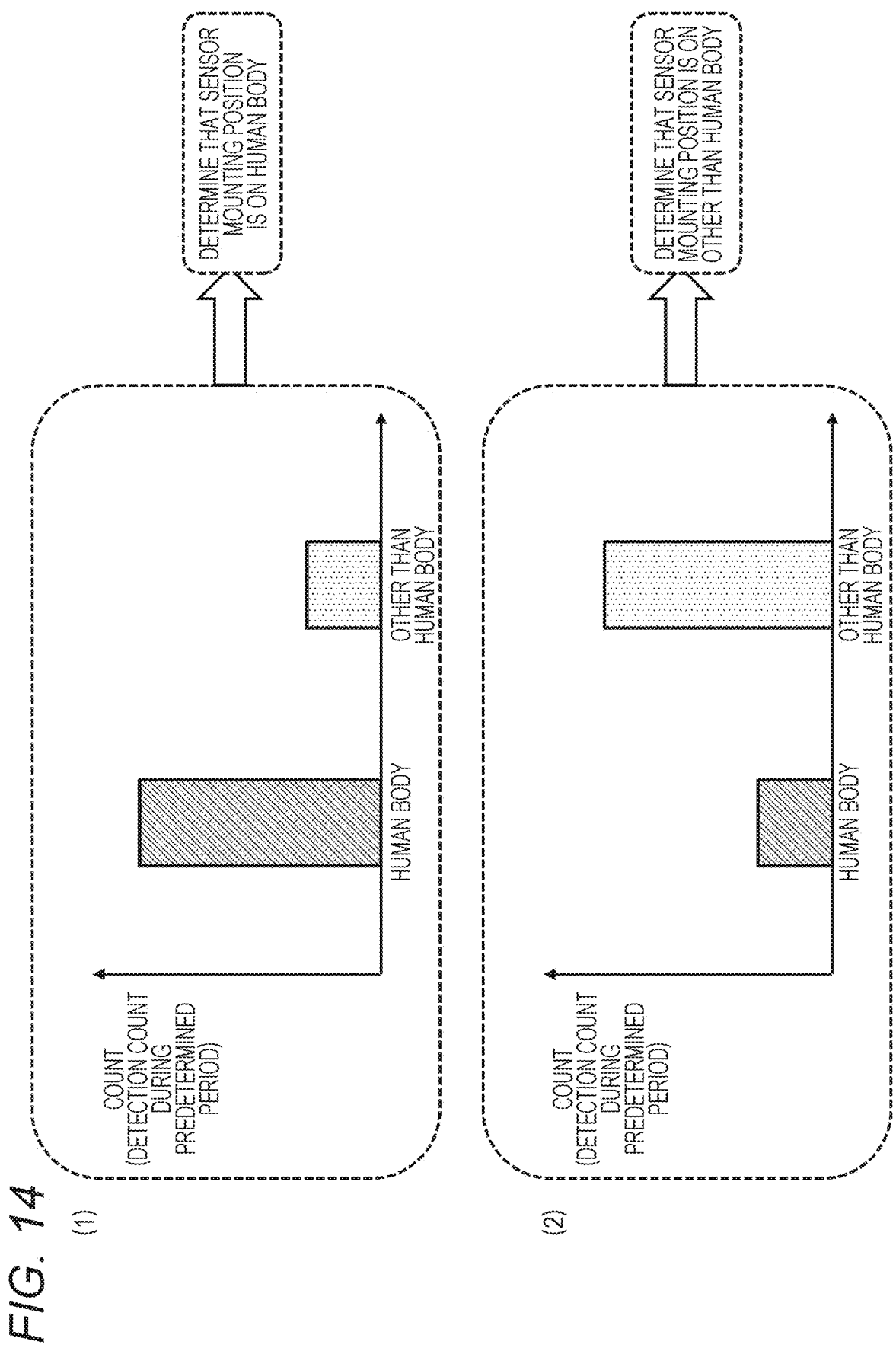
FIG. 14 is a diagram illustrating an example of sensor mounting position determination processing.

For example, the count value illustrated in FIG. 14(1) or (2) is accumulated in the count data accumulation unit 204.

Graphs illustrated in FIGS. 14(1) and (2) are an accumulation data example of the count value determined on the basis of a determination expression described below:

(Determination Expression) Frequency Component Ratio Signal ($B/A$)>Mounting Position Determination Threshold Value in the mounting position determination processing unit 203 illustrated in FIG. 13.

Accumulation processing of the count value, for example, is executed in measurement window (movement window) unit of predetermined measurement time unit (for example, 10 seconds). A measurement window (a movement window) is sequentially moved, and the statistical processing unit 205 sequentially eliminates the old count value at each movement timing (for example, 1 second) of the measurement window (the movement window), inputs a new count value, and thus updates the count value.

In an example illustrated in FIG. 14(1), a distribution of the counts of the accumulation data of the count data accumulation unit 204 is as follows.

Count of (Sensor Mounting Position=Human Body)
>Count of (Sensor Mounting Position=Other than Human Body)

That is, the number of counts determined that the sensor mounting position is on the human body is greater than the number of counts determined that the sensor mounting position is on other than the human body.

In such a case of the distribution of the number of counts, the statistical processing unit 205 outputs a result that the sensor mounting position is on the human body, as the sensor mounting position determination result.

On the other hand, in an example illustrated in FIG. 14(2), the distribution of the counts of the accumulation data of the count data accumulation unit 204 is as follows.

Count of (Sensor Mounting Position=Human Body)
<Count of (Sensor Mounting Position=Other than Human Body)

That is, the number of counts determined that the sensor mounting position is on other than the human body is greater than the number of counts determined that the sensor mounting position is on the human body.

In such a case of the distribution of the number of counts, the statistical processing unit 205 outputs a result that the sensor mounting position is on other than the human body, as the sensor mounting position determination result.

The number of counts determined as the human body mounting is compared to the number of counts determined as the non-human body mounting, one of a larger number of counts is selected, and the selected mounting position is output as the determination result.

Furthermore, in a case where the number of counts determined as the human body mounting is balanced with the number of counts determined as the non-human body mounting, it is preferable that any result of "Human Body Mounting" and "Non-Human Body Mounting", obtained as the determination result at the time of the previous determination, is continuously output.

Thus, the statistical processing unit 205 outputs the determination result at each determination result output interval set in advance according to a count distribution circumstance of the accumulation data of the count data accumulation unit 204, that is, the determination information of whether the sensor mounting type is:

(1) Sensor is Mounted on Human Body, or (2) Sensor is Mounted on Other than Human Body.

The output destination of the determination result is the sensor mounting position corresponding data selection unit 132 illustrated in FIG. 11, as described above with reference to FIG. 11.

The sensor mounting position corresponding data selection unit 132 selects any one of the input from the human body mounting sensor corresponding processing unit 110 and the input from the non-human body mountings or corresponding processing unit 120, according to the sensor mounting position determination result in the sensor mounting position detection unit 131 (on the human body or other than the human body), and outputs the selected data to the metadata generating unit 133.

According to the configuration illustrated in FIG. 11, whether the sensor is mounted on the human body or is mounted on other than the human body is automatically determined, and an analysis result can be recorded in association with the image, as the metadata, according to the optimal sensor output according to the mounting position.

Figure 15:
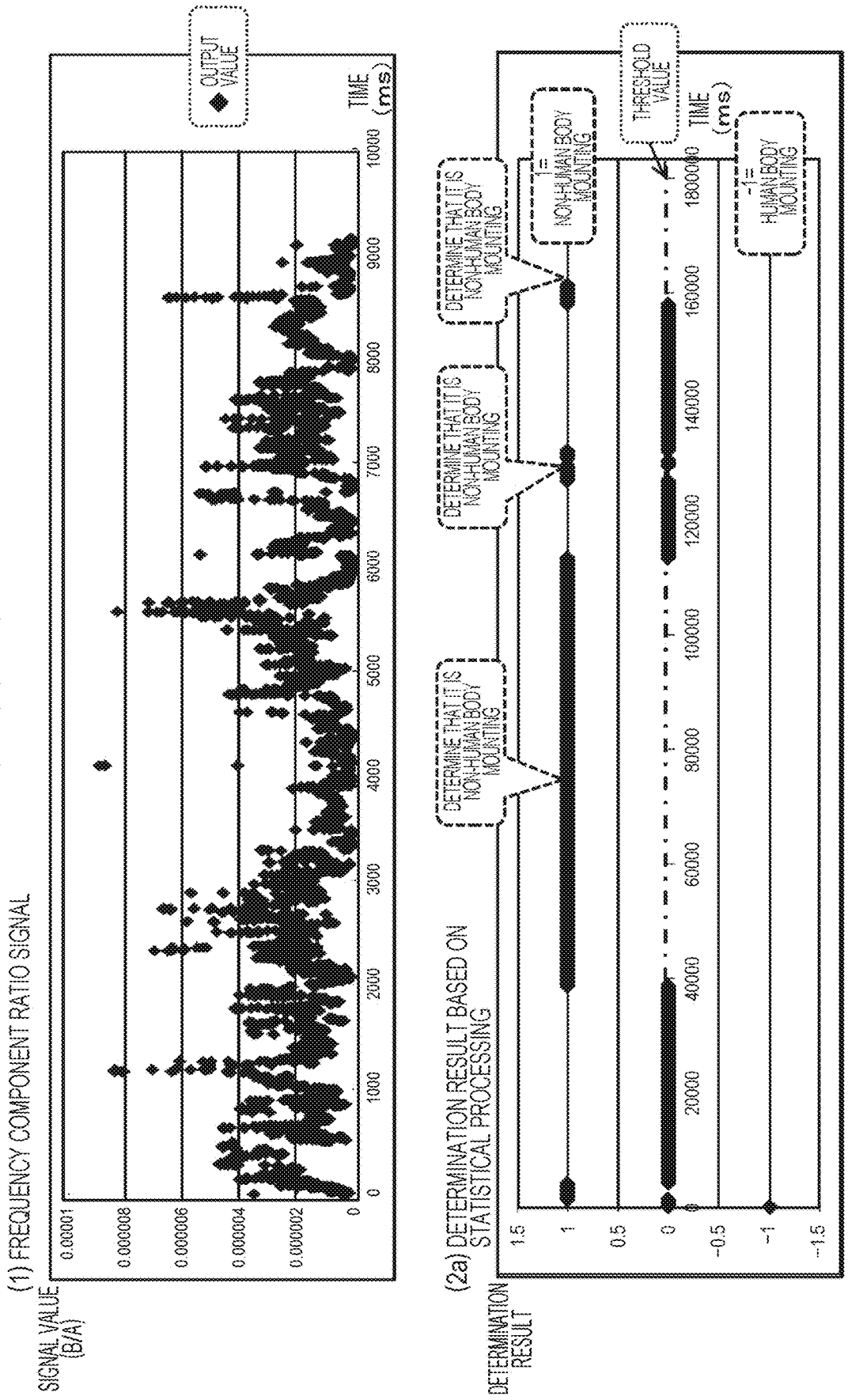
FIG. 15 is a diagram illustrating an example of a sensor mounting position determination result based on statistical processing.

FIG. 15 is a diagram illustrating a test result of evaluation of a processing result of the sensor mounting position determination unit illustrated in FIG. 13.

FIG. 15 illustrates the following data.

(1) Temporal Transition Data of Frequency Component Ratio Signal (B/A) (=High-Frequency Component/Low-Frequency Component) Generated on Basis of Output of Sensor 20

(2a) Determination Result Data Obtained by Processing of Sensor Mounting Position Determination Unit to which Statistical Processing Described with reference to FIG. 13 is Applied In a graph of the frequency component ratio signal (B/A) of (1), a horizontal axis is time, and a vertical axis is a signal value of the frequency component ratio signal (B/A).

Each point in the graph is the value of B/A which is calculated at each sensor output timing. The calculation processing, for example, is performed at a rate similar to the detection result output rate (64 times/sec) of the sensor, that is, at each rate of 1/64 sec.

In a graph of the determination result data based on the statistical processing of (2a), a horizontal axis is time, and a vertical axis is a determination result (1=Human Body Mounting, −1=Non-Human Body Mounting, and 0=Undeterminable).

Furthermore, in the graph of (1) and the graph of (2a), the scales of the time axes are not coincident with each other. The graph of the determination result data based on the statistical processing of (2a) is a result generated by using a measurement result longer than that of the graph illustrated in (1).

The data illustrated in FIG. 15 is data obtained by mounting the sensor on other than the human body and by performing a test.

In the determination result data based on the statistical processing of (2a), which is obtained from a test result, only the determination result that the sensor is mounted on other than the human body is obtained.

The determination result that the sensor is mounted on the human body is not obtained.

According to such processing, the determination result of "Non-Human Body Mounting" is output to the sensor mounting position corresponding data selection unit 132 illustrated in FIG. 11 from the data illustrated in FIG. 15, at all time.

As a result thereof, the generating and recording of the metadata to which a jump detection result or a turn detection result, based on a correct sensor output result according to the actual sensor mounting position (the non-human body mounting), is applied, is realized.

[5. Example of Sensor Mounting Position Determination Sequence]

Next, an example of the sensor mounting position determination sequence executed by the sensor mounting position determination unit 157 described with reference to FIG. 13, will be described.

Figure 16:
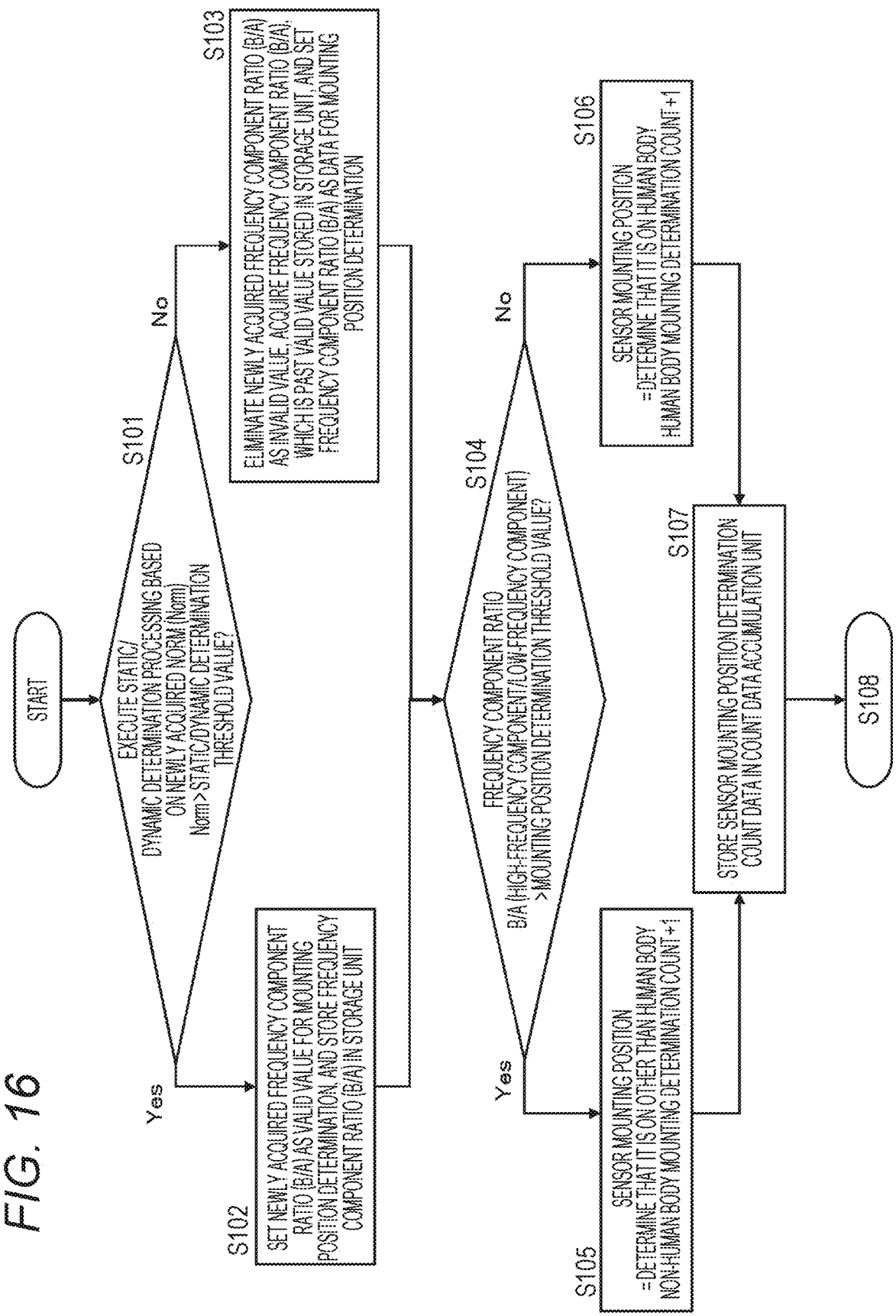
FIG. 16 is a flowchart illustrating a sequence of the sensor mounting position determination processing based on the statistical processing.
Figure 17:
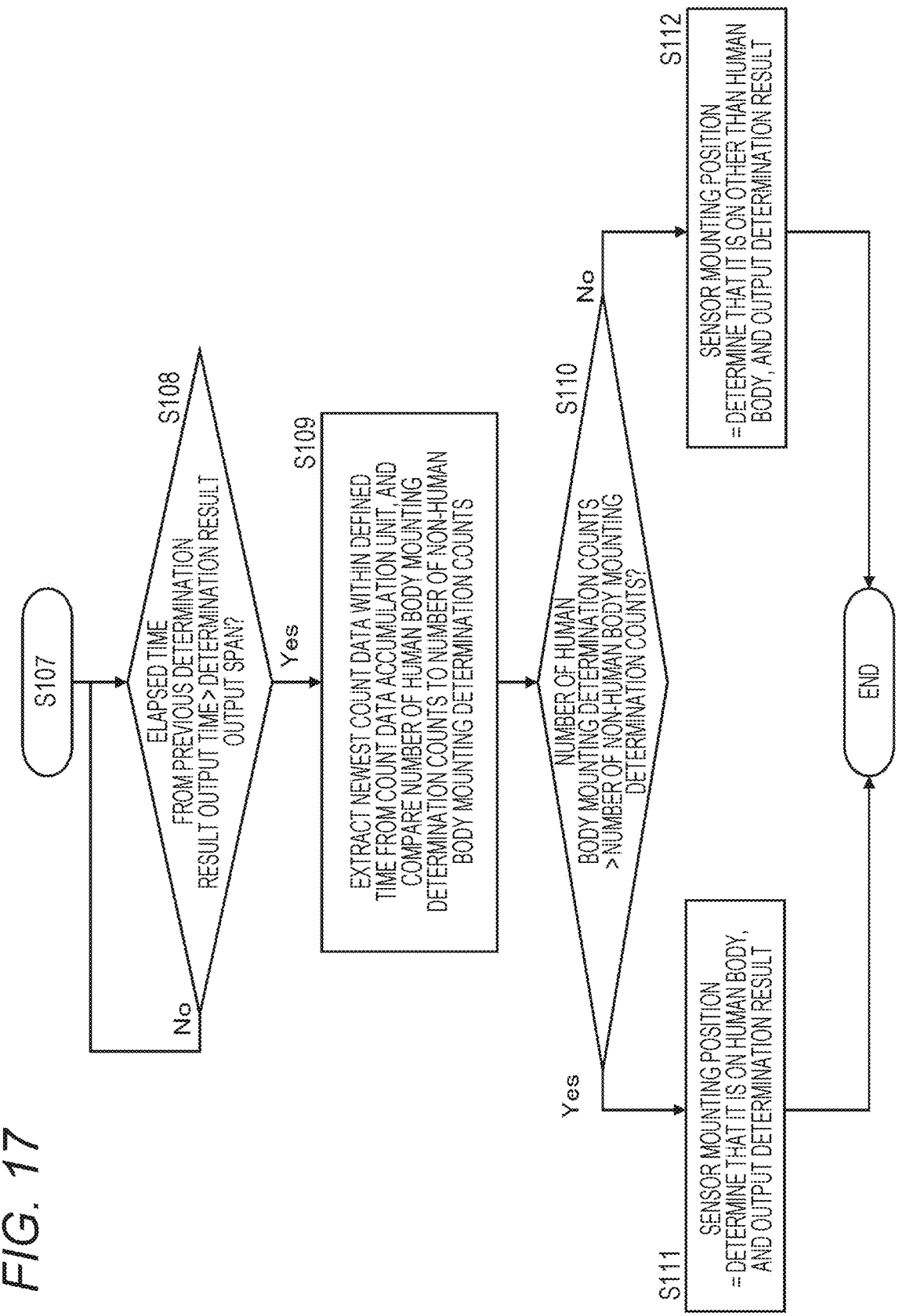
FIG. 17 as a flowchart illustrating the sequence of the sensor mounting position determination processing based on the statistical processing.

Flowcharts illustrated in FIG. 16 and FIG. 17 are a flowchart illustrating the sensor mounting position determination sequence executed by the sensor mounting position determination unit 157 described with reference to FIG. 13.

Hereinafter, processing of each step of a flow will be sequentially described.

(Step S101)

First, in step S101, the static/dynamic determination unit 201 of the sensor mounting position determination unit 157 compares a value of a norm calculated on the basis of the newly input sensor detection value, to the threshold value defined in advance (the static/dynamic determination threshold value).

As described above, the norm is the norm of the angular rate (u, v, and w), which is the sensor output, and is calculated according to the following expression.

$$\text{Norm}=\text{SQRT}(u^2+v^2+w^2)$$

The norm is an index value indicating the strength of the rotation.

In a case where the rotation of the sensor mounting body is 0, the norm is 0.

The static/dynamic determination unit 201 of the sensor mounting position determination unit 157 compares the threshold value defined in advance (the static/dynamic determination threshold value), to the value of the norm.

The static/dynamic determination threshold value is set to a value, which is slightly greater than 0, in consideration of a slight error.

Norm>Static/Dynamic Determination Threshold Value

In a case where the expression described above is established, the sensor mounting body is determined as "There is Motion", and the process proceeds to step S102.

In a case where the expression described above is not established, the sensor mounting body is determined as "There is No Motion", and the process proceeds to step S103.

(Step S102)

In the case of the determination of "There is Motion" in static/dynamic determination processing using a calculation norm based on the new sensor detection value in step S101, the processing of step S102 is executed.

In step S102, the newly acquired frequency component ratio (B/A) is set as a valid value which is applied to the mounting position determination, and is stored in the storage unit (the frequency component ratio signal (B/A) storage unit 202 illustrated in FIG. 13).

(Step S103)

On the other hand, in the case of the determination of "There is No Motion" in the static/dynamic determination processing using the calculation norm based on the new sensor detection value in step S101, the processing of step S103 is executed.

In step S103, the newly acquired frequency component ratio (B/A) is eliminated as an invalid value which is not applied to the mounting position determination, and the frequency component ratio (B/A), which is the past valid value stored in the storage unit (=a calculation value at a timing when the determination of "There is Motion" is made) is acquired, and is set as data for mounting position determination.

(Steps S104 to S106)

The processing of steps S104 to S106 are processing executed by the mounting position determination processing unit 203 illustrated in FIG. 13.

In the static/dynamic determination unit 201, in the case of the determination of "There is Motion", the mounting position determination processing unit 203 executes the determination processing of the sensor mounting position by using the input newest frequency component ratio signal (B/A).

On the other hand, in the static/dynamic determination unit 201, in the case of the determination of "There is No Motion", the determination processing of the sensor mounting position is executed by using the past valid frequency component ratio signal (B/A), which is the newest valid value in the values input in the past, without using the newest frequency component ratio signal (B/A).

The mounting position determination processing unit 203 executes the comparison processing between the frequency component ratio signal (B/A) and the mounting position determination threshold value set in advance, and outputs the mounting position determination count data.

The determination processing based on the following determination expression is executed.

(Determination Expression): Frequency Component Ratio Signal (*B/A*)>Mounting Position Determination Threshold Value In a case where the determination expression described above is established, in step S105, it is determined that there are many high-frequency components (B) in the frequency component ratio signal (B/A), it is determined that the sensor mounting position is on other than the human body, a non-human body mounting determination count is increased by +1 (one increment), and in step S107, sensor mounting position count data (Non-Human Body Mounting Determination Count+1) is stored in the count data accumulation unit.

On the other hand, in a case where the determination expression described above is not established, in step S106, it is determined that there are few high-frequency components (B) in the frequency component ratio signal (B/A), it is determined that the sensor mounting position is on the human body, a human body mounting determination count is increased by +1 (one increment), and in step S107, the sensor mounting position count data (Human Body Mounting Determination Count+1) is stored in the count data accumulation unit.

(Step S108)

The processing from step S108 are processing executed by the statistical processing unit 205 illustrated in FIG. 13.

In step S108, the statistical processing unit 205 determines whether or not it is the determination result output timing defined in advance.

In a case where it is determined that it is the determination result output timing, the process proceeds to step S109.

(Steps S109 to S110)

In steps S109 to S110, the statistical processing unit 205 compares the number of counts accumulated in the count data accumulation unit 204.

In a case where the number of human body mounting determination counts is greater than the number of non-human body mounting counts, the process proceeds to step S111.

On the other hand, in a case where the number of human body mounting determination counts is less than the number of non-human body mounting counts, the process proceeds to step S112.

(Step S111)

In a case where the number of human body mounting determination counts is greater than the number of non-human body mounting counts, the process proceeds to step S111, and in step S111, the statistical processing unit 205 outputs the determination result that the sensor is mounted on the human body, as the sensor mounting position determination result. The output destination of the determination result is the sensor mounting position corresponding data selection unit 132 illustrated in FIG. 11, as described above with reference to FIG. 11.

(Step S112)

On the other hand, in a case where the number of human body mounting determination counts is less than the number of non-human body mounting counts, the process proceeds to step S112, and in step S112, the statistical processing unit 205 outputs the determination result that the sensor is mounted on other than the human body, as the sensor mounting position determination result. The output destination of the determination result is the sensor mounting position corresponding data selection unit 132 illustrated in FIG. 11, as described above with reference to FIG. 11.

Furthermore, for example, in the determination processing of steps S109 to S110, in a case where the number of human body mounting determination counts is coincident with the number of non-human body mounting counts, the same determination result as the previous determination result may be output.

The determination result is output to the sensor mounting position corresponding data selection unit 132 illustrated in FIG. 11, the generating and recording of the metadata to which the jump detection result or the turn detection result based on the correct sensor output result according to the sensor mounting position (the human body mounting) is applied, is realized.

[6. Other Examples]

First, one example configuration of the sensor mounting position determination unit 157 will be described with reference to FIG. 13.

In the configuration described with reference to FIG. 13, for example, whenever the frequency component ratio signal (B/A) (=High-Frequency Component/Low-Frequency Component) is input, the processing of determining whether the sensor is "Human Body Mounting Sensor" or "Non-Human Body Mounting Sensor" is executed, the number of determinations is accumulated as the number of counts, the number of counts is compared in constant time unit, and the statistical processing of the count value outputting the determination result is executed.

The configuration of the sensor mounting position determination unit 157 described with reference to FIG. 13 is an example, and, in addition, various configurations can be applied.

Hereinafter, a configuration example of the sensor mounting position determination unit 157 different from the configuration illustrated in FIG. 13 will be described.

The following configuration example will be sequentially described.

(1) Configuration Example to which Low-Pass Filter is Applied.

(2) Configuration Example to which Movement Average Calculation Unit is Applied (3) Configuration Example to which Bandpass Filter (BPF) is Applied (4) Configuration Example to which Singularity Elimination Processing Unit is Applied

[6-(1) Configuration Example of Sensor Mounting Position Determination Unit to which Low-Pass Filter is Applied]

First, a configuration example of the sensor mounting position determination unit 157 to which a low-pass filter is applied, will be described with reference to FIG. 18.

Figure 18:
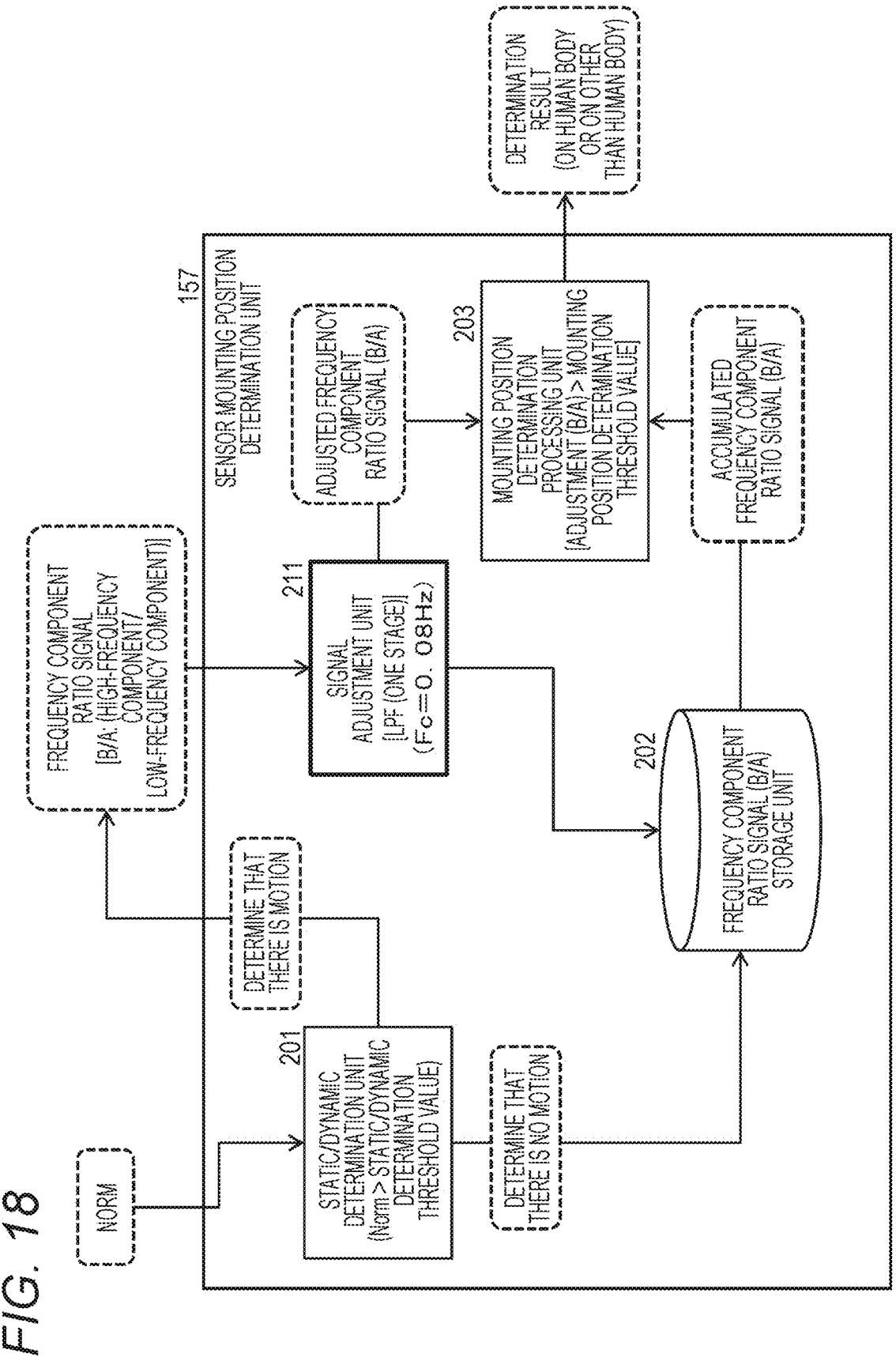
FIG. 18 is a diagram illustrating a configuration and a processing example of a sensor mounting position determination unit to which a low-pass filter is applied.

The sensor mounting position determination unit 157 illustrated in FIG. 18 is the sensor mounting position determination unit 157 which is similar to the sensor mounting position determination unit 157 described above with reference to FIG. 13, and is set in the sensor mounting position detection unit 131 illustrated in FIG. 11 and FIG. 12, generates the determination result of whether the sensor is "Human Body Mounting Sensor" or "Non-Human Body Mounting Sensor", and executes processing of outputting the determination result to the sensor mounting position corresponding data selection unit 132 illustrated in FIG. 11.

The configurations and the processing of the static/dynamic determination unit 201 and the frequency component ratio signal (B/A) storage unit 202 of the sensor mounting position determination unit 157 illustrated in FIG. 18 are similar to the configurations and the processing described above with reference to FIG. 13.

The static/dynamic determination unit 201 of the sensor mounting position determination unit 157 compares the value of the norm calculated on the basis of the newly input sensor detection value, to the threshold value defined in advance (the static/dynamic determination threshold value).

As described above, the norm is the norm of the angular rate (u, v, and w) which is the sensor output, and is calculated according to the following expression.

Norm=SQRT($u^2+v^2+w^2$)

The static/dynamic determination unit 201 of the sensor mounting position determination unit 157 compares the threshold value defined in advance (the static/dynamic determination threshold value), to the value of the norm.

Norm>Static/Dynamic Determination Threshold Value

In a case where the expression described above is established, the sensor mounting body is determined as "There is Motion", the newly acquired frequency component ratio (B/A) is set as the valid value which is applied to the mounting position determination, and is input into a signal adjustment unit 211.

On the other hand, in the static/dynamic determination processing using the calculation norm based on the new sensor detection value, in the case of the determination of "There is No Motion" in a state where the expression described above is not establish, the newly acquired frequency component ratio (B/A) is eliminated as the invalid value which is not applied to the mounting position determination, the frequency component ratio (B/A), which is the past valid value stored in the storage unit, is acquired, and is set as the data for mounting position determination.

In this example, the sensor mounting body is determined as "There is Motion", and in a case where the newly acquired frequency component ratio signal (B/A) is set as the valid value which is applied to the mounting position determination, signal adjustment processing to which the low-pass filter (LPF) is applied, is executed with respect to the frequency component ratio signal (B/A).

The signal adjustment processing is the processing of the signal adjustment unit 211 illustrated in FIG. 18.

The signal adjustment unit 211 includes a one-stage LPF (Fc=0.08 Hz), and is a low-pass filter extracting a low-frequency signal of less than or equal to 0.08 Hz.

That is, processing of deleting a high-frequency component which is determined as having a lot of noise signals, from the frequency component ratio signal (B/A).

The signal adjustment result is output to the mounting position determination processing unit 203, and is further stored in the frequency component ratio signal (B/A) storage unit 202.

In the static/dynamic determination unit 201, in the case of the determination of "There is Motion", the mounting position determination processing unit 203 executes the determination processing of the sensor mounting position by using the signal adjustment unit 211, that is, the newest adjusted frequency component ratio signal (B/A) which is generated from the LPF.

On the other hand, in the static/dynamic determination unit 201, in the case of the determination of "There is No Motion", the determination processing of the sensor mounting position is executed on the basis of the newest past adjusted frequency component ratio signal (B/A) in the signals stored in the frequency component ratio signal (B/A) storage unit 202, without using the newest frequency component ratio signal (B/A).

The mounting position determination processing unit 203 executes the comparison processing between the adjusted frequency component ratio signal (B/A) and the mounting position determination threshold value set in advance, and outputs the mounting position determination count data.

The determination processing based on the following determination expression is executed.

Adjusted Frequency Component Ratio Signal (*B/A*)>Mounting Position Determination Threshold Value     (Determination Expression):

In a case where the determination expression described above is established, it is determined that the sensor mounting position is on other than the human body, and the determination result is output.

On the other hand, in a case where the determination expression described above is not established, it is determined that the sensor mounting position is on the human body, and the determination result is output.

The determination result is output to the sensor mounting position corresponding data selection unit 132 illustrated in FIG. 11, and the generating and recording of the metadata to which the jump detection result or the turn detection result based on the correct sensor output result according to the sensor mounting position (the human body mounting) is applied, is realized.

Furthermore, in the configuration illustrated in FIG. 18, a determination result output interval of the mounting position determination processing unit 203 is set to an interval similar to the sensor detection interval (64 times/sec), or an interval longer than the sensor detection interval, for example, an interval of several seconds.

In the configuration illustrated in FIG. 18, the accumulation processing or the statistical processing of the count data as described above with reference to FIG. 13 can be omitted.

FIG. 19 is a diagram illustrating a test result of evaluation of a processing result of the sensor mounting position determination unit illustrated in FIG. 18.

FIG. 19 illustrates the following data.

(1) Temporal Transition Data of Frequency Component Ratio Signal (B/A) (=High-Frequency Component/Low-Frequency Component) Generated on basis of Output of Sensor 20

(2b) Determination Result Data Obtained by Processing of Sensor Mounting Position Determination Unit to which LPF Described with reference to FIG. 18 is Applied In a graph of the frequency component ratio signal (B/A) of (1), a horizontal axis is time, and a vertical axis is a signal value of the frequency component ratio signal (B/A).

In a graph of an LPF application result of (2b), a horizontal axis is time, and a vertical axis is a signal value of the adjusted frequency component ratio signal (B/A), which is the output of the signal adjustment unit (LPF) 211 illustrated in FIG. 18.

The data illustrated in FIG. 19 is data obtained by mounting the sensor on other than the human body and by performing a test.

From a test result illustrated in FIG. 19, a conclusion is obtained in which in a case where the sensor mounting position is determined by using the signal value of the adjusted frequency component ratio signal (B/A) which is an LPF application result signal illustrated in FIG. 19(2b), high-accuracy determination processing having few errors can be performed, compared to a case where the sensor mounting position is determined by applying the frequency component ratio signal (B/A) illustrated in FIG. 19(1) as it is.

[6-(2) Configuration Example of Sensor Mounting Position Determination Unit to which Movement Average Calculation Unit is Applied]

Next, a configuration example of the sensor mounting position determination unit 157 to which a movement average calculation unit is applied, will be described with reference to FIG. 20.

Figure 20:
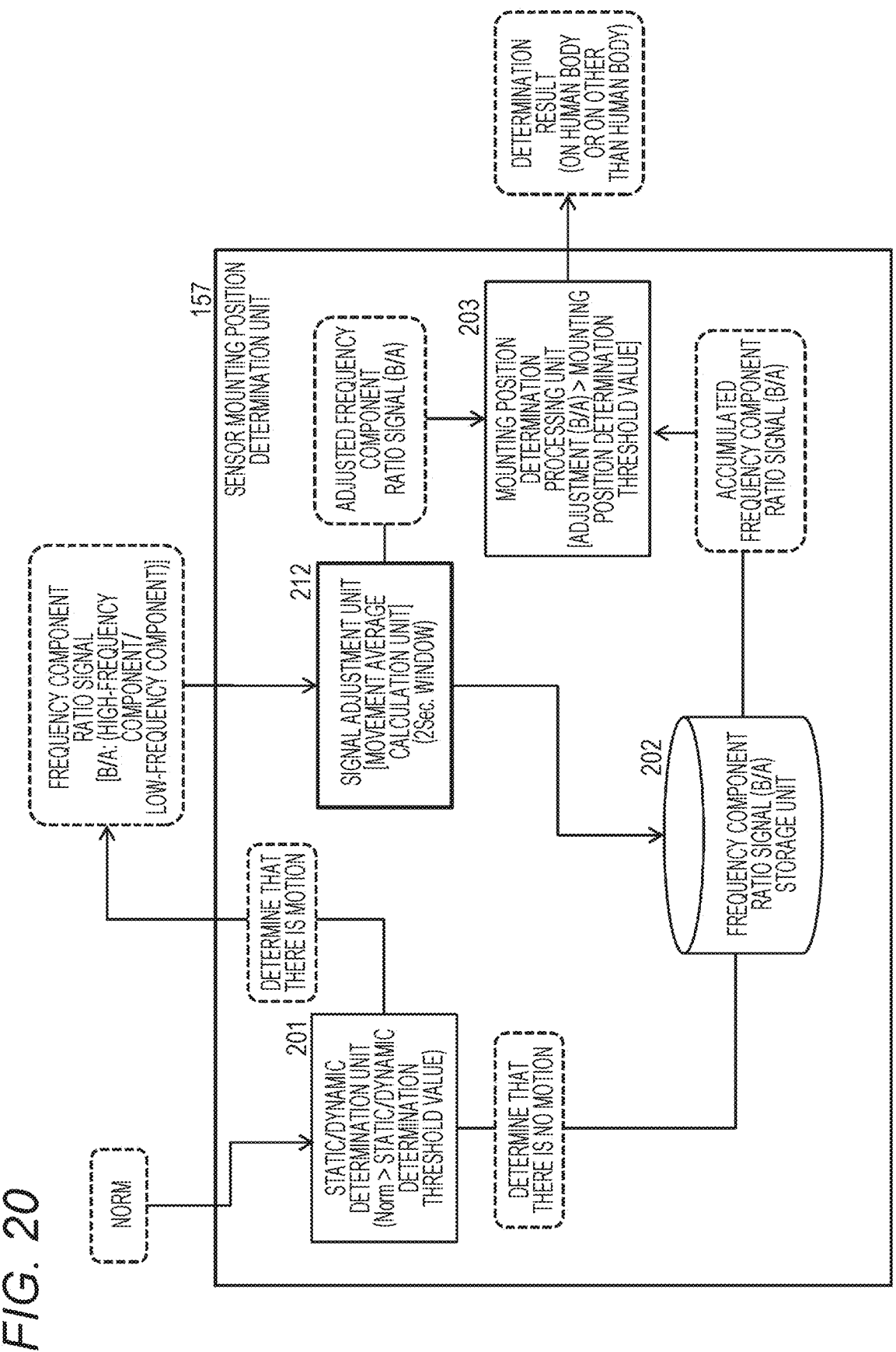
FIG. 20 is a diagram illustrating a configuration and a processing example of a sensor mounting position determination unit to which a movement average calculation unit is applied.

The sensor mounting position determination unit 157 illustrated in FIG. 20 is similar to the sensor mounting position determination unit 157 described above with reference to FIG. 13, and is the sensor mounting position determination unit 157 set in the sensor mounting position detection unit 131 illustrated in FIG. 11 and FIG. 12, generates the determination result of whether the sensor is "Human Body Mounting Sensor" or "Non-Human Body Mounting Sensor", and executes processing of outputting the determination result to the sensor mounting position corresponding data selection unit 132 illustrated in FIG. 11.

The configurations and the processing of the static/dynamic determination unit 201 and the frequency component ratio signal (B/A) storage unit 202 of the sensor mounting position determination unit 157 illustrated in FIG. 20 are similar to the configurations and the processing described above with reference to FIG. 13.

The static/dynamic determination unit 201 of the sensor position determination unit 157 compares the value of the norm calculated on the basis of the newly input sensor detection value, to the threshold value defined in advance (the static/dynamic determination threshold value).

As described above, the norm is the norm of the angular rate (u, v, and w) which is the sensor output, and is calculated according to the following expression.

Norm=SQRT($u^2+v^2+w^2$)

The static/dynamic determination unit 201 of the sensor mounting position determination unit 157 compares the threshold value defined in advance (the static/dynamic determination threshold value), to the value of the norm.

Norm>Static/Dynamic Determination Threshold Value

In a case where the expression described above is established, the sensor mounting body is determined as "There is Motion", and the newly acquired frequency component ratio (B/A) is set as the valid value which is applied to the mounting position determination, and is input into the signal adjustment unit 212.

On the other hand, in the static/dynamic determination processing using the calculation norm based on the new sensor detection value, in the case of the determination of "There is No Motion" in a state where the expression described above is not established, the newly acquired frequency component ratio (B/A) is eliminated as the invalid value which is not applied to the mounting position determination, and the frequency component ratio (B/A), which is the past valid value stored in the storage unit, is acquired, and is set as the data for mounting position determination.

In this example, in a case where the sensor mounting body is determined as "There is Motion", and the newly acquired frequency component ratio signal (B/A) is set as the valid value which is applied to the mounting position determination, the signal adjustment processing to which movement average calculation processing is applied, is executed with respect to the frequency component ratio signal (B/A).

The signal adjustment processing is the processing of the signal adjustment unit 212 illustrated in FIG. 20.

The signal adjustment unit 212 executes the movement average calculation processing in which a time frame set as an observation window (zone) for acquiring data is 2 Sec.

That is, processing of deleting a signal such as a noise from the frequency component ratio signal (B/A) is performed according to the movement average calculation processing.

The signal adjustment result is output to the mounting position determination processing unit 203, and is further stored in the frequency component ratio signal (B/A) storage unit 202.

In the static/dynamic determination unit 201, in a case where the determination of "There is Motion", the mounting position determination processing unit 203 executes the determination processing of the sensor mounting position by using the signal adjustment unit 212, that is, the newest adjusted frequency component ratio signal (B/A) adjusted by the movement average calculation processing.

On the other hand, in the static/dynamic determination unit 201, in the case of the determination of "There is No Motion", the determination processing of the sensor mounting position is executed on the basis of the newest past adjusted frequency component ratio signal (B/A) in the signals stored in the frequency component ratio signal (B/A) storage unit 202, without using the newest frequency component ratio signal (B/A).

The mounting position determination processing unit 203 executes the comparison processing between the adjusted frequency component ratio signal (B/A) and the mounting position determination threshold value set in advance, and outputs the mounting position determination count data.

The determination processing based on the following determination expression is executed.

Adjusted Frequency Component Ratio Signal (B/A)>Mounting Position Determination Threshold Value     (Determination Expression):

In a case where the determination expression described above is established, it is determined that the sensor mounting position is on other than the human body, and the determination result is output.

On the other hand, in a case where the determination expression described above is not established, it is determined that the sensor mounting position is on the human body, and the determination result is output.

The determination result is output to the sensor mounting position corresponding data selection unit 132 illustrated in FIG. 11, and the generating and recording of the metadata to which the jump detection result or the turn detection result based on the correct sensor output result according to the sensor mounting position (the human body mounting) is applied is realized.

Furthermore, in the configuration illustrated in FIG. 20, the determination result output interval of the mounting position determination processing unit 203 is set to an interval similar to the sensor detection interval (64 times/sec), or an interval longer than the sensor detection interval, for example, an interval of several seconds.

In the configuration illustrated in FIG. 20, the accumulation processing or the statistical processing of the count data described above with reference to FIG. 13 can be omitted.

FIG. 21 is a diagram illustrating a test result of evaluation of a processing result of the sensor mounting position determination unit illustrated in FIG. 20.

FIG. 21 illustrates the following data.

(1) Temporal Transition Data of Frequency Component Ratio Signal (B/A) (=High-Frequency Component/Low-Frequency Component) Generated or basis of Output of Sensor 20

(2c) Determination Result Data Obtained by Processing of Sensor Mounting Position Determination Unit Including Signal Adjustment Unit to which Movement Average Calculation Processing Described with reference to FIG. 20 is Applied In a graph of the frequency component ratio signal (B/A) of (1), a horizontal axis is time, and a vertical axis is a signal value of the frequency component ratio signal (B/A).

In a graph of a movement average application result of (2c), a horizontal axis is time, and a vertical axis is a signal value of the adjusted frequency component ratio signal (B/A), which is the output of the signal adjustment unit (the movement average calculation unit) 212 illustrated in FIG. 20.

The data illustrated in FIG. 21 is data obtained by mounting the sensor on other than the human body and by performing a test.

From a test result illustrated in FIG. 21, a conclusion is obtained in which in a case where the sensor mounting position is determined by using the signal value of the adjusted frequency component ratio signal (B/A) which is the application result signal of the movement average calculation processing illustrated in FIG. 21 (2c), high-accuracy determination processing having few errors can be performed, compared to a case where the sensor mounting position is determined by applying the frequency component ratio signal (B/A) illustrated in FIG. 21(1)) as it is.

[6-(3) Configuration Example of Sensor Mounting Position Determination Unit to which Bandpass Filter (BPF) is Applied]

Next, a configuration example of the sensor mounting position determination unit 157 to which a bandpass filter (BPF) is applied, will be described with reference to FIG. 22.

Figure 22:
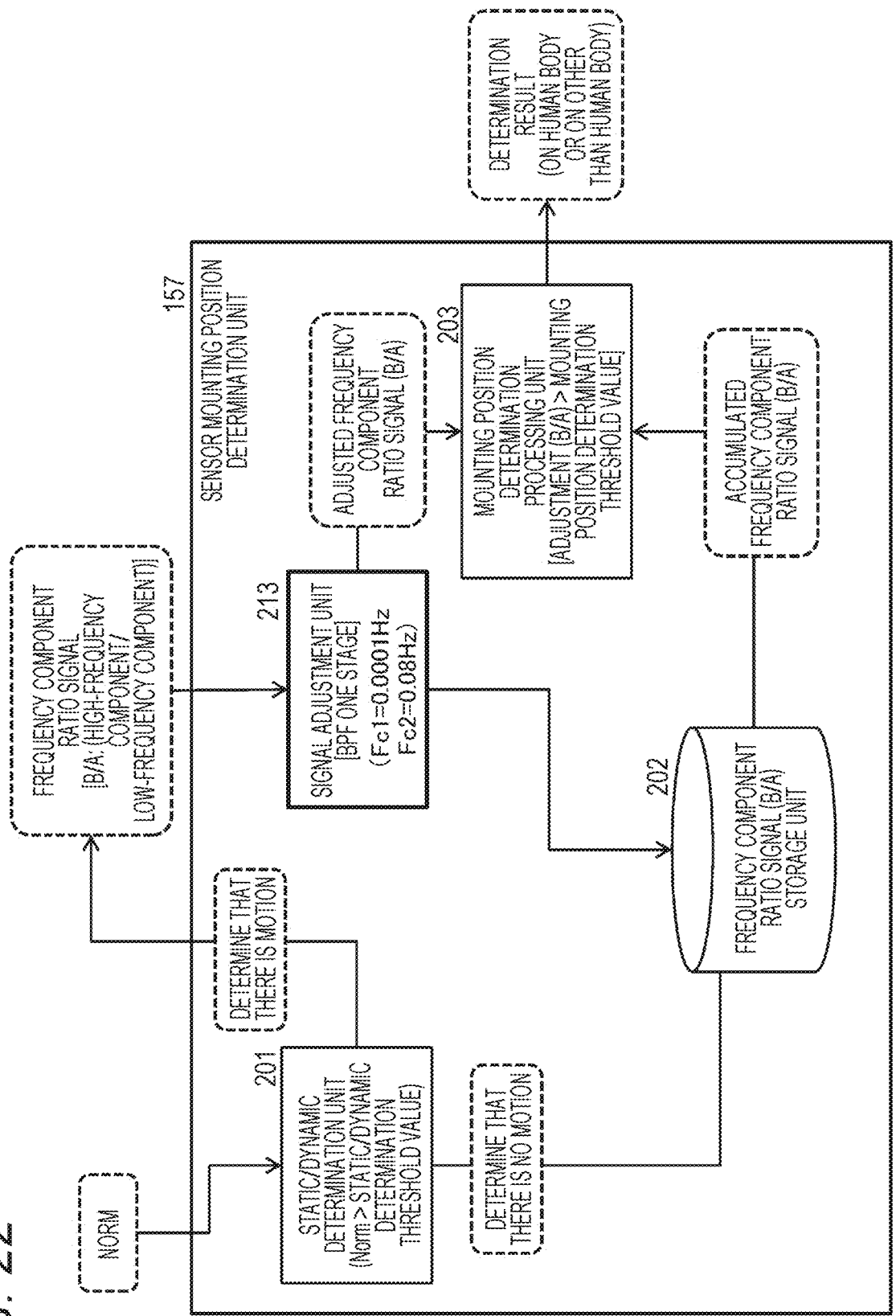
FIG. 22 is a diagram illustrating a configuration and a processing example of a sensor mounting position determination unit to which a bandpass filter is applied.

The sensor mounting position determination unit 157 illustrated in FIG. 22 is similar to the sensor mounting position determination unit 157 described above with reference to FIG. 13, and is the sensor mounting position determination unit 157 set in the sensor mounting position detection unit 131 illustrated in FIG. 11 and FIG. 12, generates the determination result, of whether the sensor is "Human Body Mounting Sensor" or "Non Human Body Mounting Sensor", and executes processing of outputting the determination result to the sensor mounting position corresponding data selection unit 132 illustrated in FIG. 11.

The configurations and the processing of the static/dynamic determination unit 201 and the frequency component ratio signal (B/A) storage unit 202 of the sensor mounting position determination unit 157 illustrated in FIG. 22 are similar to the configurations and the processing described above with reference to FIG. 13.

The static/dynamic determination unit 201 of the sensor mounting position determination unit 157 compares the value of the norm calculated on the basis of the newly input sensor detection value, to the threshold value defined in advance (the static/dynamic determination threshold value).

As described above, the norm is the norm of the angular rate (u, v, and w) which is the sensor output, and is calculated according to the following expression.

Norm=SQRT($u^2+v^2+w^2$)

The static/dynamic determination unit 201 of the sensor mounting position determination unit 157 compares the threshold value defined in advance (the static/dynamic determination threshold value), to the value of the norm.

Norm>Static/Dynamic Determination Threshold Value

In a case where the expression described above is established, the sensor mounting body is determined as "There is Motion", the newly acquired frequency component ratio (B/A) is set as the valid value which is applied to the mounting position determination, and is input into a signal adjustment unit 213.

On the other hand, in the static/dynamic determination processing using the calculation norm based on the new sensor detection value, in the case of the determination of "There is No Motion" in a state where the expression described above is not established, the newly acquired frequency component ratio (B/A) is eliminated as the invalid value which is not applied to the mounting position determination, the frequency component ratio (B/A), which is the past valid value stored in the storage unit, is acquired, and is set as the data for mounting position determination.

In this example, in a case where the sensor mounting body is determined as "There is Motion", the newly acquired frequency component ratio signal (B/A) is set as the valid value which is applied to the mounting position determination, the signal adjustment processing to which the bandpass filter (BPF) is applied, is executed with respect to the frequency component ratio signal (B/A).

The signal adjustment processing is the processing of the signal adjustment unit 213 illustrated in FIG. 22.

The signal adjustment unit 213 executes processing of extracting a signal of an intermediate frequency band of 0.0001 Hz to 0.08 Hz, according to processing to which a one-stage BPF is applied.

That is, processing of deleting a signal such as a noise from the frequency component ratio signal (B/A) is performed according to the BPF application processing.

The signal adjustment result is output to the mounting position determination processing unit 203, and is further stored in the frequency component ratio signal (B/A) storage unit 202.

In the static/dynamic determination unit 201, in the case of the determination of "There is Motion" the mounting position determination processing unit 203 executes the determination processing of the sensor mounting position by using the newest adjusted frequency component ratio signal (B/A) adjusted by the signal adjustment unit 213, that is, the BPF application processing.

On the other hand, in the static/dynamic determination unit 201, in the case of the determination of "There is No Motion", the determination processing of the sensor mounting position is executed on the basis of the newest past adjusted frequency component ratio signal (B/A) in the signals stored in the frequency component ratio signal (B/A) storage unit 202, without using the newest frequency component ratio signal (B/A).

The mounting position determination processing unit 203 executes the comparison processing between the adjusted frequency component ratio signal (B/A) and the mounting position determination threshold value set in advance, and outputs the mounting position determination count data.

The determination processing based on the following determination expression is executed.

Adjusted Frequency Component Ratio Signal
(B/A)>Mounting Position Determination Threshold Value        (Determination Expression):

In a case where the determination expression described above is established, it is determined that the sensor mounting position is on other than the human body, and the determination result is output.

On the other hand, in a case where the determination expression described above is not established, it is determined that the sensor mounting position is on the human body, and the determination result is output.

The determination result is output to the sensor mounting position corresponding data selection unit 132 illustrated in FIG. 11, and the generating and recording of the metadata to which the jump detection result or the turn detection result based on the correct sensor output result according to the sensor mounting position (the human body mounting) is applied, is realized.

Furthermore, in the configuration illustrated in FIG. 22, the determination result output interval of the mounting position determination processing unit 203 is set to an interval similar to the sensor detection interval (64 times/sec), or an interval longer than the sensor detection interval, for example, an interval of several seconds.

In the configuration illustrated in FIG. 22, the accumulation processing or the statistical processing of the count data as described above with reference to FIG. 13 can be omitted.

Figure 23:
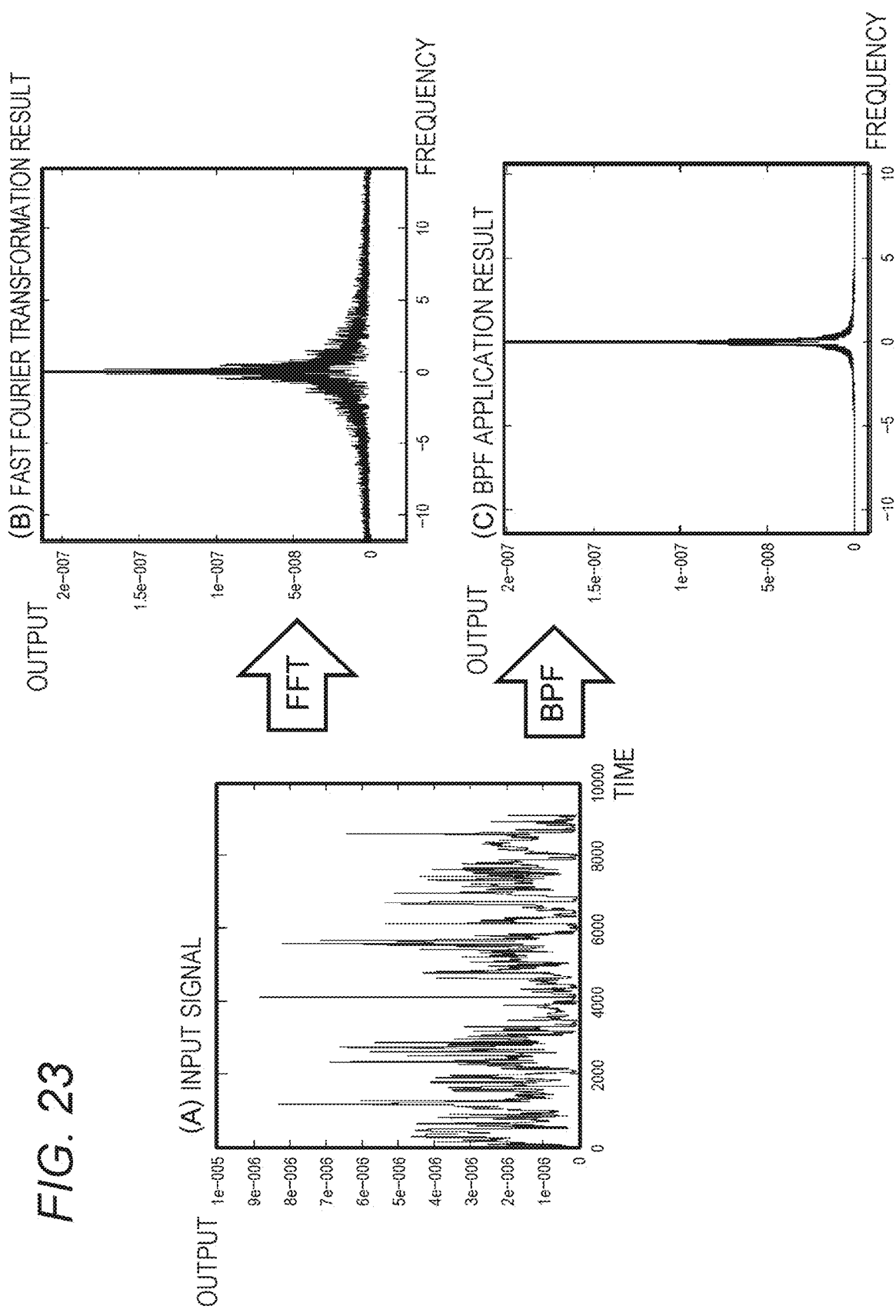
FIG. 23 is a diagram illustrating a modification example of a signal according to processing to which a bandpass filter is applied.

FIG. 23 is a diagram illustrating a general signal conversion processing example by applying a BPF.

FIG. 23 illustrates (B) a fast Fourier transformation (FFT) application result with respect to (A) an input signal, and (C) a BPF application result.

As illustrated in the BPF application result, it is known that only a specific frequency component is extracted.

FIG. 24 is a diagram illustrating a test result of evaluation of a processing result of the sensor mounting position determination unit illustrated in FIG. 22.

FIG. 24 illustrates the following data.

(1) Temporal Transition Data of Frequency Component Ratio Signal (B/A) (=High-Frequency Component/Low-Frequency Component) Generated on basis of Output of Sensor 20

(2d) Determination Result Data Obtained by Processing of Sensor Mounting Position Determination Unit including Signal Adjustment Unit to which BPF Described with reference to FIG. 22 is Applied In a graph of the frequency component ratio signal (B/A) of (1), a horizontal axis is time, and a vertical axis is a signal value of the frequency component ratio signal (B/A).

In a graph of a movement average application result of (2d), a horizontal axis is time, and a vertical axis is a signal value of the adjusted frequency component ratio signal (B/A), which is the output of the signal adjustment unit (BPF) 213 illustrated in FIG. 22.

The data illustrated in FIG. 24 is the data obtained by mounting the sensor on other than the human body and by performing a test.

From a test result illustrated in FIG. 24,
a conclusion is obtained in which in a case where the sensor mounting position is determined by using the signal value of the adjusted frequency component ratio signal (B/A) which is a BPF application result signal illustrated in FIG. 24(2d), high-accuracy determination processing having few errors can be performed, compared to a case where the sensor mounting position is determined by applying the frequency component ratio signal (B/A) illustrated in FIG. 24(1) as it is.

[6-(4) Configuration Example of Sensor Mounting Position Determination Unit to which Singularity Elimination Processing Unit is Applied]

Next, a configuration example of the sensor mounting position determination unit 157 to which the singularity elimination processing unit is applied, will be described with reference to FIG. 25.

Figure 25:
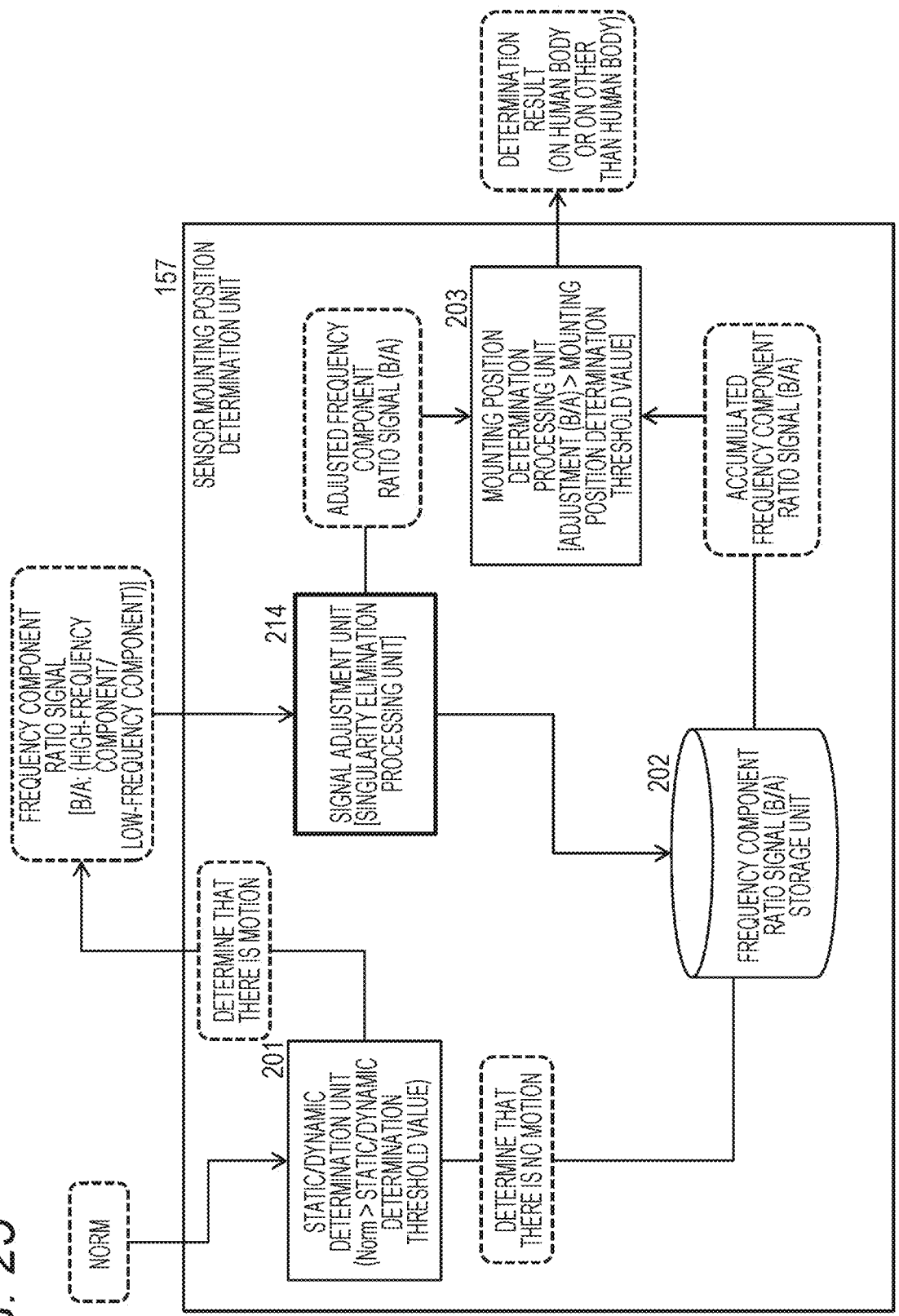
FIG. 25 is a diagram illustrating a configuration and a processing example of a sensor mounting position determination unit to which singularity elimination processing is applied.

The sensor mounting position determination unit 157 illustrated in FIG. 25 is similar to the sensor mounting position determination unit 157 described above with reference to FIG. 13, is the sensor mounting position determination unit 157 set in the sensor mounting position detection unit 131 illustrated in FIG. 11 and FIG. 12, generates the determination result of whether the sensor is "Human Body Mounting Sensor" or "Non-Human Body Mounting Sensor", and executes processing of outputting the determination result to the sensor mounting position corresponding data selection unit 132 illustrated in FIG. 11.

The configurations and the processing of the static/dynamic determination unit 201 and the frequency component ratio signal (B/A) storage unit 202 of the sensor mounting position determination unit 157 illustrated in FIG. 25 are similar to the configurations and the processing described above with reference to FIG. 13.

The static/dynamic determination unit 201 of the sensor mounting position determination unit 157 compares the value of the norm calculated on the basis of the newly input sensor detection value, to the threshold value defined in advance (the static/dynamic determination threshold value).

As described above, the norm is the norm of the angular rate (u, v, and w), which is the sensor output, and is calculated according to the following expression.

Norm=SQRT($u^1+v^2+w^2$)

The static/dynamic determination unit 201 of the sensor mounting position determination unit 157 compares the threshold value defined in advance (the static/dynamic determination threshold value), to the value of the norm.

Norm>Static/Dynamic Determination Threshold Value

In a case where the expression described above is established, the sensor mounting body is determined as "There is Motion", newly acquired frequency component ratio (B/A) is set as the valid value which is applied to the mounting position determination, and is input into the signal adjustment unit 213.

On the other hand, in the static/dynamic determination processing using the calculation norm based on the new sensor detection value, in the case of the determination of "There is No Motion" in a state where the expression described above is not established, the newly acquired frequency component ratio (B/A) is eliminated as the invalid value which is not applied to the mounting position determination, the frequency component ratio (B/A), which is the past valid value stored in the storage unit, is acquired, and is set as the data for mounting position determination.

In this example, in a case where the sensor mounting body is determined as "There is Motion", and the newly acquired frequency component ratio signal (B/A) is set as the valid value which applied to the mounting position determination, the signal adjustment processing to which the singularity elimination processing is applied, is executed with respect to the frequency component ratio signal (B/A).

The signal adjustment processing is the processing of a signal adjustment unit 214 illustrated in FIG. 25.

The signal adjustment unit 214 executes the singularity elimination processing.

That is, processing of deleting a signal such as a noise from the frequency component ratio signal (B/A) is performed according to the singularity elimination processing.

The signal adjustment result is output to the mounting position determination processing unit 203, and is stored in the frequency component ratio signal (B/A) storage unit 202.

In the static/dynamic determination unit 201, in the case of the determination of "There is Motion", the mounting position determination processing unit 203 executes the determination processing of the sensor mounting position by using the newest adjusted frequency component ratio signal (B/A) adjusted by the signal adjustment unit 214, that is, the singularity elimination processing.

On the other hand, in the static/dynamic determination unit 201, in the case of the determination of "There is No Motion", the determination processing of the sensor mounting position is executed on the basis of the newest past adjusted frequency component ratio signal (B/A) in the signals stored in the frequency component ratio signal (B/A) storage unit 202, without using the newest frequency component ratio signal (B/A).

The mounting position determination processing unit 203 executes the comparison processing between the adjusted frequency component ratio signal (B/A) and the mounting position determination threshold value set in advance, and outputs the mounting position determination count data.

The determination processing based on the following determination expression is executed.

Adjusted Frequency Component Ratio Signal (B/A)>Mounting Position Determination Threshold Value  (Determination Expression):

In a case where the determination expression described above is established, it is determined that the sensor mounting position is on other than the human body, and the determination result is output.

On the other hand, in a case where the determination expression described above is not established, it is determined that the sensor mounting position is on the human body, and the determination result is output.

The determination result is output to the sensor mounting position corresponding data selection unit 132 illustrated in FIG. 11, and the generating and recording of the metadata to which the jump detection result or the turn detection result based on the correct sensor output result according to the sensor mounting position (the human body mounting) is applied, is realized.

Furthermore, in the configuration illustrated in FIG. 25, the determination result output interval of the mounting position determination processing unit 203 is set to an interval similar to the sensor detection interval (64 times/sec), or an interval longer than the sensor detection interval, for example, an interval of several seconds.

In the configuration illustrated in FIG. 25, the accumulation processing or the statistical processing of the count data described above with reference to FIG. 13 can be omitted.

Figure 26:
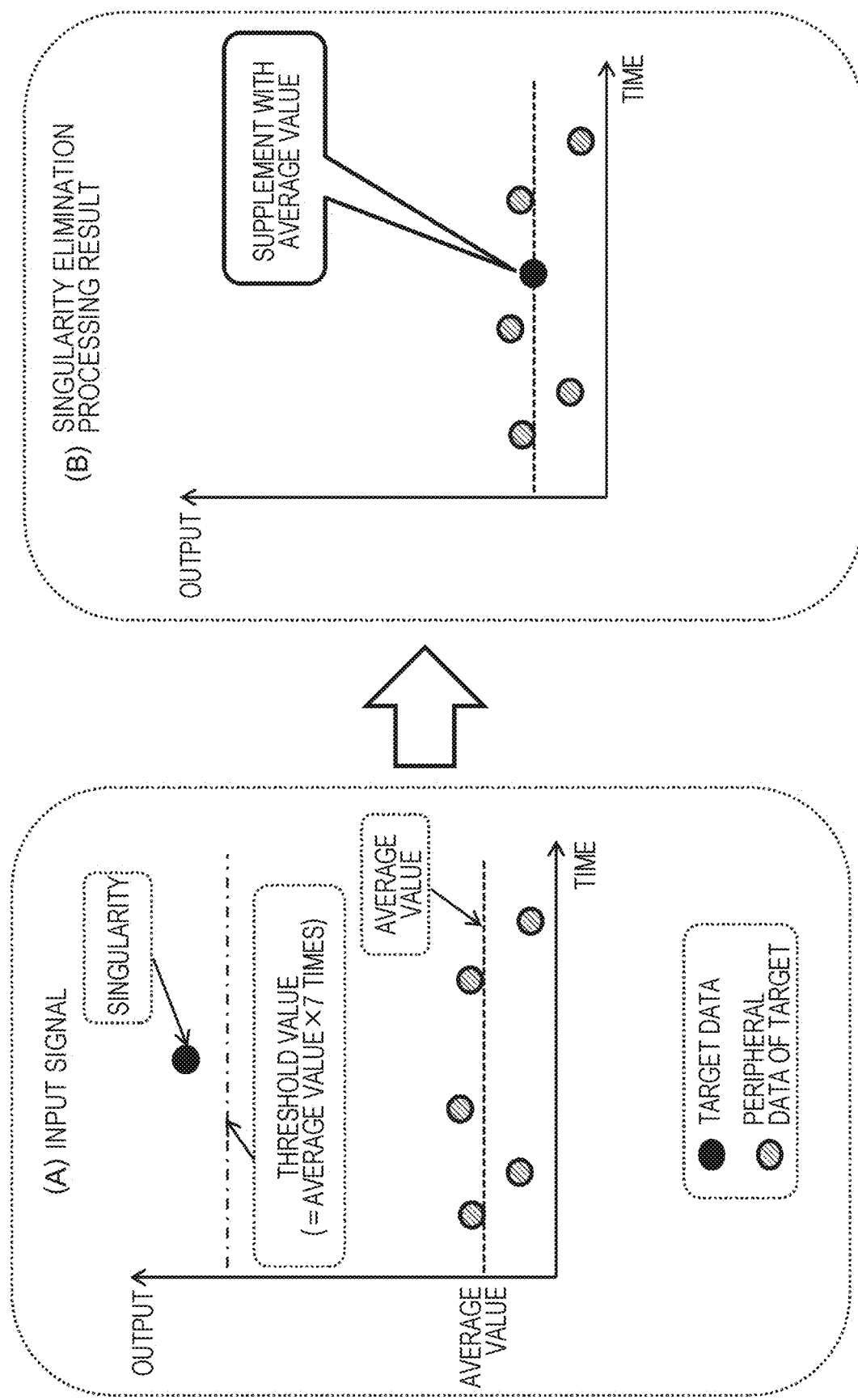
FIG. 26 is a diagram illustrating a modification example of a signal according to the singularity elimination processing.

FIG. 26 is a diagram illustrating a general signal conversion processing example of the singularity elimination processing.

FIG. 26 illustrates (B) a singularity elimination processing result with respect to (A) an input signal.

As illustrated in FIG. 26, for example, a singularity significantly separated from an average value is moved to the average value, and thus, it is possible to eliminate the singularity from the input data.

FIG. 27 is a diagram illustrating a test result of evaluation of a processing result of the sensor mounting position determination unit illustrated in FIG. 25.

FIG. 27 illustrates the following data.

(1) Temporal Transition Data of Frequency Component Ratio Signal (B/A) (=High-Frequency Component/Low-Frequency Component) Generated on basis of Output of Sensor 20

(2e) Determination Result Data Obtained by Processing of Sensor Mounting Position Determination Unit including Signal Adjustment Unit to which Singularity Elimination Processing Described with reference to FIG. 25 is Applied In a graph of the frequency component ratio signal (B/A) of (1), a horizontal axis is time, and a vertical axis is a signal value of the frequency component ratio signal (B/A).

In a graph of a singularity elimination processing application result of (2e), a horizontal axis is time, and a vertical axis is a signal value of the adjusted frequency component ratio signal (B/A), which is the output of the signal adjustment unit (BPF) 214 illustrated in FIG. 25.

The data illustrated in FIG. 27 is data obtained by mounting the sensor on other than the human body and by performing a test.

From a test result illustrated in FIG. 27, a conclusion is obtained in which in a case where the sensor mounting position is determined by the signal value of the adjusted frequency component ratio signal (B/A), which is the BPF application result signal illustrated in FIG.

27(2e), high-accuracy determination processing having few errors can be performed, compared to a case where the sensor mounting position is determined by applying the frequency component ratio signal (B/A) illustrated in FIG. 27(1) as it is.

[7. Communication between Devices and Data Processing Sequence]

Next, communication between devices and a data processing sequence, which is executed at the time of performing the processing in a case where sensor mounting position determination processing according to each of the examples described above is executed, and the metadata with respect to the image is generated and is recorded, will be described.

Furthermore, three sequences in which setting of a device executing data processing such as the sensor mounting position determination processing is different as described below, will be sequentially described.

(1) Example in which Video Camera Executes Data Processing such as Sensor Mounting Position Determination Processing (2) Example in which Sensor Device Executes Data Processing such as Sensor Mounting Position Determination Processing (3) Example in which Server Executes Data Processing such as Sensor Mounting Position Determination Processing

[7-(1) Example in which Video Camera Executes Data Processing such as Sensor Mounting Position Determination Processing]

First, a sequence in a case where a video camera executes the data processing such as the sensor mounting position determination processing, will be described.

Figure 28:
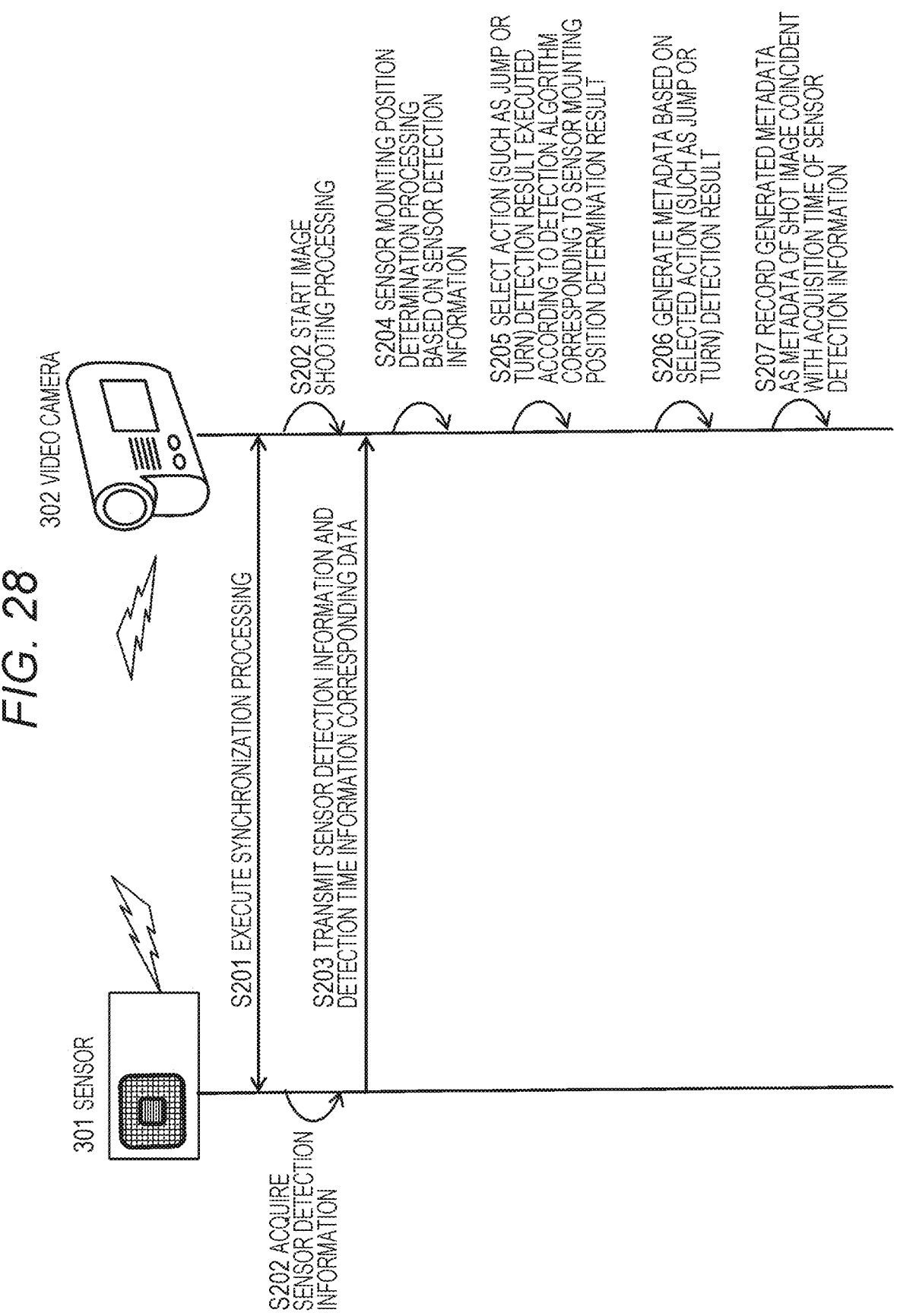
FIG. 28 is a sequence diagram illustrating an example of sensor mounting position determination processing using a sensor detection result, and a generating and recording processing sequence of the metadata.

FIG. 28 is a sequence diagram illustrating the sequence of communication between a sensor 301 which is mounted on the human body or is mounted on other than the human body, and detects the motion of the object, and a video camera 302 shooting the object of which the motion is detected by the sensor 301, and the data processing executed in each of the devices.

Hereinafter, processing of each step illustrated in the sequence diagram will be sequentially described.

(Step S201)

First, synchronization processing is executed between the sensor 301 and the video camera 302.

The sensor 301 and the video camera 302 are capable of communicating with each other through communication processing such as Wi-Fi or Bluetooth (BT (registered trademark)) communication.

In addition, the sensor 301 and the video camera 302 have a clocking function, respectively, and the sensor 301 records data in which detection information and detect timing are associated with each other, in a memory, at the time of sensor detection, and transmits the data to the video camera 302.

The video camera 302 shoots an image such as a moving image, and records the image in the memory by associating shooting time information with a shooting frame.

The video camera 302 inputs the detection information of the sensor 301 from the sensor 301, detects the action of the object (the jump and the turn) or the like based on the input detection information, and generates the metadata based on the detection information.

Further, the generated metadata is recorded in the storage image as the image corresponding metadata, along with the shot image at a timing corresponding to the metadata, that is, a frame of the shot image of the jump or the turn.

In order to perform the processing, it is necessary to establish an accurate corresponding relationship between detection time information of the sensor and the shooting timing of the shot image.

The synchronization processing of step S201 is synchronization processing for establishing an accurate corresponding relationship, and the synchronization processing is executed by controlling the clocking function of both of the devices.

(Step S202)

After the synchronization processing of step S201, the video camera 302 starts image shooting processing.

In addition, the sensor 301 acquires the sensor detection information.

For example, the motion information of the sensor mounting body is acquired by applying a gyro sensor or an acceleration rate sensor.

Specifically, angular rate information around a three-axis of a gyro sensor, acceleration rate information in a three-axis direction of an acceleration rate sensor, or the like is acquired.

(Step S203)

Next, in step S203, the sensor 301 transmits the sensor detection information to the video camera 302.

Furthermore, when the transmission processing is performed, the sensor 301 generates data in which the sensor detection information and sensor detection timing information are associated with each other, and transmits the generated data to the video camera 302.

(Step S204)

The video camera 302 executes the sensor mounting position determination processing by applying the sensor detection information received from the sensor 301.

The video camera 302 has the configuration described above with reference to FIG. 11.

In the sensor mounting position detection unit 131 illustrated in FIG. 11, the sensor mounting position determination processing of step 204 is executed.

Furthermore, the sensor mounting position detection unit 131 illustrated in FIG. 11, for example, has the configuration illustrated in FIG. 12.

(Step S205)

Next, in step S205, the video camera 302 selects an action (the jump, the turn, or the like) detection result executed according to a detection algorithm corresponding to the sensor mounting position determination result.

The processing is the processing executed by the sensor mounting position corresponding data selection unit 132 illustrated in FIG. 11.

As described above with reference to FIG. 11, the sensor mounting position corresponding data selection unit 132 selects any one of input from the human body mounting sensor corresponding processing unit 110 and input from the non-human body mounting sensor corresponding processing unit 120, according to the sensor mounting position determination result in the sensor mounting position detection unit 131 (on the human body or on other than the human body), and outputs the selected data to the metadata generating unit 133.

(Step S206)

Next, in step S206, the video camera 302 generates the metadata by applying a detection result of the selected action (the jump, the turn, or the like).

The processing is the processing executed by the metadata generating unit 133 illustrated in FIG. 11.

The metadata generating unit 133 generates the metadata, according to the input from the sensor mounting position corresponding data selection unit 132, that is, the input of the following data, as described above with reference to FIG. 11.

(1) Jump Detection Result (Human Body Mounting Sensor Corresponding Jump Data) and Turn Detection Result (Human Body Mounting Sensor Corresponding Turn Data), Executed by Presuming that Sensor is Mounted on Human Body (2) Jump Detection Result (Non-Human Body Mounting Sensor Corresponding Jump Data) and Turn Detection Result (Non-Human Body Mounting Sensor Corresponding Turn Data), Executed by Presuming that Sensor is Mounted on Other than Human (Step S207)

Next, in step S207, the video camera 302 records the metadata generated in step S206, as metadata of the shot image coincident with acquisition time of the sensor detection information which is applied for generating the metadata.

The sensor 301 and the video camera are subjected to the synchronization processing, and clocking times are adjusted to be coincident with each other, as described above in the processing of step S201.

The video camera stores the metadata generated in step S206 in the storage unit in association with the image, as the metadata with respect to the shot image including time information coincident with the sensor detection time information.

An example of the image data and the metadata, stored in the storage unit of the video camera 302, is illustrated in FIG. 29.

FIG. 29 illustrates a set of the following image and metadata.

(1) Image and Metadata Corresponding to Jump Processing (2) Image and Metadata Corresponding to Turn Processing (1) The image data indicated by the image and the metadata corresponding to the jump processing, is an image frame in which jump processing of Shooting Time: 2015/12/12, 13:21:05 to 13:21:12 is executed.

The metadata is recorded corresponding to the jump image.

As illustrated, for example, the following data is included in the metadata (a) Action Type: jump
(b) Action Start Time: 2015/12/12, 13:21:05
(c) Action End Time: 2015/12/12, 13:21:12
(d) Action Score: 72

In addition, (2) the image data indicated by the image and the metadata corresponding to the turn processing, is an image frame in which turn processing of Shooting Time: 2015/12/12, 13:22:18 to 13:22:22 is executed.

The metadata is recorded corresponding to the turn image.

As illustrated, for example, the following data is included in the metadata (a) Action Type: turn
(b) Action Start Time: 2015/12/12, 13:22:18
(c) Action End Time: 2015/12/12, 13:22:22
(d) Action Score: 81

Such metadata is data similar to the metadata described above with reference to FIG. 3.

The sequence diagram described with reference to FIG. 28 is a sequence diagram in a case where the sensor mounting position determination processing or the like based on the sensor detection information is executed on the video camera side, and for example, the sensor mounting position determination processing or the like based on the sensor detection information may be executed on the sensor side.

That is, a processing configuration of the video camera described with reference to FIG. 11 is set to be on the sensor side, and the data processing according to the processing configuration illustrated in FIG. 11 is executed on the sensor side.

A processing sequence in such a configuration, will be described with reference to FIG. 30.

[7-(2) Example in which Sensor Device Executes Data Processing such as Sensor Mounting Position Determination Processing]

Next, a sequence in a case where the data processing such as the sensor mounting position determination processing sensor device is executed, will be described.

Figure 30:
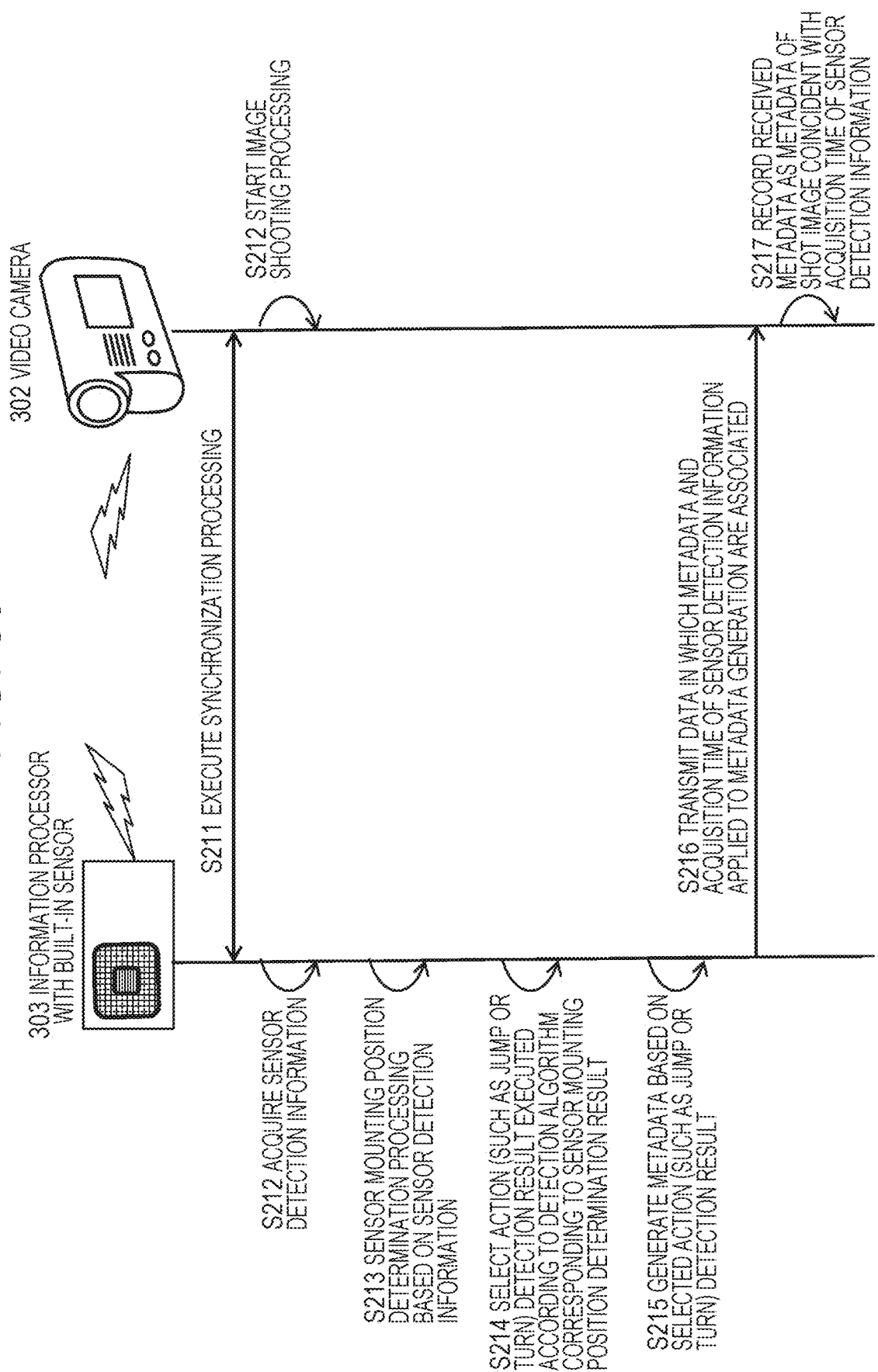
FIG. 30 is a sequence diagram illustrating an example of the sensor mounting position determination processing using the sensor detection result, and the generating and recording processing sequence of the metadata.

FIG. 30 is a sequence diagram illustrating a sequence of communication between an information processor 303 with a built-in sensor provided with the sensor which is mounted on the human body or is mounted on other than the human body, and detects the motion of the object, and the video camera 302 shooting the object of which the action is detected by the sensor in the information processor 303 with a built-in sensor, and the data processing executed in each of the devices.

Hereinafter, processing of each step illustrated in the sequence diagram will be sequentially described.

(Step S211)

First, the synchronization processing is executed between the information processor 303 with a built-in sensor and the video camera 302.

The processing is processing similar to the processing of step S201 described above with reference to FIG. 28.

That is, the synchronization processing is synchronization processing for establishing an accurate corresponding relationship between the detection time information of the sensor and the shooting timing of the shot image, and the synchronization processing is executed by controlling the clocking function of both of the devices.

(Step S212)

After the synchronization processing of step S211, the video camera 302 starts the image shooting processing.

In addition, the information processor 303 with a built-in sensor acquires the sensor detection information.

For example, the motion information of the sensor mounting body is acquired by applying a gyro sensor or an acceleration rate sensor.

Specifically, angular rate information around a three-axis of a gyro sensor, acceleration rate information in a three-axis direction of an acceleration rate sensor, or the like is acquired.

(Step S213)

Next, in step S213, the information processor 303 with a built-in sensor executes the sensor mounting position determination processing by applying the sensor detection information.

The information processor 303 with a built-in sensor has a configuration similar to that of the video camera described above with reference to FIG. 11.

The sensor mounting position detection unit 131 illustrated in FIG. 11 is configured in the information processor 303 with a built-in sensor, and in the sensor mounting position detection unit 131 in the in on processor 303 with a built-in sensor, the sensor mounting position determination processing of step 213 is executed.

Furthermore, the sensor mounting position detection unit 131 illustrated in FIG. 11, for example, has the configuration illustrated in FIG. 12.

(Step S214)

Next, in step S214, the information processor 303 with a built-in sensor selects the detection result of the action (the jump, the turn, or the like) executed according to the detection algorithm corresponding to the sensor mounting position determination result.

The processing is the processing executed by the sensor mounting position corresponding data selection unit 132 illustrated in FIG. 11.

In this example, the information processor 303 with a built-in sensor has a configuration similar to the configuration of video camera illustrated in FIG. 11.

As described above with reference to FIG. 11, the sensor mounting position corresponding data selection unit 132 selects any one of input from the human body mounting sensor corresponding processing unit 110 and the input from the non-human body mounting sensor corresponding processing unit 120, according to the sensor mounting position determination result in the sensor mounting position detection unit 131 (on the human body or on other than the human body), and outputs the selected data to the metadata generating unit 133.

(Step S215)

Next, in step S215, the information processor 303 with a built-in sensor generates the metadata by applying the detection result of the selected action (the lump, the turn, or the like).

The processing is the processing executed by the metadata generating unit 133 illustrated in FIG. 11.

As described above with reference to FIG. 11, the metadata generating unit 133 generates the metadata, according to the input from the sensor mounting position corresponding data selection unit 132, that is, the input of the following data.

(1) Jump Detection Result (Human Body Mounting Sensor Corresponding Jump Data) and Turn Detection Result (Human Body Mounting Sensor Corresponding Turn Data), Executed by Presuming that Sensor is Mounted on Human Body (2) Jump Detection Result (Non-Human Body Mounting Sensor Corresponding Jump Data) and Turn Detection Result (Non-Human Body Mounting Sensor Corresponding Turn Data), Executed by Presuming that Sensor is Mounted on Other than Human Body (Step S216)

Next, the information processor 303 with a built-in sensor generates data in which the generated metadata and the sensor detection timing information of the sensor detection information which is applied for generating the metadata, are associated with each other, and transmits the generated data to the video camera 302.

(Step S217)

Next, in step S217, the video camera 302 records the metadata received in the step S216, as the metadata of the shot image coincident with the acquisition time of the sensor detection information which is applied for generating the metadata.

As described above in the processing of step S211, the information processor 303 with a built-in sensor and the video camera are subjected to the synchronization processing, and the clocking times are adjusted to be coincident with each other.

The video camera records the metadata received from the information processor 303 with a built-in sensor in step S216, as the metadata with respect to the shot image including the time information coincident with the sensor detection time information, and stored in the storage unit.

[7-(3) Example in which Server Executes Data Processing Such as Sensor Mounting Position Determination Processing]

Next, a sequence in a case where the data processing such as the sensor mounting position determination processing is executed by the server, will be described with reference to FIG. 31 and FIG. 32.

Figure 31:
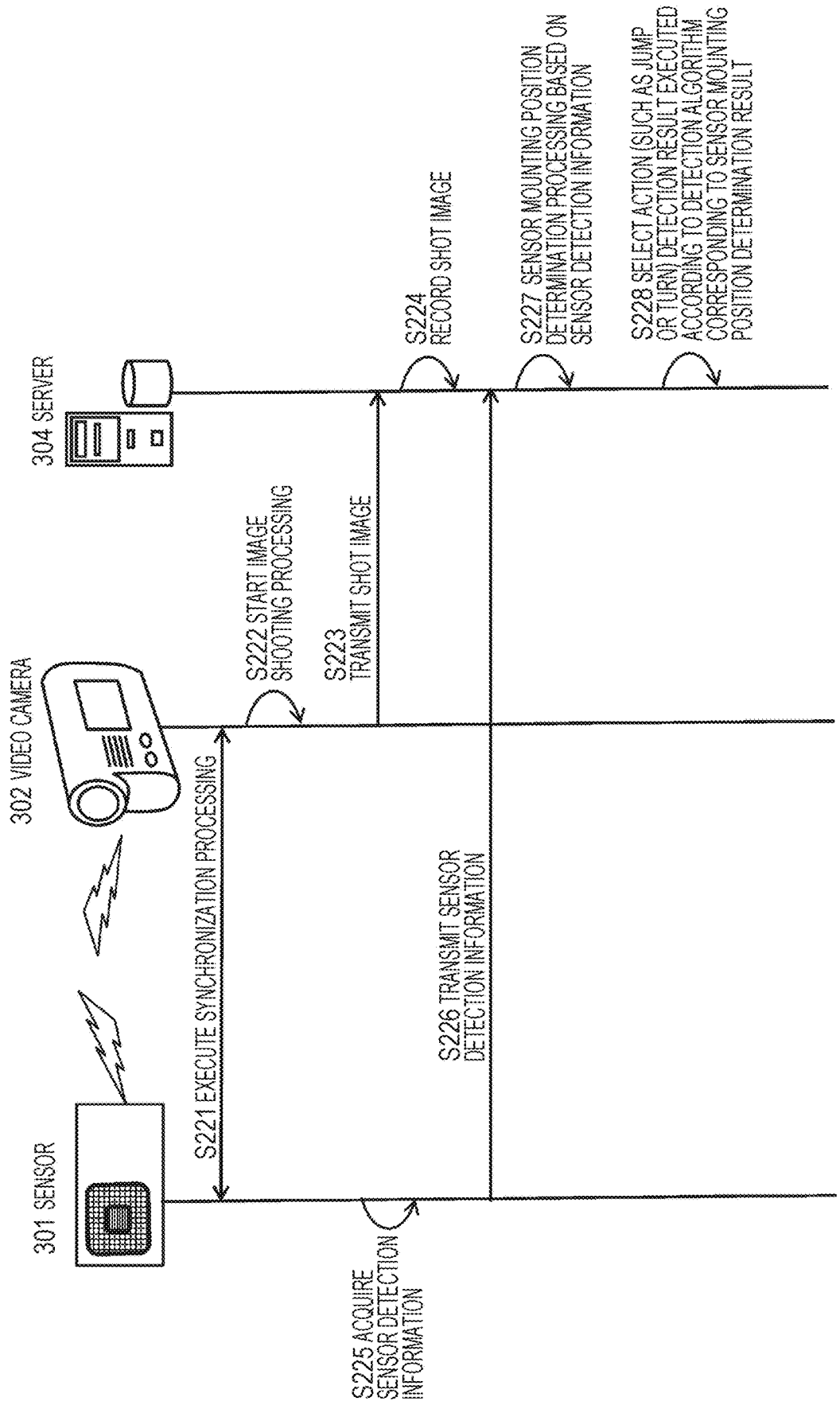
FIG. 31 is a sequence diagram illustrating an example of the sensor mounting position determination processing using the sensor detection result, and the generating and recording processing sequence of the metadata.

FIG. 31 is a sequence diagram illustrating a sequence of communication in the sensor 301, which is mounted on the human body or is on other than the human body, and detects the motion of the object, the video camera 302 shooting the object of which the motion is detected by the sensor 301, and a server 304 executing the data processing, and the data processing executed by in each of the devices.

For example, a server positioned in various locations, such as a server on the cloud and a home server, can be used as the server 304.

Hereinafter, processing of each step illustrated in the sequence diagram will be sequentially described.

(Step S221)

First, the synchronization processing is executed between the sensor 301 and the video camera 302.

The processing is processing similar to the processing of step S201 described above with reference to FIG. 28.

That is, the synchronization processing is synchronization processing for establishing an accurate corresponding relationship between the detection time information of the sensor and the shooting timing of the shot image, and the synchronization processing is executed by controlling the clocking function of both of the devices.

(Steps S222 to S223)

After the synchronization processing of step S211, the video camera 302 starts the image shooting processing in step S222, and transmits the shot image to the server 304 in step S223.

(Step S224)

The server 304 stores the image transmitted from the video camera 302, in the storage unit. Furthermore, basic metadata such as the shooting time information of the image is set in advance in each image frame of the image transmitted from the video camera 303, and such metadata is also stored in the storage unit in association with each of image frames.

(Step S225)

On the other hand, in step S225, the sensor 301 acquires the sensor detection information.

For example, the motion information of the sensor mounting body is acquired by applying a gyro sensor or an acceleration rate sensor.

Specifically, angular rate information around a three-axis of a gyro sensor, acceleration rate information in a three-axis direction of an acceleration rate sensor, or the like is acquired.

(Step S226)

Next, in step S226, the sensor 301 transmit the sensor detection information to the server 304.

Furthermore, when the transmission processing is performed, the sensor 301 generates data in which the sensor detection information and the sensor detection timing information are associated with each other, and transmits the generated data to the server 304.

(Step S227)

The server 304 executes the sensor mounting position determination processing by applying the sensor detection information received from the sensor 301.

The server 304 has a configuration similar to that of the video camera 10 described above with reference to FIG. 11.

In the sensor mounting position detection unit 131 illustrated in FIG. 11, which is configured in the server 304, the sensor mounting position determination processing of step S227 is executed.

Furthermore, the sensor mounting position detection unit 131 illustrated in FIG. 11, for example, has the configuration illustrated in FIG. 12.

(Step S228)

Next, in step S228, the server 304 selects the detection result of the action (the jump, the turn, or the like) executed according to the detection algorithm corresponding to the sensor mounting position determination result.

The processing is the processing executed by the sensor mounting position corresponding data selection unit 132 illustrated in FIG. 11.

As described above with reference to FIG. 11, the sensor mounting position corresponding data selection unit 132 selects any one of the input from the human body mounting sensor corresponding processing unit 110 and the input from the non-human body mounting sensor corresponding processing unit 120, according to the sensor mounting position determination result in the sensor mounting position detection unit 131 (on the human body or on other than the human body), and outputs the selected data to the metadata generating unit 133.

(Step S229)

Next, in step S228, the server 304 generates the metadata by applying the detection result of the selected action (the jump, the turn, or the like).

The processing is the processing executed by the metadata generating unit 133 illustrated in FIG. 11.

As described above with reference to FIG. 11, the metadata generating unit 133 generates the metadata according to the input from the sensor mounting position corresponding data selection unit 132, that is, the input of the following data.

(1) Jump Detection Result (Human Body Mounting Sensor Corresponding Jump Data) and Turn Detection Result (Human Body Mounting Sensor Corresponding Turn Data), Executed by Presuming that Sensor is Mounted on Human Body (2) Jump Detection Result (Non-Human Body Mounting Sensor Corresponding Jump Data) and Turn Detection Result (Non-Human Body Mounting Sensor Corresponding Turn Data), Executed by Presuming that Sensor is Mounted on Other than Human Body (Step S230)

Next, in step S230, the server 304 records the metadata generated in step S229, as the metadata of the shot image coincident with the acquisition time of the sensor detection information which is applied for generating the metadata.

The processing from step S231 are a sequence of reproducing or editing processing of the image to which the data stored in the server 304 is applied.

(Step S231)

The processing of step S231 is processing of acquiring the image and the metadata stored in the server, from the server 304 by the video camera 302.

(Step S232)

Next, in step S232, the video camera 302 executes reproducing, editing, or the like of the image, to which the metadata is applied. Specifically, the reproducing or editing processing is mainly executed with respect to the scene of the jump, the turn, or the like, which is a detection target action to which the sensor is applied.

The processing of steps S233 to S234 are a sequence describing processing of executing the reproducing or the editing of the image data stored in the server 304 by using a device other than the video camera, for example, an image reproducing editing device 305 such as a PC.

(Step S233)

The processing of step S233 is processing of acquiring the image and the metadata stored in the server, from the server 304 by the image reproducing editing device 305.

(Step S234)

Next, in step S234, the image reproducing editing device 305 executes the reproducing, the editing, or the like of the image to which the metadata is applied. Specifically, the reproducing or editing processing is mainly executed with respect to the scene of the jump, the turn, or the like, which is the detection target action to which the sensor is applied.

Furthermore, the reproducing or editing processing of the image described in steps S231 to 232 or steps S233 to S234, can be executed in the processing sequence in FIG. 28 or FIG. 29 described above.

That is, the reproducing or editing processing can be mainly executed with respect to the scene of the jump, the turn, or the like by using the set image of the metadata, even in the following processing example.

(1) Example in which Video Camera Executes Data.

Processing such as Sensor Mounting Position Determination Processing (FIG. 28)

(2) Example in which Sensor Device Executes Data Processing such as Sensor Mounting Position Determination Processing (FIG. 30)

Figure 32:
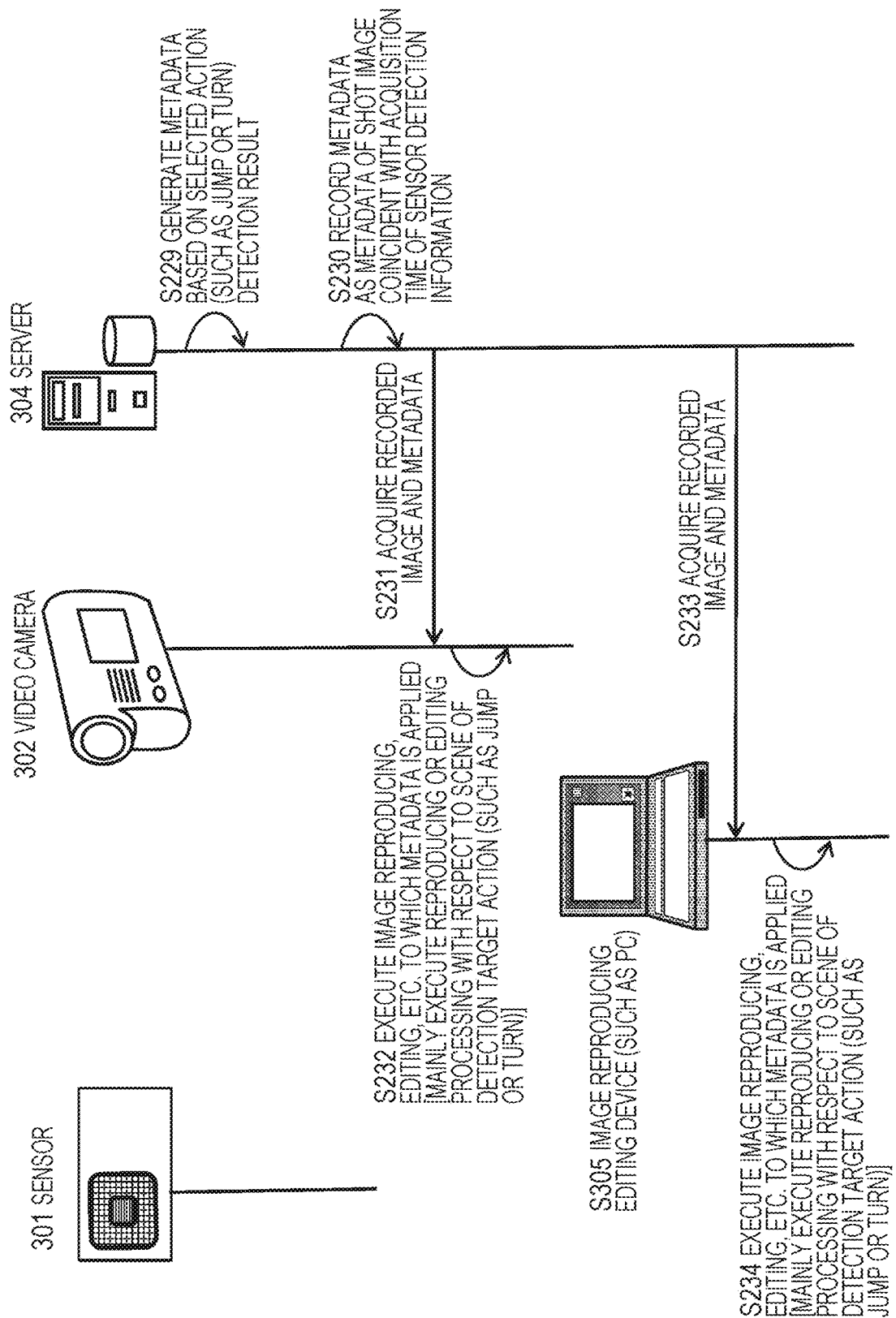
FIG. 32 is a sequence diagram illustrating an example of the sensor mounting position determination processing using the sensor detection result, and the generating and recording processing sequence of the metadata.

(3) Example in which Server Executes Data Processing such as Sensor Mounting Position Determination Processing (FIG. 31 to FIG. 32)

[8. Example in which Sensor is Mounted on Video Camera]

In the examples described above, the sensor has been described as an example in which the sensor is mounted on the human body as the object shot by the video camera or is mounted on a physical body such as a board other than the human body, having a motion approximately similar to that of the human body which is the object.

A mounting configuration of the sensor is not limited to such examples. For example, as illustrated in FIG. 33, the sensor may be mounted on the video camera.

Figure 33:
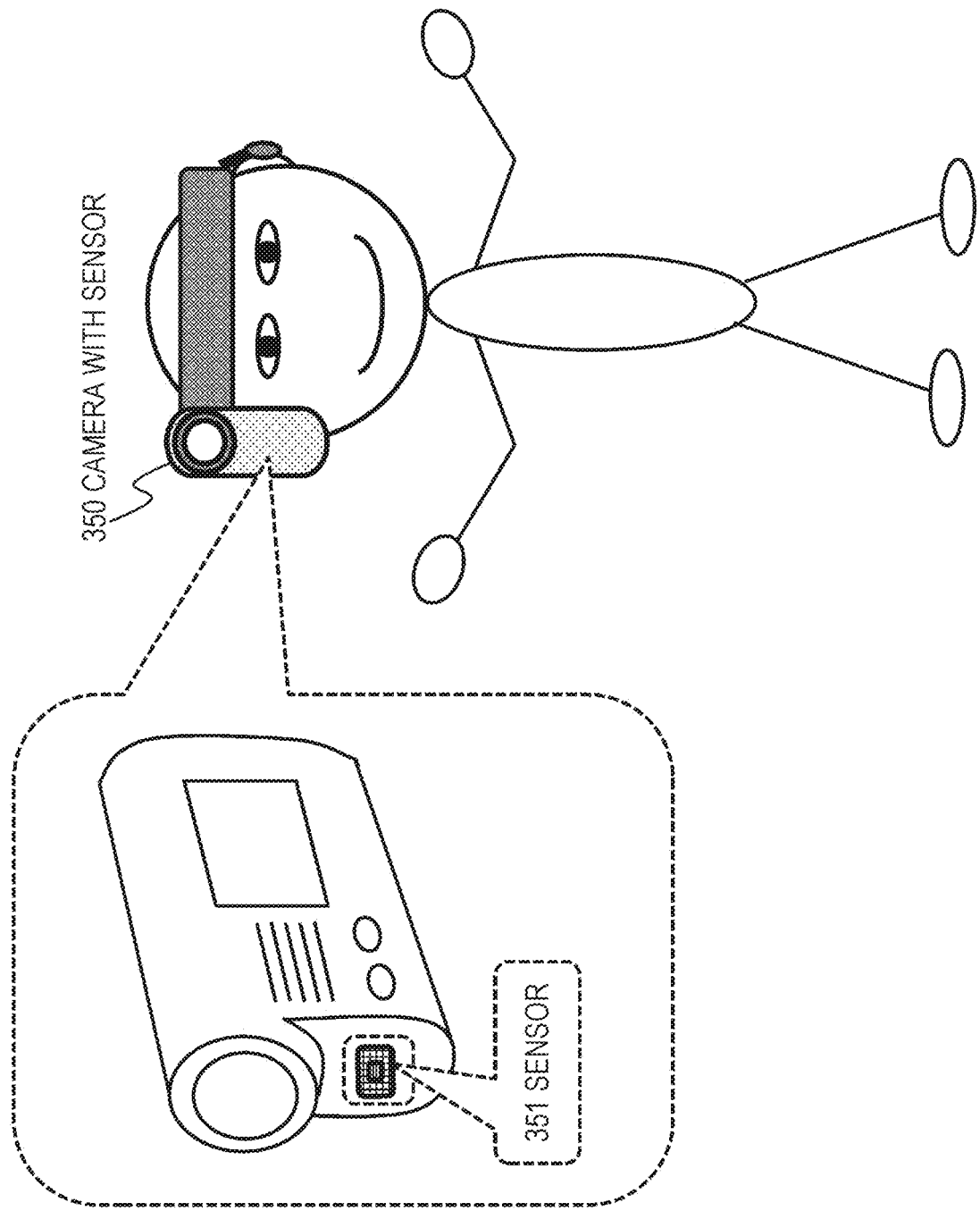
FIG. 33 is a diagram illustrating an example in which a sensor is mounted in a video camera.

A camera 350 with a sensor illustrated in FIG. 33, has a configuration in which the sensor 351 is mounted on the video camera.

The sensor, for example, includes a gyro sensor which is capable of measuring an angular rate in a rotation direction around three axes of X, Y, and Z, an acceleration rate sensor which is capable of measuring an acceleration rate in a three-axis direction, and the like.

In such a configuration, as illustrated in FIG. 33, the camera 350 with a sensor, for example, is mounted on the head or the like of the user, and is capable of shooting a landscape according to the motion of the user.

FIG. 34 illustrates the following mounting example of a camera with two sensors example.

(1) Mounting Example of Camera with Sensor with respect to Human Body (2) Mounting Example of Camera with Sensor with respect to Other than Human Body (1) The mounting example of the camera with a sensor with respect to the human body illustrated in FIG. 34 is an example in which the camera 350 with a sensor is directly mounted on the human body.

On the other hand, (2) the mounting example of the camera with a sensor with respect to the human body is an example in which the camera 350 with a sensor is mounted on a snowboard.

In such setting, the shot image of the camera 350 with a sensor, is a landscape according to the motion of the user or the board.

In a case where the user lumps or turns, a powerful landscape of a more furious motion is shot.

Thus, in a configuration where the sensor is integrated with the camera, the jump detection or the turn detection, which is similar to that of the examples described above, is executed by using the sensor detection information, and thus, an image frame of the powerful motion, which is a furious motion, can be detected.

When the detection processing is performed, the mounting position discrimination processing of the sensor mounting position, that is, whether the camera with a sensor is directly mounted on the human body or is mounted on the board or the like other than the human body, can be executed according to the examples described above.

The motion detection according to the mounting position determination processing, that is, jump detection processing or the turn detection processing is executed, and thus, accurate motion detection processing according to the mounting position of the camera with a sensor (on the human body or on other than the human body) can be performed.

That is, it is possible to analyze the specific motion of the camera 350 with a sensor, similar to the jump detection or the turn detection described above. It is possible to accurately grasp a shooting direction of the video camera, or the motion of the video camera, on the basis of the motion analysis, and to correctly perform analysis processing of an image shooting position or an image shooting direction, blur correction of the shot image, and the like.

For example, it is possible to acquire a movement direction or a movement rate of the video camera, and a rotation direction or a rotation rate, on the basis of the sensor detection information, and to efficiently and correctly perform the image editing, the blur correction of the shot image, or the like, based on the analysis result.

[9. Other Examples]

Next, an example in which the processing using the video camera and the sensor described above is applied to a medical-related camera, will be described with reference to FIG. 35.

Figure 35:
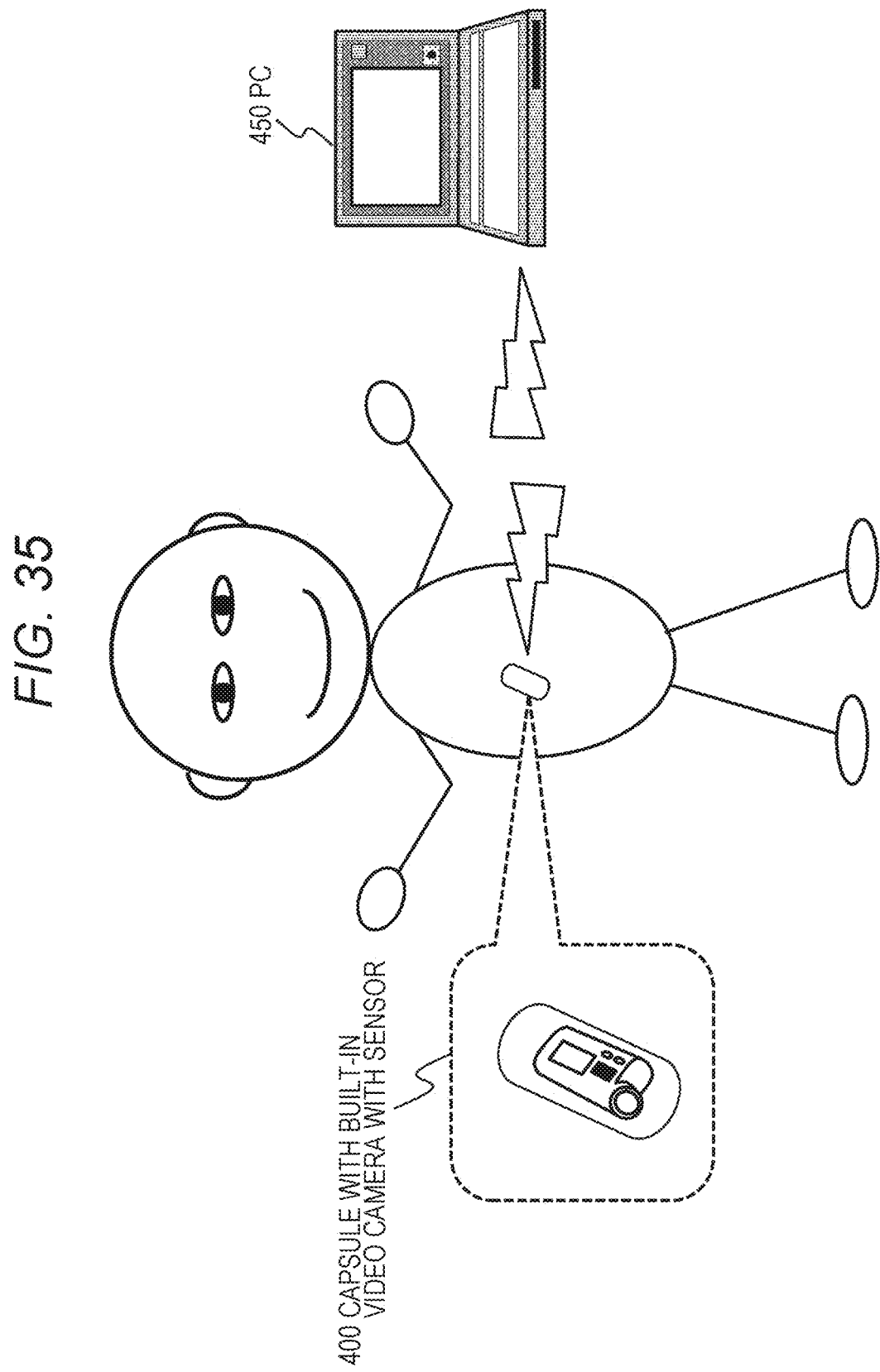
FIG. 35 is a diagram illustrating a usage example of the video camera with a built-in sensor.

FIG. 35 illustrates a capsule 400 with a built-in video camera with a sensor in which a sensor is mounted on a camera capable of shooting an image in a capsule capable of being swallowed by a person, a PC 450 executing communication with respect to the capsule 400 with a built-in video camera with a sensor.

The sensor, for example, includes a gyro sensor which is capable of measuring an angular rate in a rotation direction around three axes of X, Y, and Z, an acceleration rate sensor which is capable of measuring an acceleration rate in a three-axis direction, and the like.

The PC 450 and the capsule 400 with a built-in video camera with a sensor execute various communication processing by using Wi-Fi communication or Bluetooth (BT (registered trademark) communication.

Specifically, the following communication processing is executed.

(a) The image shot by the video camera of the capsule 400 with a built-in video camera with a sensor is transmitted to the PC 450.

(b) The sensor detection information of the capsule 400 with a built-in video camera with a sensor is transmitted to the PC 450.

(c) A command from the PC 450 (a command such as image shooting start, stop, zoom, and flash shooting) is transmitted to the video camera in the capsule 450 with a built-in video camera with a sensor.

Such various data communications are executed between the capsule 400 with a built-in video camera with a sensor and the PC 450.

In such data communication, the PC 450 is capable of analyzing a specific motion of the capsule 400 with a built-in video camera with a sensor, similar to the jump detection or the turn detection described above, on the basis of the sensor detection information of the capsule 400 with a built-in video camera with a sensor.

It is possible to analyze the shooting direction of the video camera or the motion of the video camera on the basis of the motion analysis, and to correctly perform specific processing of the image shooting position, the blur correction of the shot image, or the like.

For example, it is possible to analyze the movement direction or the movement rate of the video camera, and the rotation direction or the rotation rate, on the basis of the sensor detection information, and to efficiently and correctly perform the image processing such as the image editing or the blur correction of the shot image, based on the analysis result.

[10. Configuration of Information Processor Other than Video Camera and Sensor]

Next, a hardware configuration example of each information processor configuring the information processing system of the present disclosure other than the video camera and the sensor, will be described with reference to FIG. 36 and the like.

Figure 36:
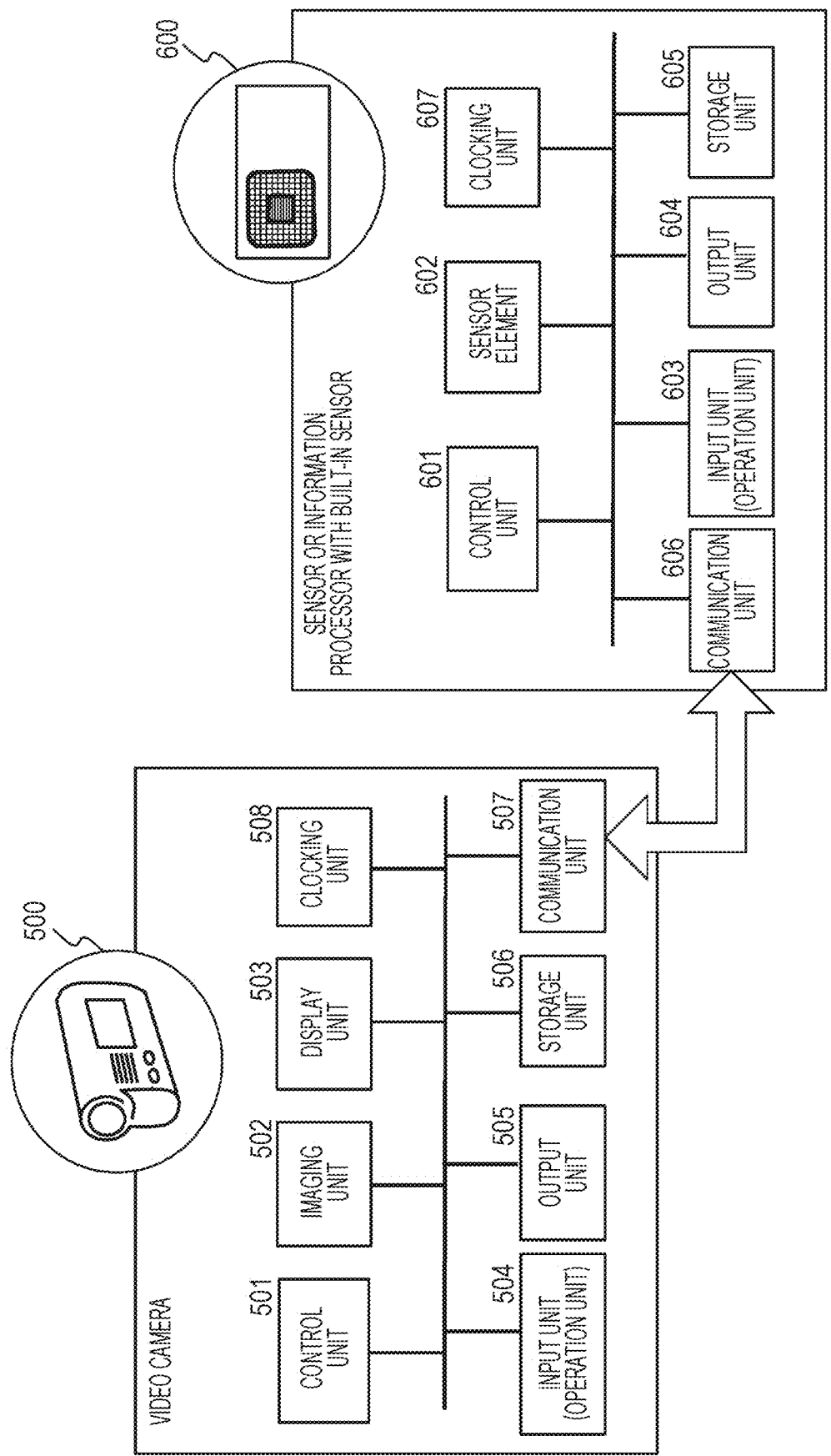
FIG. 36 is a diagram illustrating a configuration example of a video camera and a sensor

FIG. 36 is a block diagram illustrating a specific configuration example of a video camera 500 described with reference to FIG. 1 or the like, and a specific configuration example of an information processor (a sensor or an information processor with a built-in sensor) 600 corresponding to the sensor described with reference to FIG. 1 or like or the information processor with a built-in sensor described in the sequence diagram of FIG. 30.

The video camera 500 illustrated in FIG. 36 includes a control unit 501, an imaging unit 502, a display unit 503, an input unit (an operation unit) 504, an output unit 505, a storage unit 506, a communication unit 507, and a clocking unit 508.

The control unit 501 executes control of the data processing executed in the video camera 10, such as image shooting control, display control, or data transmission and reception control. The control unit 501 includes a CPU having a program execution function, and executes processing or the like according to an application (a program) stored in the storage unit 506.

Specifically, for example, processing or the like according to the sequence described above is performed.

The imaging unit 502 is an imaging unit for shooting an image, and shoots a moving image or a still image. When the shooting processing is performed, a shooting start timing or an end timing is controlled under the control of the control unit 501.

The display unit 503, for example, is used for displaying a shot image, and for displaying information of a communication circumstance with respect to the sensor, battery residual amount information, or the like. Further, the display unit 503 is also used in processing of, for example, reading out the shot image from the storage unit 506, and of displaying the read image.

The input unit 504 is an input unit which can be operated by the user, and is an input unit for performing various operation instructions or the like. A touch panel type display unit is also a part of the input units.

The output unit 505 includes image output, audio output, a data output unit with respect to the external device, and the like. The display unit 503 is also one of constituents of the output unit 505.

The storage unit 506 includes a RAM, a ROM, a recording medium, and the like. The storage unit 506 is used as a storage region of the shot image, and is also used as a storage region of an application program which is executed by the control unit 501. Further, the storage unit 506 is also used as a storage region of a parameter or the like to be applied to the data processing which is executed by the control unit 501, and as a work region.

The communication unit 507, for example, is a communication unit which is used for communication processing with respect to the external device such as a sensor, and is used in data communication through various communication paths, such as wireless communication using a communication cable or the like, in addition to wireless communication such as Wi-Fi and Bluetooth (BT (registered trademark)).

In the example illustrated in FIG. 36, a communication path with respect to a communication unit 606 of the information processor (the sensor or the information processor with a built-in sensor) 600 is illustrated.

As with the examples described above, various communications are executed through the communication unit of two devices.

For example, the sensor detection information or the like of the sensor is transmitted to the video camera, and in the video camera, various data processing such as the sensor mounting position determination processing based on the sensor detection information, the object action (the jump, the turn, or the like) detection processing, and the metadata generating and recording processing are executed. The clocking unit 508, for example, is used for obtaining image shooting time information.

The information processor (the sensor or the information processor with a built-in sensor) 600 includes a control unit 601, a sensor element 602, an input unit (an operation unit) 603, an output unit 604, a storage unit 605, the communication unit 606, and a clocking unit 607.

The control unit 601 executes control of the data processing which is executed in the information processor (the sensor or information processor with a built-in sensor) 600, such as sensing processing to be executed in the sensor element 602 or transmission processing of the sensor detection information. The control unit 601 includes a CPU having a program execution function, and executes processing or the like according to an application (a program) stored in the storage unit 605.

Specifically, for example, processing or the like according to the sequence described above is performed.

The sensor element 602, for example, includes a gyro sensor which is capable of measuring an angular rate in a rotation direction around three axes of X, Y, and Z, an acceleration rate sensor which is capable of measuring an acceleration rate in a three-axis direction, and the like.

The input unit 603 is an input unit which can be operated by the user, and is an input unit for performing various operation instructions or the like. A touch panel type display unit is also a part of the input unit.

The output unit 604 includes image output, audio output, a data output unit with respect to the external device, and the like.

The storage unit 605 includes a RAM, a ROM, a recording medium, and the like. The storage unit 605 is used as a storage region of the shot image, and is also used as a storage region of an application program which is executed by the control unit 601. Further, the storage unit 605 is also used as a storage region of a parameter or the like to be applied to the data processing which is executed by the control unit 601, and as a work region.

The communication unit 606, for example, is a communication unit which is used for communication processing with respect to the external device such as the video camera 10, and is used in data communication through various communication paths, such as wireless communication using a communication cable or the like, in addition to wireless communication such as Wi-Fi and Bluetooth (BT (registered trademark)).

In the example illustrated in FIG. 36, a communication path with respect to the communication unit 507 of the video camera 500 is illustrated.

The clocking unit 607, for example, is used for obtaining the sensor detection time information.

Figure 37:
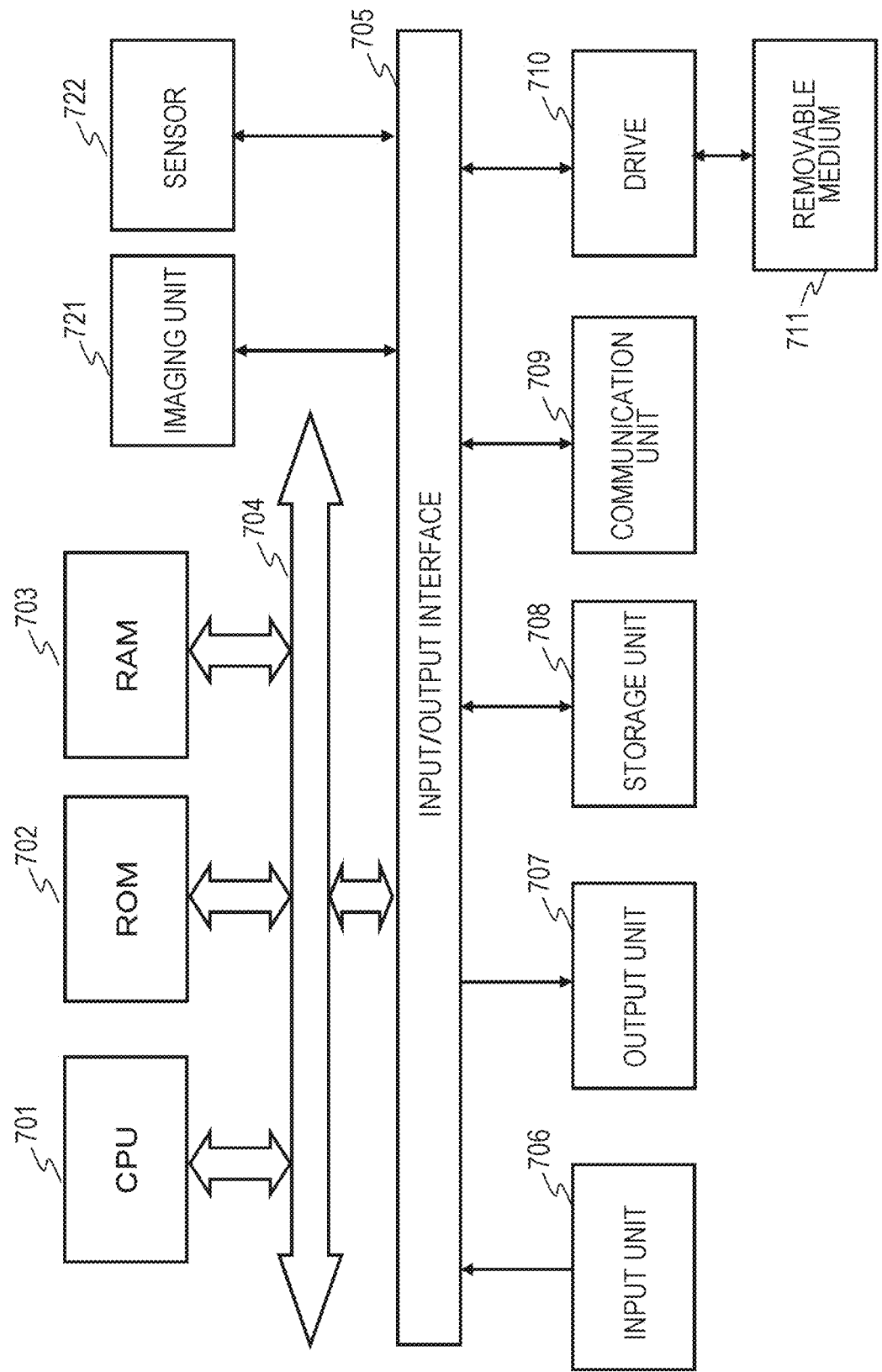

FIG. 37 is a diagram illustrating a hardware configuration example of an information processor which can be applied as the video camera or the sensor illustrated in FIG. 1, and as the information processor with a built-in sensor, the server, and the PC, described with reference to FIG. 30 to FIG. 32.

The central processing unit (CPU) 701 functions as a control unit or a data processing unit, which executes various processing according to a program stored in a read only memory (ROM) 702 or a storage unit 708. For example, in the examples described above, the processing according to the described sequence is executed. A program, data, or the like, executed by the CPU 701, is stored in a random access memory (RAM) 703. The CPU 701, the ROM 702, and the RAM 703 are connected to each other through a bus 704.

The CPU 701 is connected to an input/output interface 705 through the bus 704, and an input unit 706 including various switches, keyboards, mouses, microphones, or the like, and an output unit 707 including a display, a speaker, or the like, are connected to the input/output interface 705. The CPU 701 executes various processing corresponding to a command input from the input unit 706, and outputs a processing result, for example, to the output unit 707.

The storage unit 708 connected to the input/output interface 705, for example, includes a hard disk or the like, and stores a program executed by the CPU 701, or various data items. A communication unit 709 functions as a transmitting and receiving unit of data communication through Wi-Fi communication, Bluetooth (BT (registered trademark)) communication, or a network such as the Internet or a local area network, and communicates with the external device.

A drive 7110 connected to the input/output interface 705 drives a removable medium 711 such as a magnetic disk, an optical disk, a magnetooptical disk, or a semiconductor memory such as a memory card, and executes data recording or data reading.

An imaging unit 721 is configured in a case where the device, for example, is a video camera.

The imaging unit 721 is an imaging unit which is capable of shooting a still image or a moving image.

In addition, a sensor 722 is configured in a case where the device is a sensor device. The sensor 722, for example, includes a gyro sensor which is capable of measuring an angular rate in a rotation direction around three axes of X, Y, and Z, an acceleration rate sensor which is capable of measuring an acceleration rate in an three-axis direction, and the like.

[11. Conclusion of Configuration of Present Disclosure]

As described above, the examples of the present disclosure have been described in detail with reference to specific examples. However, it is obvious that a person skilled in the art is capable of perform amendment or substitution with respect to the examples, within a range not departing from the gist of the present disclosure. That is, the present disclosure has been disclosed in the exemplified aspect, but is not restrictively interpreted. In order to determine the gist of the present disclosure, the claim will be considered.

Furthermore, the technology disclosed herein can be configured as follows.

(1) An information processor, including:

a mounting position detection unit configured to detect a mounting position of a device on the basis of sensor data of a sensor provided in the device.

(2) The information processor according to (1), further including:

an action detection unit configured to detect an action of the sensor mounting body, on the basis of output of the mounting position detection unit.

(3) The information processor according to (2), in which the action detection unit detects the action of the sensor mounting body, on the basis of the sensor data.

(4) The information processor according to (3), further including:

a metadata generating unit configured to input detection information of the action detection unit, and to generate shot image corresponding metadata, in which the mounting position detection unit inputs sensor detection information according to a motion of the sensor mounting body from the sensor mounted on a human body of a user or mounted on other than the human body, the human body being an object becoming an image shooting target, and executes sensor mounting position determination processing, the action detection unit is configured to input the sensor detection information from the sensor, and to analyze a motion of the user, the mounting position detection unit calculates a ratio between a high-frequency component and a low-frequency component included in the sensor detection information, and executes discrimination processing of whether the sensor is mounted on the human body or is mounted on other than the human body, on the basis of the calculated ratio, and the metadata generating unit inputs user motion detection information obtained by executing a motion detection algorithm assuming a sensor mounting position coincident with a detection result of the mounting position detection unit, and generates the shot image corresponding metadata.

(5) The information processor according to (4), in which the mounting position detection unit, calculates the ratio between the high-frequency component and the low-frequency component included in the sensor detection information, determines that the sensor is mounted on other than the human body in a case where the calculated ratio is greater than a threshold value set in advance, and determines that the sensor is mounted on the human body in a case where the calculated ratio is less than or equal to the threshold value set in advance.

(6) The information processor according to (4) or (5), further including:

an editing unit configured to read out a shot image and shot image corresponding metadata from a storage unit, and to execute image reproducing or editing processing, in which the editing unit executes processing of extracting an image frame in which the user performs a specific motion, with reference to metadata.

(7) The information processor according to any of (4) to (6), in which the action detection unit detects at least any one of jump processing and turn processing of the user.

(8) The information processor according to any of (4) to (7), in which the action detection unit includes:

a human body mounting sensor corresponding processing unit configured to execute a detection algorithm assuming that the sensor is mounted on the human body, and to detect at least any one of jump processing and turn processing of the user; and a non-human body mounting sensor corresponding processing unit configured to execute a detection algorithm assuming that the sensor is mounted on other than the human body, and to detect at least any one of the jump processing and the turn processing of the user, and the metadata generating unit, inputs a motion detection result of the human body mounting sensor corresponding processing unit, and executes metadata generating processing in a case where the mounting position detection unit outputs a detection result that the sensor mounting position is on the human body, and inputs a motion detection result of the non-human body mounting sensor corresponding processing unit, and executes the metadata generating processing in a case where the mounting position detection unit outputs a detection result that the sensor mounting position is on other than the human body.

(9) The information processor according to any of (1) to (8), in which the mounting position detection unit inputs rotation rate information around three axes of X, Y, and Z, the rotation rate information being gyro sensor output, as sensor detection information, and executes sensor mounting position discrimination processing by using the rotation rate information.

(10) The information processor according to any of (1) to (9), in which the mounting position detection unit includes:

a feature amount extraction unit configured to calculate a norm of rotation rate information (u, v, and w) around three axes of X, Y, and Z, the rotation rate information being gyro sensor output;

a frequency component ratio calculation unit configured to calculate a ratio between a high-frequency component signal and a low-frequency component signal included in a temporal transition signal of the norm; and a sensor mounting position determination unit configured to execute discrimination processing of whether the sensor is mounted on the human body or is mounted on other than the human body, on the basis of a frequency component ratio calculated by the frequency component ratio calculation unit.

(11) The information processor according to (10),
in which the sensor mounting position determination unit includes:
a static/dynamic determination unit configured to determine whether or not there is a motion in the sensor mounting body, on the basis of the extracted norm of the feature amount extraction unit; and
a mounting position determination processing unit configured to execute comparison processing between a frequency component ratio in a case where the static/dynamic determination unit determines that there is a motion, and a threshold value set in advance, and to execute the discrimination processing of whether the sensor is mounted on the human body or is mounted on other than the human body, on the basis of a comparison result.

(12) The information processor according to (11),
in which the mounting position detection unit includes:
a count data accumulation unit configured to accumulate a determination result to be sequentially output by the mounting position determination processing unit, as count data; and
a statistical processing unit configured to compare (1) human body mounting determination count data determining that the sensor is mounted on the human body, with (2) non-human body mounting count data determining that the sensor is mounted on other than the human body, the count data items being accumulation data within a predetermined period of the count data accumulation unit, and to output a determination result of whether the sensor is mounted on the human body or is mounted on other than the human body by selecting count data having a larger count value.

(13) The information processor according to any of (4) to (12),
in which the information processor is a video camera,
the information processor further includes an imaging unit configured to shoot an image, and
the metadata generating unit generates shot image corresponding metadata of the imaging unit.

(14) The information processor according to any of (4) to (13),
in which the information processor is an information processor with a built-in sensor, and
the information processor with a built-in sensor includes a communication unit configured to transmit metadata generated by the metadata generating unit to a video camera configured to execute image shooting.

(15) The information processor according to any of (4) to (14),
in which the information processor is a server configured to execute communication processing between an information processor with a built-in sensor including a sensor element and a video camera configured to execute image shooting, and
the server,
calculates a ratio between a high-frequency component and a low-frequency component included in sensor detection information received from the information processor with a built-in sensor, and executes the discrimination processing of whether the sensor is mounted on the human body or is mounted on other than the human body, on the basis of the calculated ratio, and
generates shot image corresponding metadata received from the video camera on the basis of the user motion detection information obtained by executing a motion detection algorithm assuming a sensor mounting position coincident with a sensor mounting position detection result.

(16) An information processing system, including:
a sensor configured to output sensor detection information according to a motion of a mounting body, the sensor being mounted on a human body of a user or mounted on other than the human body, the human body being an object becoming an image shooting target; and
a video camera configured to execute image shooting,
in which the video camera includes:
a mounting position detection unit configured to input the sensor detection information from the sensor, and to execute sensor mounting position determination processing;
an action detection unit configured to input the sensor detection information, and to analyze a motion of the user; and
a metadata generating unit configured to input detection information of the action detection unit, and to generate shot image corresponding metadata,
the mounting position detection unit calculates a ratio between a high-frequency component and a low-frequency component included in the sensor detection information, and executes discrimination processing of whether the sensor is mounted on the human body or is mounted on other than the human body, on the basis of the calculated ratio, and
the metadata generating unit inputs user motion detection information obtained by executing a motion detection algorithm assuming a sensor mounting position coincident with a detection result of the mounting position detection unit, and generates the shot image corresponding metadata.

(17) An information processing system, including:
a sensor configured to output sensor detection information according to a motion of a mounting body, the sensor being mounted on a human body of a user or mounted on other than the human body, the human body being an object becoming an image shooting target;
a video camera configured to execute image shooting; and
a server configured to receive the sensor detection information from the sensor, and to receive a shot image from the video camera,
in which the server includes:
a mounting position detection unit configured to input the sensor detection information from the sensor, and to execute sensor mounting position determination processing;
an action detection unit configured to input the sensor detection information, and to analyze a motion of the user; and
a metadata generating unit configured to input detection information of the action detection unit, and to generate shot image corresponding metadata,
the mounting position detection unit calculates a ratio between a high-frequency component and a low-frequency component included in the sensor detection information, and executes discrimination processing of whether the sensor is mounted on the human body or is mounted on other than the human body, on the basis of the calculated ratio, and
the metadata generating unit inputs user motion detection information obtained by executing a motion detection algorithm assuming a sensor mounting position coincident with a detection result of the mounting position detection unit, and generates the shot image corresponding metadata received from the video camera.

(18) An information processing method executed in an information processor, in which the information processor detects a mounting position of a device, on the basis of sensor data of a sensor provided in the device.

(19) The information processing method according to (18), in which the information processor includes:

a mounting position detection unit configured to input sensor detection information according to a motion of a sensor mounting body from the sensor mounted on a human body of a user or mounted on other than the human body, the human body being an object becoming an image shooting target, and to execute sensor mounting position determination processing;

an action detection unit configured to input the sensor detection information from the sensor, and to analyze a motion of the user; and a metadata generating unit configured to input detection information of the action detection unit, and to generate shot image corresponding metadata, the mounting position detection unit calculates a ratio between a high-frequency component and a low-frequency component included in the sensor detection information, and executes discrimination processing of whether the sensor is mounted on the human body or is mounted on other than the human body, on the basis of the calculated ratio, and the metadata generating unit inputs user motion detection information obtained by executing a motion detection algorithm assuming a sensor mounting position coincident with a detection result of the mounting position detection unit, and generates the shot image corresponding metadata.

(20) A program allowing an information processor to execute information processing, in which the information processor includes:

a mounting position detection unit configured to input sensor detection information according to a motion of a sensor mounting body from a sensor mounted on a human body of a user or mounted on other than the human body, the human body being an object becoming an image shooting target, and to execute sensor mounting position determination processing;

an action detection unit configured to input the sensor detection information from the sensor, and to analyze a motion of the user; and a metadata generating unit configured to input detection information of the action detection unit, and to generate shot image corresponding metadata, the program allows, the mounting position detection unit to calculate a ratio between a high-frequency component and a low-frequency component included in the sensor detection information, and to execute discrimination processing of whether the sensor is mounted on the human body or is mounted on other than the human body, on the basis of the calculated ratio, and the metadata generating unit to input user motion detection information obtained by executing a motion detection algorithm assuming a sensor mounting position coincident with a detection result of the mounting position detection unit, and to generate the shot image corresponding metadata.

In addition, a set of processing described herein can be executed by hardware, software, or a composite configuration thereof. In a case where processing of software is executed, a program recording a processing sequence can be installed in a memory in a computer incorporated in dedicated hardware to be executed, or a program can be installed in a general-purpose computer, which can be executed by various processing, to be executed. For example, the program can be recorded in advance in a recording medium.

The program can be received through a network such as a local area network (LAN) or the Internet, and can be installed in the recording medium such as a built-in hard disk, in addition to the installation in the computer from the recording medium.

Furthermore, various processing described herein may be executed not only chronologically as described above, but also in parallel or individually according to processing capacity of a device executing processing, or necessity. In addition, herein, the system has a logical set configuration of a plurality of devices, but the present disclosure is not limited to a system in which the devices of each of the configurations are in the same housing.

INDUSTRIAL APPLICABILITY

As described above, according to the configuration of one example of the present disclosure, accurate motion detection is performed by discriminating whether the sensor detecting the object motion is mounted on the human body or is mounted on other than the human body, the generating and recording processing of the metadata based on the detection result is realized.

Specifically, the sensor information according to the motion is input from the sensor which is mounted on the human body of the shooting target user, or on other than the human body, and the sensor mounting position is determined. Further, the sensor information is input, and the user motion is analyzed, and thus, the shot image corresponding metadata is generated. The sensor mounting position detection unit calculates a ratio between the high-frequency component and the low-frequency component, included in the sensor information, and discriminates whether the sensor is mounted on the human body or is mounted on other than the human body on the basis of the calculated ratio. The metadata generating unit inputs the user motion detection information obtained by executing the motion detection algorithm assuming the sensor mounting position coincident with the sensor mounting position detection result, and generates the shot image corresponding metadata.

According to this configuration, accurate motion detection is performed by discriminating whether the sensor detecting the object motion is mounted on the human body or is mounted on other than the human body, and the generating and recording processing of the metadata based on the detection result is realized.

REFERENCE SIGNS LIST

10 Video camera
20 Sensor
101 Feature amount extraction unit
102 Jump detection unit
103 Turn detection unit
104 Metadata generating unit
105 Storage unit
106 Editing unit
107 Output unit
110 Human body mounting sensor corresponding processing unit
111 Feature amount extraction unit
112 Jump detection unit
113 Turn detection unit
120 Non-Human body mounting sensor corresponding processing unit
121 Feature amount extraction unit
122 Jump detection unit 123 Turn detection unit
131 Sensor mounting position detection unit
132 Sensor mounting position corresponding data selection unit
133 Metadata generating unit
134 Storage unit
135 Editing unit
136 Output unit
151 Feature amount extraction unit
152 LPF
153 Amplitude detection unit
154 HPF
155 Amplitude detection unit
156 Frequency component ratio calculation unit
157 Sensor mounting position determination unit
201 Static/dynamic determination unit
202 Frequency component ratio signal storage unit
203 Mounting position determination processing unit
204 Count data storage unit
205 Statistical processing unit
211 Signal adjustment unit (LPF)
212 Signal adjustment unit (movement average calculation unit)
213 Signal adjustment unit (BPF)
214 Signal adjustment unit (singularity elimination processing unit)
301 Sensor
302 Video camera
303 Information processing unit with built-in sensor
304 Server
305 Image reproducing editing device (PC or the like)
500 Video camera
501 Control unit
502 Imaging unit
503 Display unit
504 Input unit (operation unit)
505 Output unit
506 Storage unit
507 Communication unit
508 Clocking unit
600 Sensor or information processor with built-in sensor
601 Control unit
602 Sensor element
603 Input unit (operation unit)
604 Output unit
605 Storage unit
606 Communication unit
607 Clocking unit
701 CPU
702 ROM
703 RAM
704 Bus
705 Input/output interface
706 Input unit
707 Output unit
708 Storage unit
709 Communication unit
710 Drive
711 Removable medium
721 Imaging unit
722 Sensor

The invention claimed is:
1. An information processing apparatus comprising:
a memory storing program code, and
a processor configured to execute the program code to perform operations comprising:
detecting a mounting position of a device on the basis of sensor data of a sensor provided in the device to produce a detected mounting position;
detecting an action of a sensor mounting body on the basis of the detected mounting position and the sensor data;
inputting sensor detection information according to a motion of the sensor mounting body from the sensor mounted on a human body of a user or mounted on other than the human body, and executing sensor mounting position determination processing;
inputting the sensor detection information from the sensor, and analyzing a motion of the user;
calculating a ratio between a high-frequency component and a low-frequency component included in the sensor detection information, and executing discrimination processing of whether the sensor is mounted on the human body or is mounted on other than the human body, on the basis of the calculated ratio; and
inputting the sensor detection information and user motion detection information obtained by executing a motion detection algorithm assuming a sensor mounting position coincident with the detected mounting position to generate shot image corresponding metadata.

2. The information processing apparatus according to claim 1,
wherein detecting the mounting position includes:
determining that the sensor is mounted on other than the human body in a case where the calculated ratio is greater than a threshold value set in advance, and
determining that the sensor is mounted on the human body in a case where the calculated ratio is less than or equal to the threshold value set in advance.

3. The information processing apparatus according to claim 1,
wherein the operations further comprise:
reading a shot image and shot image corresponding metadata and executing image reproducing or editing processing; and
executing processing of extracting an image frame in which the user performs a specific motion, with reference to metadata.

4. The information processing apparatus according to claim 1, wherein the operations further comprise:
detecting at least any one of jump processing and turn processing of the user.

5. The information processing apparatus according to claim 1, wherein the operations further comprise:
executing a human body mounting sensor processing to execute a detection algorithm assuming that the sensor is mounted on the human body, and to detect at least any one of jump processing and turn processing of the user;
executing a non-human body mounting processing to execute a detection algorithm assuming that the sensor is mounted on other than the human body, and to detect at least any one of the jump processing and the turn processing of the user;
inputting a result of the human body mounting processing and executing metadata generating processing in a case where the detected mounting position is on the human body, and
inputting a result of the non-human body mounting processing and executing the metadata generating processing in a case where the detected mounting position is on other than the human body.

6. The information processing apparatus according to claim 1, wherein the operations further comprise:
inputting rotation rate information around three axes of X, Y, and Z, the rotation rate information being gyro sensor output, as sensor detection information, and executing sensor mounting position discrimination processing by using the rotation rate information.

7. The information processing apparatus according to claim 1, further comprising:
an imaging device configured to shoot a video image;
wherein the shot image corresponding metadata that is generated is metadata of the imaging device.

8. The information processing apparatus according to claim 1, further comprising:
a built-in sensor including a communication interface configured to transmit the shot image corresponding metadata to a video camera.

9. The information processing apparatus according to claim 1, further comprising:
a server configured to execute communication processing between an information processor with a built-in sensor including a sensor element and a video camera configured to execute image shooting,
wherein the server:
calculates a ratio between a high-frequency component and a low-frequency component included in sensor detection information received from the information processor with the built-in sensor, and executes the discrimination processing of whether the sensor is mounted on the human body or is mounted on other than the human body, on the basis of the calculated ratio, and
generates shot image corresponding metadata received from the video camera, on the basis of the user motion detection information obtained by executing a motion detection algorithm assuming a sensor mounting position coincident with a sensor mounting position detection result.

10. An information processing apparatus comprising:
a memory storing program code; and
a processor configured to execute the program code to perform operations comprising:
detecting a mounting position of a device on the basis of sensor data of a sensor provided in the device to produce a detected mounting position,
wherein detecting the mounting position includes:
calculating a norm of rotation rate information (u, v, and w) around three axes of X, Y, and Z, the rotation rate information being gyro sensor output;
performing a frequency component ratio calculation that calculates a ratio between a high-frequency component signal and a low-frequency component signal included in a temporal transition signal of the norm; and
executing discrimination processing of whether the sensor is mounted on a human body or is mounted on other than the human body, on the basis of the ratio calculated in the frequency component ratio calculation.

11. The information processing apparatus according to claim 10, wherein the operations further comprise:
determining whether or not there is a motion in the sensor mounting body; on the basis of the calculated norm; and
executing comparison processing between a frequency component ratio in a case where the motion is determined, and a threshold value set in advance, and executing discrimination processing of whether the sensor is mounted on the human body or is mounted on other than the human body, on the basis of a comparison result of the comparison processing.

12. The information processing apparatus according to claim 11, wherein the operations further comprise:
performing a count data accumulation to accumulate a determination result to be sequentially output as count data; and
comparing:
(1) human body mounting determination count data determining that the sensor is mounted on the human body, with
(2) non-human body mounting count data determining that the sensor is mounted on other than the human body,
the count data items being accumulation data within a predetermined period, and
outputting a determination result of whether the sensor is mounted on the human body or is mounted on other than the human body by selecting count data having a larger count value.

13. An information processing system comprising:
a sensor configured to output sensor detection information according to a motion of a mounting body, the sensor being mounted on a human body of a user or mounted on other than the human body, the human body being an object becoming an image shooting target; and
a video camera configured to execute image shooting,
wherein the video camera includes:
a mounting position detection unit configured to input the sensor detection information from the sensor, and to execute sensor mounting position determination processing;
an action detection unit configured to input the sensor detection information, and to analyze a motion of the user; and
a metadata generating unit configured to input detection information of the action detection unit, and to generate shot image corresponding metadata,
the mounting position detection unit calculates a ratio between a high-frequency component and a low-frequency component included in the sensor detection information, and executes discrimination processing of whether the sensor is mounted on the human body or is mounted on other than the human body, on the basis of the calculated ratio, and
the metadata generating unit inputs user motion detection information obtained by executing a motion detection algorithm assuming a sensor mounting position coincident with a detection result of the mounting position detection unit, and generates the shot image corresponding metadata.

14. An information processing system comprising:
a sensor configured to output sensor detection information according to a motion of a mounting body, the sensor being mounted on a human body of a user or mounted on other than the human body, the human body being an object becoming an image shooting target;
a video camera configured to execute image shooting; and
a server configured to receive the sensor detection information from the sensor, and to receive a shot image from the video camera,
wherein the server includes:
a mounting position detection unit configured to input the sensor detection information from the sensor, and to execute sensor mounting position determination processing;

an action detection unit configured to input the sensor detection information, and to analyze a motion of the user; and a metadata generating unit configured to input detection information of the action detection unit, and to generate shot image corresponding metadata, the mounting position detection unit calculates a ratio between a high-frequency component and a low-frequency component included in the sensor detection information, and executes discrimination processing of whether the sensor is mounted on the human body or is mounted on other than the human body, on the basis of the calculated ratio, and the metadata generating unit inputs user motion detection information obtained by executing a motion detection algorithm assuming a sensor mounting position coincident with a detection result of the mounting position detection unit, and generates the shot image corresponding metadata received from the video camera.

15. An information processing method executed in an information processor, the method comprising:

detecting a mounting position of a device on the basis of sensor data of a sensor provided in the device to produce a detected mounting position;

detecting an action of a sensor mounting body on the basis of the detected mounting position and the sensor data;

inputting sensor detection information according to a motion of the sensor mounting body from the sensor mounted on a human body of a user or mounted on other than the human body, and executing sensor mounting position determination processing;

inputting the sensor detection information from the sensor, and analyzing a motion of the user;

calculating a ratio between a high-frequency component and a low-frequency component included in the sensor detection information, and executing discrimination processing of whether the sensor is mounted on the human body or is mounted on other than the human body, on the basis of the calculated ratio; and inputting the sensor detection information and user motion detection information obtained by executing a motion detection algorithm assuming a sensor mounting position coincident with the detected mounting position to generate shot image corresponding metadata.

16. A non-transitory computer readable medium storing program code, the program code being executable by a processor to perform operations comprising:

detecting a mounting position of a device on the basis of sensor data of a sensor provided in the device to produce a detected mounting position;

detecting an action of a sensor mounting body on the basis of the detected mounting position and the sensor data;

inputting sensor detection information according to a motion of the sensor mounting body from the sensor mounted on a human body of a user or mounted on other than the human body, and executing sensor mounting position determination processing;

inputting the sensor detection information from the sensor, and analyzing a motion of the user;

calculating a ratio between a high-frequency component and a low-frequency component included in the sensor detection information, and executing discrimination processing of whether the sensor is mounted on the human body or is mounted on other than the human body, on the basis of the calculated ratio; and inputting the sensor detection information and user motion detection information obtained by executing a motion detection algorithm assuming a sensor mounting position coincident with the detected mounting position to generate shot image corresponding metadata.

* * * * *